US012330166B2

(12) United States Patent
McCall et al.

(10) Patent No.: US 12,330,166 B2
(45) Date of Patent: Jun. 17, 2025

(54) SHREDDER FOR COMMINUTING BULK MATERIAL

(71) Applicant: Vermeer Manufacturing Company, Pella, IA (US)

(72) Inventors: Michael Jay McCall, Pella, IA (US); Tyler Haden, Pella, IA (US); Edwin Galloway, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 34 days.

(21) Appl. No.: 18/483,808

(22) Filed: Oct. 10, 2023

(65) Prior Publication Data

US 2024/0033748 A1 Feb. 1, 2024

Related U.S. Application Data

(63) Continuation of application No. 17/732,703, filed on Apr. 29, 2022, now Pat. No. 11,819,856, which is a (Continued)

(51) Int. Cl.
*B02C 18/14* (2006.01)
*B02C 21/02* (2006.01)
(Continued)

(52) U.S. Cl.
CPC .............. *B02C 18/14* (2013.01); *B02C 21/02* (2013.01); *B02C 23/06* (2013.01); *B02C 23/16* (2013.01); *B02C 2023/165* (2013.01)

(58) Field of Classification Search
CPC ......... B02C 18/14; B02C 21/02; B02C 23/06; B02C 23/16; B02C 2023/165
(Continued)

(56) References Cited

U.S. PATENT DOCUMENTS

| | | | |
|---|---|---|---|
| 687,459 | A | 11/1901 | Jacobson |
| 2,756,002 | A | 7/1956 | Brake |

(Continued)

FOREIGN PATENT DOCUMENTS

| | | | |
|---|---|---|---|
| CA | 2121539 | A1 | 10/1994 |
| CA | 2341422 | C | 5/2008 |

(Continued)

OTHER PUBLICATIONS

Japanese Patent Office Action for Application No. 2020-564610, dated Jun. 1, 2023 (8 pages, English translation included).

(Continued)

*Primary Examiner* — Adam J Eiseman
*Assistant Examiner* — Fred C Hammers
(74) *Attorney, Agent, or Firm* — Michael Best & Friedrich LLP

(57) ABSTRACT

A shredder includes a shredder box having first and second opposite end walls, and first and second opposite side walls that extend between the first and second end walls. The shredder further includes a shredder rotor positioned within an interior of the shredder box, an access door that is pivotally moveable, and a control system for monitoring various parameters to operate the shredder. A side access region is defined between the first and second end walls when the access door is in the open position. The side access region provides access to the shredder rotor and includes an open region defined between the first and second end walls at the second side of the shredder. The open region has an open top which is free of obstructions extending between the first and second end walls.

19 Claims, 58 Drawing Sheets

Related U.S. Application Data continuation of application No. 17/053,220, filed as application No. PCT/US2019/033734 on May 23, 2019, now Pat. No. 11,484,886.

(60) Provisional application No. 62/675,540, filed on May 23, 2018.

(51) Int. Cl.
*B02C 23/06* (2006.01)
*B02C 23/16* (2006.01)

(58) Field of Classification Search
USPC ........................................................ 241/79.2
See application file for complete search history.

(56) References Cited

U.S. PATENT DOCUMENTS

| | | | | |
|---|---|---|---|---|
| 3,033,064 | A | | 5/1962 | Lee |
| 3,703,970 | A | * | 11/1972 | Benson ................ B02C 18/145 241/243 |
| 4,049,206 | A | | 9/1977 | Konig et al. |
| 4,146,184 | A | | 3/1979 | Whitney |
| 4,205,799 | A | | 6/1980 | Brewer |
| 4,385,732 | A | * | 5/1983 | Williams ............ B02C 18/0084 241/73 |
| 4,394,983 | A | | 7/1983 | Ulsky |
| 4,452,400 | A | | 6/1984 | Williams |
| 4,529,134 | A | | 7/1985 | Williams |
| 4,609,157 | A | | 9/1986 | Thieux |
| 4,619,407 | A | | 10/1986 | Goldhammer |
| 4,685,626 | A | | 8/1987 | Kerdiles et al. |
| 4,721,257 | A | | 1/1988 | Williams et al. |
| 4,773,600 | A | | 9/1988 | Metski |
| 4,793,561 | A | | 12/1988 | Burda |
| 4,997,135 | A | | 3/1991 | Zehr |
| 5,472,146 | A | | 12/1995 | Doppstadt |
| 5,472,147 | A | | 12/1995 | Doppstadt |
| 5,482,218 | A | | 1/1996 | Ha |
| 5,484,110 | A | | 1/1996 | Doppstadt |
| 5,484,112 | A | | 1/1996 | Koenig |
| 5,503,339 | A | | 4/1996 | Doppstadt |
| 5,503,340 | A | | 4/1996 | Doppstadt |
| 5,570,849 | A | | 11/1996 | Anderson |
| 5,746,377 | A | | 5/1998 | Gehrig |
| 5,765,765 | A | | 6/1998 | Tamura et al. |
| 5,797,548 | A | | 8/1998 | Tamura et al. |
| 5,938,131 | A | | 8/1999 | Thom et al. |
| 5,975,443 | A | | 11/1999 | Hundt et al. |
| 6,371,393 | B1 | | 4/2002 | Koehl et al. |
| 6,572,037 | B1 | | 6/2003 | Bendzick |
| 6,581,862 | B1 | | 6/2003 | Young et al. |
| 7,163,166 | B1 | | 1/2007 | Smith |
| 7,168,640 | B2 | | 1/2007 | Lipowski |
| 7,216,824 | B2 | | 5/2007 | Katsumura et al. |
| 7,255,296 | B2 | | 8/2007 | Karlsson et al. |
| 7,303,159 | B2 | | 12/2007 | Hishiyama et al. |
| 7,484,437 | B2 | | 2/2009 | Brunazzi et al. |
| 7,568,645 | B2 | | 8/2009 | Doppstadt |
| 7,575,186 | B2 | | 8/2009 | Roessler |
| 7,600,708 | B2 | | 10/2009 | Karlsson et al. |
| 7,606,708 | B2 | | 10/2009 | Hwang |
| 7,766,263 | B2 | | 8/2010 | Karlsson et al. |
| 7,832,667 | B2 | | 11/2010 | Doppstadt et al. |
| 7,909,277 | B2 | | 3/2011 | Doppstadt et al. |
| 7,938,350 | B2 | | 5/2011 | Doppstadt et al. |
| 7,959,098 | B2 | | 6/2011 | Doppstadt et al. |
| 7,980,502 | B2 | | 7/2011 | Doppstadt et al. |
| 7,992,812 | B2 | | 8/2011 | Doppstadt et al. |
| 8,033,487 | B2 | | 10/2011 | Yamashita et al. |
| 8,464,973 | B2 | | 6/2013 | Karlsson et al. |
| 8,505,843 | B2 | | 8/2013 | Veneroso et al. |
| 8,979,010 | B2 | | 3/2015 | Doppstadt et al. |
| 8,985,486 | B2 | | 3/2015 | Van Der Galien |
| 9,222,561 | B2 | | 12/2015 | Meisenbichler et al. |
| 9,327,287 | B2 | | 5/2016 | Doppstadt et al. |
| 9,511,375 | B2 | | 12/2016 | Doppstadt et al. |
| 9,573,137 | B2 | | 2/2017 | Van Der Galien |
| 9,616,428 | B2 | | 4/2017 | Doppstadt et al. |
| 11,253,865 | B2 | | 2/2022 | Doppstadt |
| 2003/0075628 | A1 | | 4/2003 | Pretzler et al. |
| 2003/0178517 | A1 | * | 9/2003 | Delille ................. B02C 13/095 241/189.1 |
| 2007/0290086 | A1 | | 12/2007 | Karlsson et al. |
| 2009/0145812 | A1 | | 6/2009 | Doppstadt et al. |
| 2013/0277476 | A1 | | 10/2013 | Doppstadt et al. |
| 2014/0103152 | A1 | | 4/2014 | Van Der Galien |
| 2014/0166792 | A1 | * | 6/2014 | Doppstadt ............... F16H 47/04 241/32 |
| 2014/0175201 | A1 | | 6/2014 | Peterson et al. |
| 2014/0217214 | A1 | | 8/2014 | Peterson et al. |
| 2015/0217299 | A1 | | 8/2015 | Doppstadt et al. |
| 2020/0316609 | A1 | | 10/2020 | Lindner et al. |

FOREIGN PATENT DOCUMENTS

| | | | |
|---|---|---|---|
| CN | 202876913 | U | 4/2013 |
| CN | 107405587 | A | 11/2017 |
| DE | 8331826 | U1 | 9/1985 |
| DE | 102004052969 | A1 | 6/2005 |
| DE | 202015003527 | U1 | 3/2016 |
| EP | 0687503 | A1 | 12/1995 |
| EP | 1050340 | A1 | 11/2000 |
| EP | 1442796 | A1 | 8/2004 |
| EP | 1961485 | A2 | 8/2008 |
| EP | 2045016 | A1 | 4/2009 |
| EP | 2113305 | A1 | 11/2009 |
| EP | 2711081 | A1 | 3/2014 |
| EP | 2796202 | A1 | 10/2014 |
| EP | 3248687 | A1 | 11/2017 |
| JP | H079442 | U | 3/1995 |
| JP | 3024826 | U | 6/1996 |
| JP | 2002028517 | A | 1/2002 |
| JP | 2004073963 | A | 3/2004 |
| JP | 2004202365 | A | 7/2004 |
| JP | 2004344811 | A | 12/2004 |
| JP | 2005-517608 | A | 6/2005 |
| JP | 2012081383 | A | 4/2012 |
| WO | 9741957 | A1 | 11/1997 |
| WO | 0078461 | A1 | 12/2000 |
| WO | 2003068640 | A1 | 8/2003 |
| WO | 2006045280 | A1 | 5/2006 |
| WO | 2010032037 | A1 | 3/2010 |
| WO | 2011067584 | A1 | 6/2011 |
| WO | 2013113989 | A1 | 8/2013 |
| WO | 2016096103 | A1 | 6/2016 |

OTHER PUBLICATIONS

International Search Report and Written Opinion for Application No. PCT/US2019/033734 dated Oct. 10, 2019 (18 pages).
DW Series Shredders, Doppstadt brochure, Aug. 2009, (16 pages).
Fair and conference: Entsorga-Enteco, Entsorga magazine, Sep. 25, 2009 (1 page).
New heavy-duty waste crusher, RECYCLING magazine, Aug. 25, 2009 (3 pages).
Recycling Technology Static Equipment, Doppstadt brochure, Aug. 2011, (21 pages).
Williams Crusher, Patent Crusher and Pulverizer, Product Information, <https://www.williamscrusher.com/products/Industrial-shredders>, website publicly available at least as early as 2009 (6 pages).
Williams Patent Crusher and Pulverizer Co., TF & XL Shredders, Product Information, <https://www.williamscrusher.com/products/industrial-shredders/tf-xl-shredders>, website publicly available at least as early as 2009 (4 pages).
Rawlings Manufacturing, "Rawlings introduces VRM Super Hi Inertia Vertical Wood Hog", Canadian Forest Industries, May 8, 2017 (2 pages).
Rawlings, "Rawlings Vertical Wood Grinders (PXZ & VRM)", <https://rawlingsmanufacturing.com/equipmentivertical-wood-

(56) References Cited

OTHER PUBLICATIONS grinder>, website publicly available at least as early as 2016 (2 pages).
VAZ, 2000-2500, Informational Brochure, publicly available at least as early as Mar. 2017 (4 pages).
SSI, Shredding Systems, publicly available at least as early as Mar. 2017, (10 pages).
Coker, "Particle Size Reduction Strategies", BioCycle, <https://www.biocycle.net/particle-size-reduction-strategies>, Mar. 8, 2017 (11 pages).
Toop, "Grinder Screens make the difference", Recycling Product News, <https://www.recyclingproductnews.com/article/1172/grinder-screens-make-the-difference>, Mar. 15, 2011 (13 pages).
Quickshifl, "MGX-5202SC" Product Information, 2016 (2 pages).
Twin Disc Inc., Marine Transmission Owners Manual, 2015 (200 pages).
Rotochopper Inc., Screen Change System, Product Brochure, 2019 (2 pages).
OBM, Barracuda, Informational Brochure, publicly available at least as early as Mar. 2017 (8 pages).
Doppstadt, Ceron Type 256, <https://www.doppstadt.de/en/products/detail/ceron-type-256/>, website publicly available at least as early as 2009 (9 pages).
Komptech, CRAMBO: Maintenance made easy, Youtube Video, <https://www.youtube.com/watch?v=1TydkN2P9Ck>, Sep. 15, 2017 (3 pages).
TANA, "Removing rotor screen on TANA Shark", You Tube Video, <https://www.youtube.com/watch?v=qAPEdforPzc>, Dec. 8, 2014 (3 pages).
Image, Doppstadt DW-306 Ceron, product available as early as Dec. 2009 (1 page).
Office Action issued from the Chinese Patent Office for related Application No. 201980034163.2 dated Jan. 14, 2022 (33 pages with english translation).
Japanese Patent Office Action for Application No. 2023-139302 dated Jun. 13, 2024 (5 pages including English translation).

* cited by examiner

SHREDDER FOR COMMINUTING BULK MATERIAL

RELATED APPLICATIONS

This application is a continuation of U.S. patent application Ser. No. 17/732,703 filed Apr. 29, 2022, which is a continuation of U.S. patent application Ser. No. 17/053,220 filed Nov. 5, 2020, which is a 371 National Phase of PCT Application No. PCT/US2019/0033734 filed May 23, 2019, which claims the benefit of U.S. Provisional Patent Application No. 62/675,540 filed May 23, 2018, the entire contents of which are hereby incorporated by reference herein.

TECHNICAL FIELD

The present disclosure relates to a shredder. Such a shredder may be used for comminuting bulk material.

BACKGROUND

A slow-speed shredder can be used to reduce the particle size of certain waste products, such as large landfill waste. U.S. Pat. No. 9,573,137 and U.S. Patent Publication 2015/0217299 are examples of such shredders. These shredders are robust machines built with heavy components due to the high loads and forces exerted on the equipment during the shredding process. The waste is often fed from the top of the shredder, typically by dropping the material into a hopper with a front-end loader. The hopper contains the material as a rotor/drum, usually located below the hopper, rotates at a speed that may vary from zero to 40 RPM. The shredder rotor has multiple rigid teeth that engage the waste material and eventually force it through a comb with teeth, which results in a shearing and ripping of the material. The comminuted waste then drops to a conveyor for discharge. A screen may be used between the rotor and the conveyor to control the size of material that is discharged from the shredder. The screen allows smaller particles to pass through while also preventing large particles from passing through and discharging through the conveyor. Large particles that do not pass through the screen are recirculated to the hopper by the rotor for further reduction in size.

Due to the harsh equipment operating conditions, shredder components require periodic maintenance and cleaning. Accessibility to the shredder's rotor, screen, and comb is critical for efficient maintenance and optimizing the length of equipment service. It is generally difficult to design a shredder for efficient service and with adequate structural integrity. Thus, there is a need to ensure ease of access for any required maintenance activities of the shredder components, while also ensuring that the shredder has a robust design that will improve equipment life.

SUMMARY

One aspect of the present disclosure relates to a shredder having a shredder box containing a shredder rotor and a shredder comb that cooperate to shred material fed into the shredder box. In certain examples, the shredder box can include an upper hopper for feeding material to be reduced into a shredding interface defined by the shredder rotor and the shredder comb. The shredder box can also include a lower discharge opening for discharging shredded material from the shredder box. In certain examples, the shredder box has a configuration adapted to provide enhanced access to the shredder rotor and the shredder comb for maintenance and repair. In certain examples, the shredder box can include a side that can be fully opened to provide enhanced access to the shredder rotor and the shredder comb. In certain examples, the side can be opened in a manner that allows a screen to be installed through the open-topped and/or open-sided region of the shredder box to facilitate installing the screen beneath the shredder rotor. In certain examples, the screen can be readily removed from beneath the shredder rotor by sliding the screen out from beneath the shredder rotor and vertically lifting the screen through the open-topped region or horizontally moving the screen through the open-sided region. In certain examples, the screen could be loaded into or removed from the shredder box horizontally by a fork truck/forklift, or similar machine, or could be loaded into or removed from the shredder box vertically using a piece of equipment suitable for lifting the screen via a chain such as a front-end loader, a crane, a backhoe or the like. In certain examples, the side of the shredder box can be defined by an access door that pivots about a horizontal axis. In certain examples, the shredder comb can be carried with the access door such that when the access door is open, the shredder comb is displaced from a shredding location adjacent the shredder rotor to a servicing position located outside the shredder box. In certain examples, an open access region can be located between the shredder comb and the shredder rotor when the access door is opened. In certain examples, the open access region can be defined above a platform formed by the shredder box generally between the shredder comb and the shredder rotor. In certain examples, the region above the platform can be free of overhead obstructions. In certain examples, the access door can define a portion of the hopper that extends from a top of the hopper to the shredder comb.

Another aspect of the present disclosure relates to a shredder having a shredder rotor, and a shredder comb movable between a shredding position and a relief position. The shredder comb can be operable in a first, higher relief-pressure operating mode and a second, lower relief-pressure operating mode. When the shredder comb is in the first, higher relief-pressure operating mode the shredder comb is moveable from the shredding position to the relief position upon a first predetermined pressure observed at the shredder comb and created by material being shredded to allow an obstruction to pass between the shredder comb and the shredder rotor in response to the first predetermined pressure, and when the shredder comb is in the second, lower relief-pressure operating mode the shredder comb is moveable from the shredding position to the relief position upon a second predetermined pressure observed at the shredder comb and created by material being shredded to allow an obstruction to pass between the shredder comb and the shredder rotor in response to the second predetermined pressure, the second predetermined pressure being lower than the first predetermined pressure. The shredder also includes a control system for monitoring a parameter indicative of a screen being installed at the screen mounting location and for automatically: a) operating the shredder with the shredder comb in the first, higher relief-pressure operating mode when the parameter indicates that the screen has been installed at the screen mounting location; and b) operating the shredder with the shredder comb in the second, lower relief-pressure operating mode when the parameter indicates that a screen has not been installed at the screen mounting location. In certain examples, the control system can include a sensor for detecting the presence of a screen at the screen mounting location. In other examples, the parameter indicative of a screen being installed at the screen mounting location can be an indirect indication of the presence of a screen at the screen mounting location. For example, a sensor can be used to sense the position of a lift arm used to lift the screen to an installed position. In certain examples, the control system can also include an auto reverse function that automatically reverses the direction of rotation of the shredder rotor when an overload condition is detected. The control system may include a computer comprising at least a processing unit with processing capability, a system memory, and a system bus that couples the system memory to the processing unit.

Another aspect of the present disclosure relates to a shredder having features to facilitate loading a screen beneath the shredder rotor of the shredder and to facilitate removing the screen from beneath the shredder rotor of the shredder. In one example, the shredder can include a lifting device such as an arm capable of moving a screen from a staged position beneath the shredder rotor to an installed position beneath the shredder rotor. In certain examples, the ability to maneuver the screen beneath the shredder rotor is facilitated by having an open-sided configuration on a side of a shredder box in which the shredder rotor is housed. In certain examples, the open-sided configuration can be provided by an access door. In certain examples, the access door extends a full height of the shredder box such that when the access door is open, a full side and top of the shredder box are open. In certain examples, a positive stop for retaining the screen in the installed position can be attached or integrated with the access door such that upon closing the access door, the positive stop engages an end of the screen. In certain examples, the positive stop can be a pivot link pivotally connected to the access door. In certain examples, the pivot link can have a first end pivotally connected to the access door and a second end supported by a service platform defined by the shredder box.

Another aspect of the present disclosure relates to a shredder having a comb relief system that includes hydraulic pressure relief arrangement in fluid communication with a hydraulic cylinder for allowing the hydraulic cylinder to move from a first position to a second position when the hydraulic pressure at the hydraulic cylinder exceeds a predetermined level. The pressure relief arrangement may also comprise a hydraulic accumulator in communication with the control system.

Yet another aspect of the present disclosure relates to a drive train for a shredder that includes an engine, a reversible gear transmission driven by the engine, a fluid coupler connected to an output of the reversible gear transmission by a drive shaft, a flywheel coupled with the fluid coupler, and a gear reduction unit having an input connected to both the fluid coupler and the flywheel. An output of the gear reduction unit is drivingly connected to the rotor for rotating the rotor in either of the first or second directions.

A variety of advantages of the disclosure will be set forth in part in the description that follows, and in part will be apparent from the description, or may be learned by practicing the various aspects of the present disclosure. It is to be understood that both the forgoing general description and the following detailed description are exemplary and explanatory only and are not restrictive of the broad inventive concepts upon which the examples are based.

DETAILED DESCRIPTION

Figure 1:
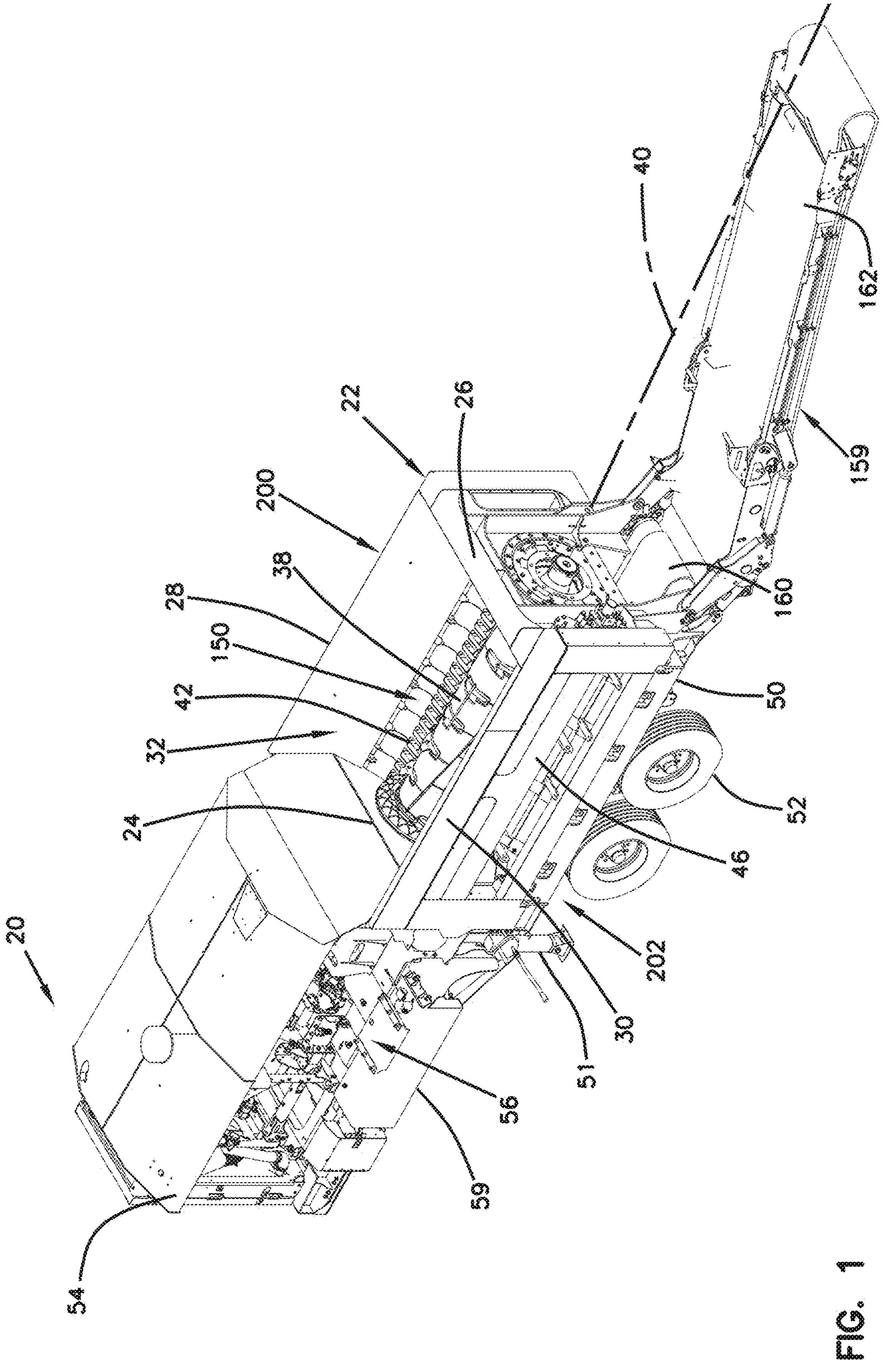
FIG. 1 is a rear, top, left side perspective view of a shredder in accordance with the principles of the present disclosure.

Various embodiments will be described in detail with reference to the drawings, wherein like reference numerals represent like parts and assemblies throughout the several views. Additionally, any examples set forth in this specification are not intended to be limiting and merely set forth some of the many possible embodiments for practicing aspects of the present disclosure.

Aspects of the present disclosure are adapted to: a) provide enhanced access (e.g., open side and/or top access) to components of a reducing machine such as rotary reducing elements and/or combs; and/or b) provide simplified loading of reducing machine components such as screens which are often relatively heavy and awkward to handle; and/or c) provide component protection by implementing control functionality such as an automatically adjustable reducing comb pressure relief (i.e., functionality that adjusts the pressure-relief setting at which the reducing comb moves from a shredding position to a relief position) that is activated when a parameter indicates that a screen is installed in the machine; and/or d) provide component protection by implementing an auto-reverse function with respect to a reducing rotor when an overload condition is detected; and/or e) providing lift arms for assisting in moving (e.g., lifting and sliding) a screen in a first direction to an installed position beneath a reducing rotor and for assisting in moving (e.g., lowering and sliding) the screen in a second direction for removing the screen from beneath the reducing rotor; and/or f) providing a positive stop system (e.g., one, two or more pivotal links) integrated at least in part with an access door of the reducing machine for retaining a screen in an installed position; and/or g) providing a service platform that, when an access door of the reducing machine is open, is located between the reducing rotor and another reducing component such as a comb; and/or h) providing a drive train designed for use with a reducing machine. In the depicted examples disclosed herein, the reducing machine is a slow speed shredder. However, it will be appreciated that the various aspects disclosed herein are also applicable to other types of reducing machines regardless of the speed at which the rotors are intended to be driven during use.

The present invention relates to a shredder 20. In one embodiment, which may be represented by FIG. 1, the shredder 20 may comprise a shredder box 22 including first and second opposite end walls 24, 26, and first and second opposite side walls 28, 30 that extend between the first and second end walls 24, 26. The shredder box 22 also includes an upper hopper 32 for receiving material desired to be shredded. As seen FIG. 13, the shredder box 22 may also including a lower discharge opening 33, which can cooperate with a chute 34 for discharging shredded material from the shredder box 22. Referring back to FIG. 1, the first and second opposite side walls 28, 30 are located respectively at first and second sides 200, 202 of the shredder box 22.

Figure 4:
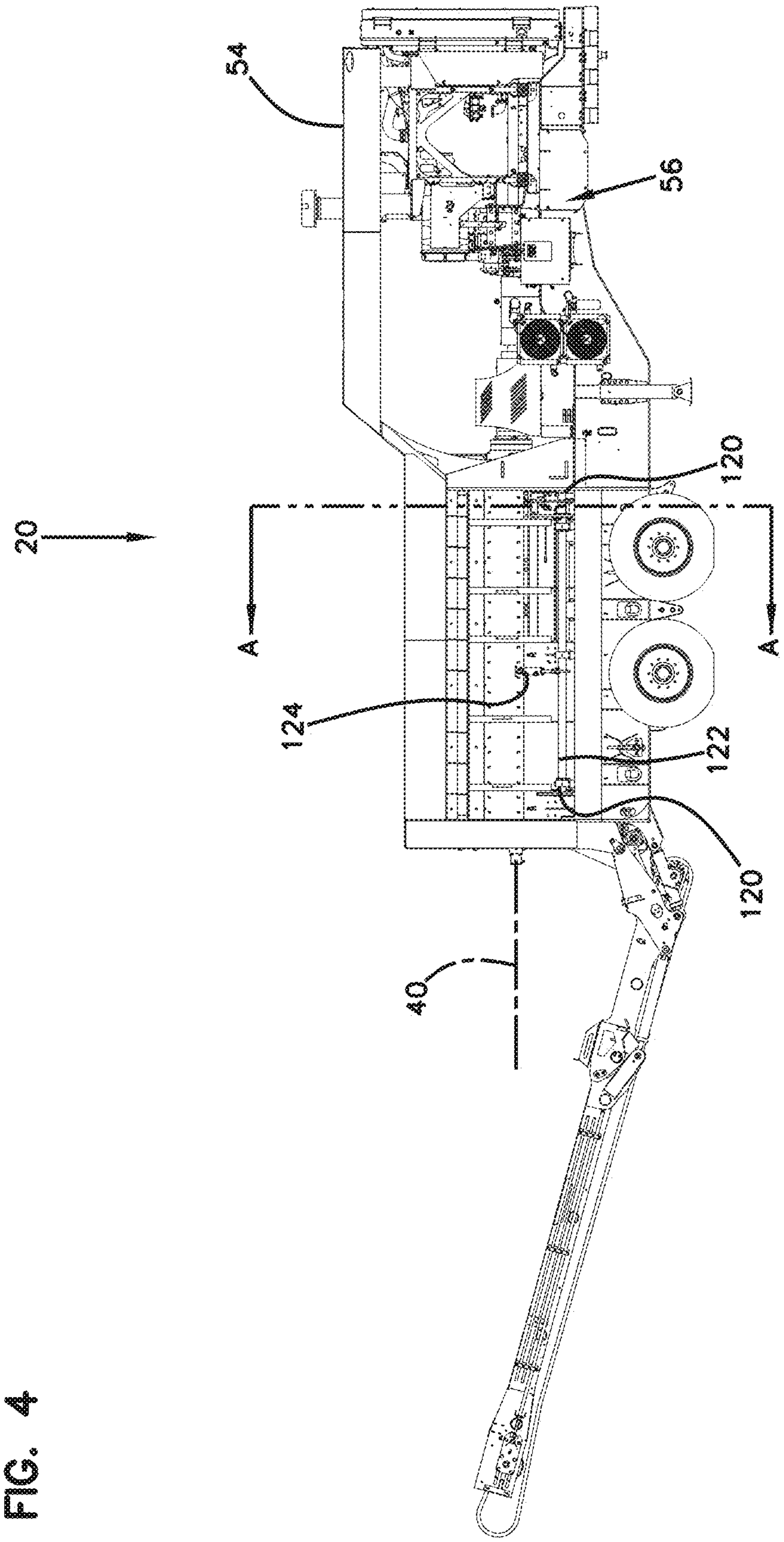
FIG. 4 is a right side view of the shredder of FIG. 1.
Figure 5:
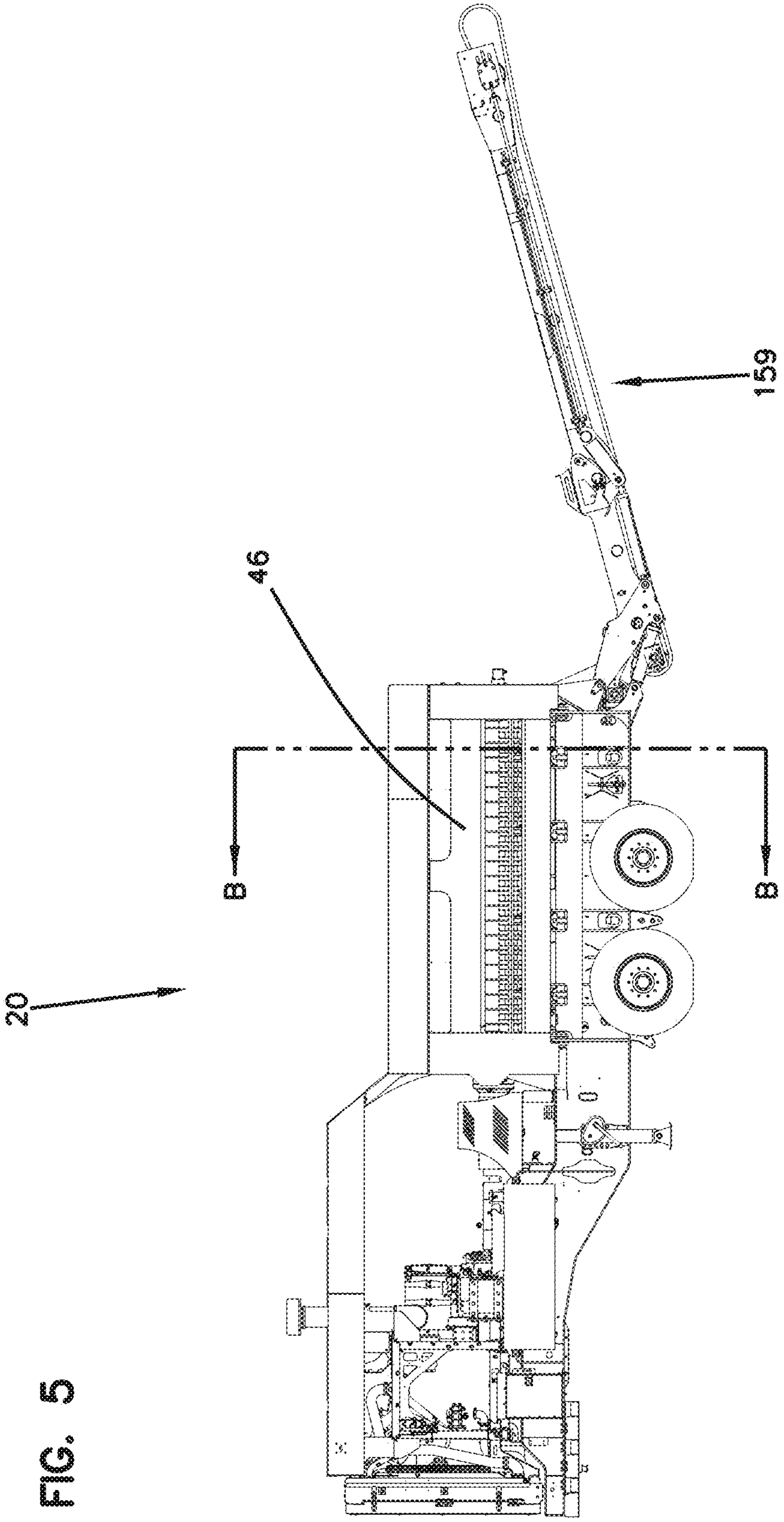
FIG. 5 is a left side view of the shredder of FIG. 1.
Figure 6:
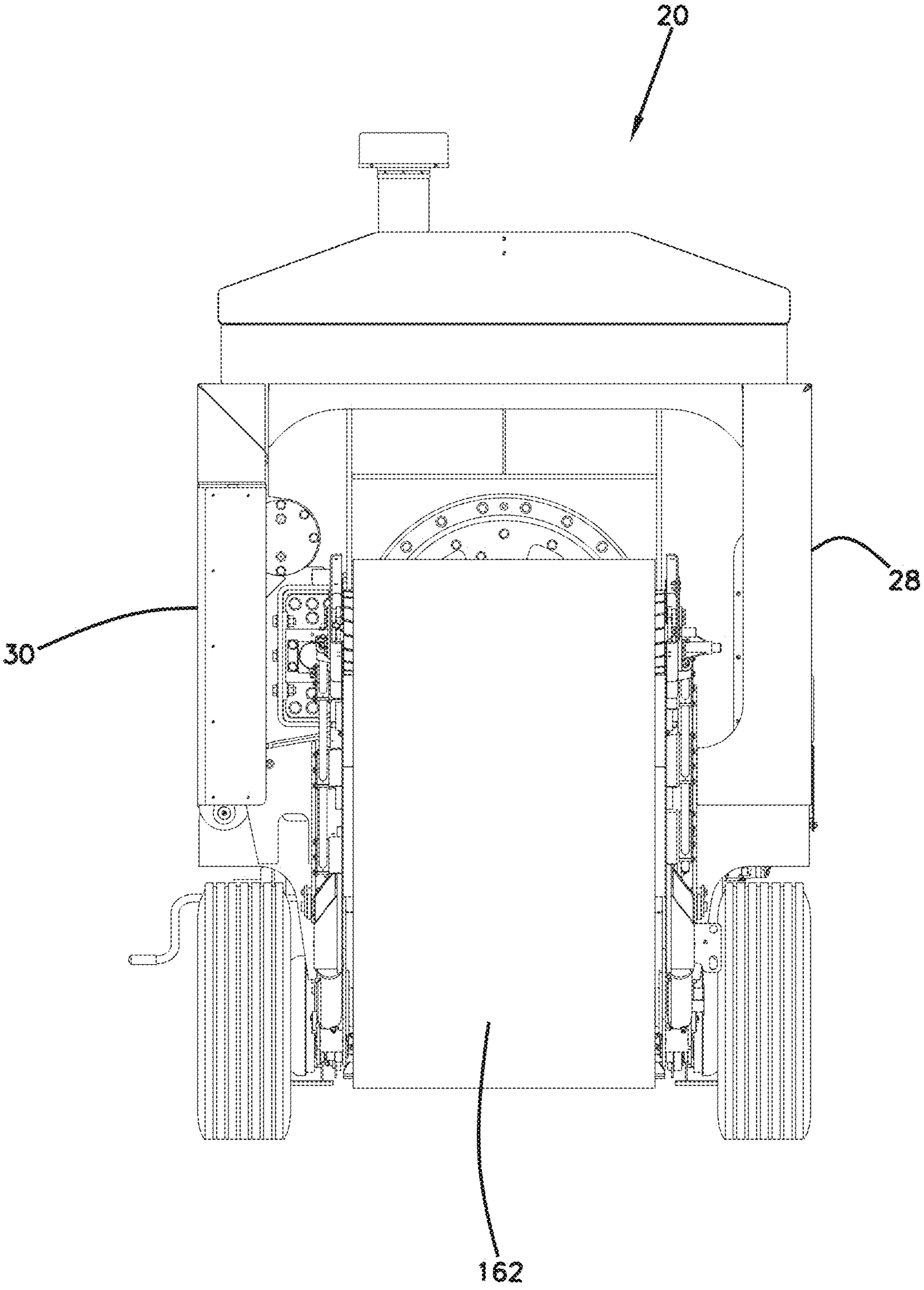
FIG. 6 is a rear view of the shredder of FIG. 1.
Figure 13:
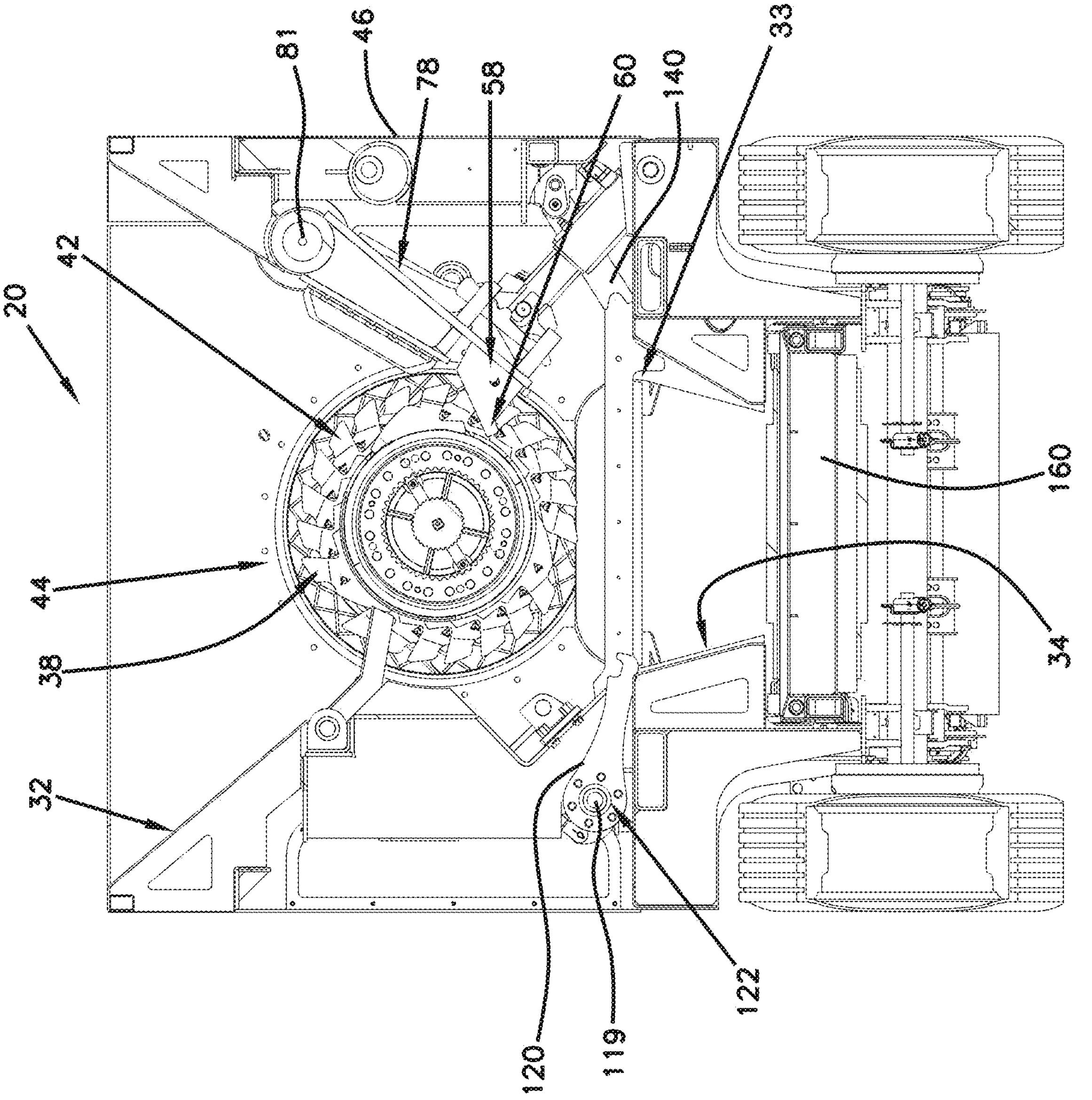
FIG. 13 is a cross-sectional view taken along section line A-A of FIG. 4 showing a shredder comb of the shredder in a shredding position.

FIGS. 1 and 13 show that the shredder 20 may further comprise a conveyor system 159 that includes a lower conveyor 160 positioned beneath the lower discharge chute 34 and an outer conveyor 162 positioned adjacent to one end of the lower conveyor 160. The outer conveyer 162 may be pivotally movable relative to the shredder box 22 between a stowed or transport position and an operating position. FIGS. 1, 4, and 5 show that the shredder box 22 may also comprise a base 50 supported on wheels 52. The discharge chute 34 may be part of the shredder box 22, part of the base 50, or may be part of both the shredder box 22 and the base 50. The shredder 20 includes a shredder housing 54 enclosing a power train 56 for rotating the shredder rotor 38. Embodiments may comprise a trailer tongue/hitch 59 at the front of the shredder 20 with support jacks 51.

Figure 7:
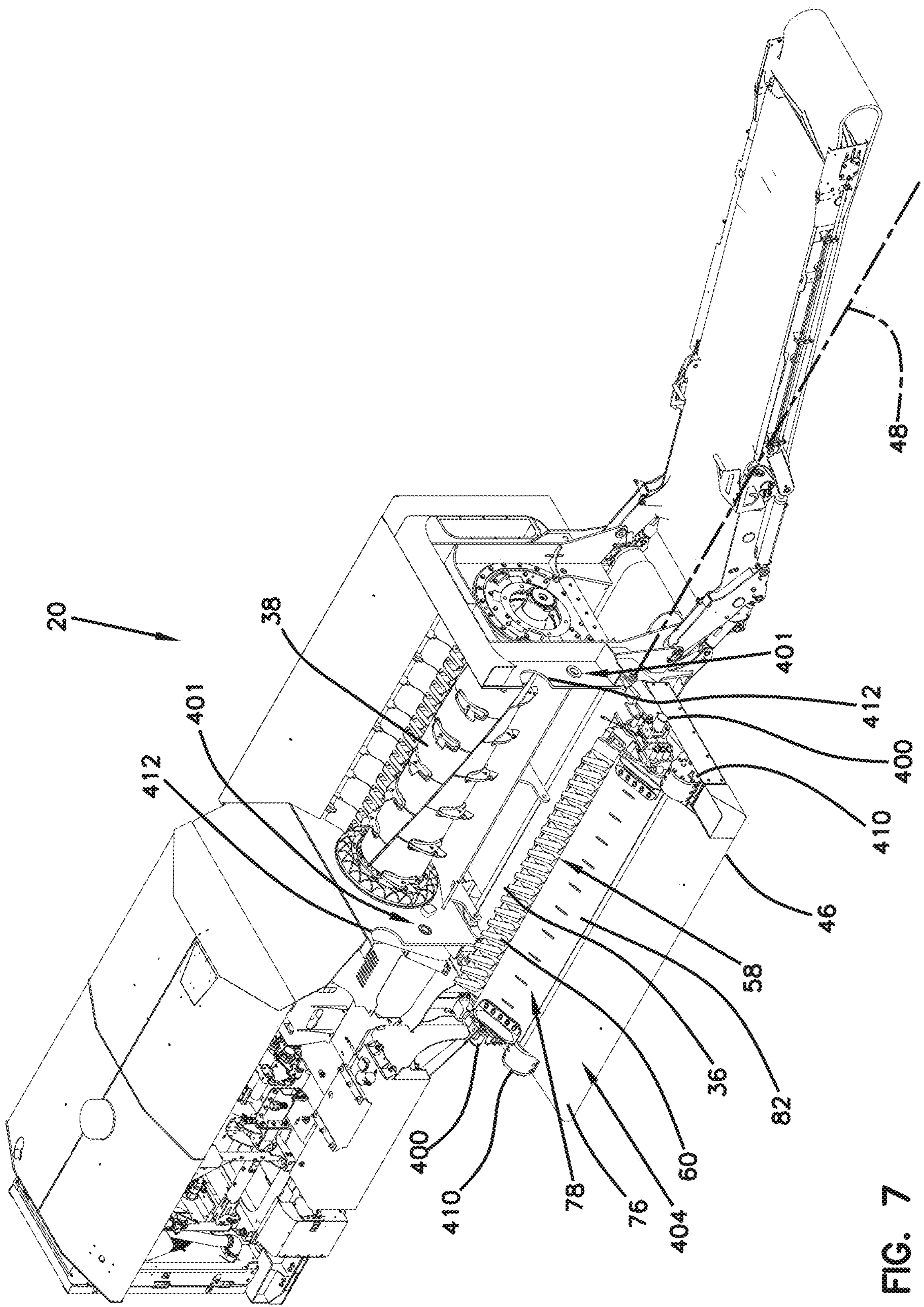
FIG. 7 is a rear, top, left side perspective view of the shredder of FIG. 1 with an access door of the shredder in an open position.
Figure 9:
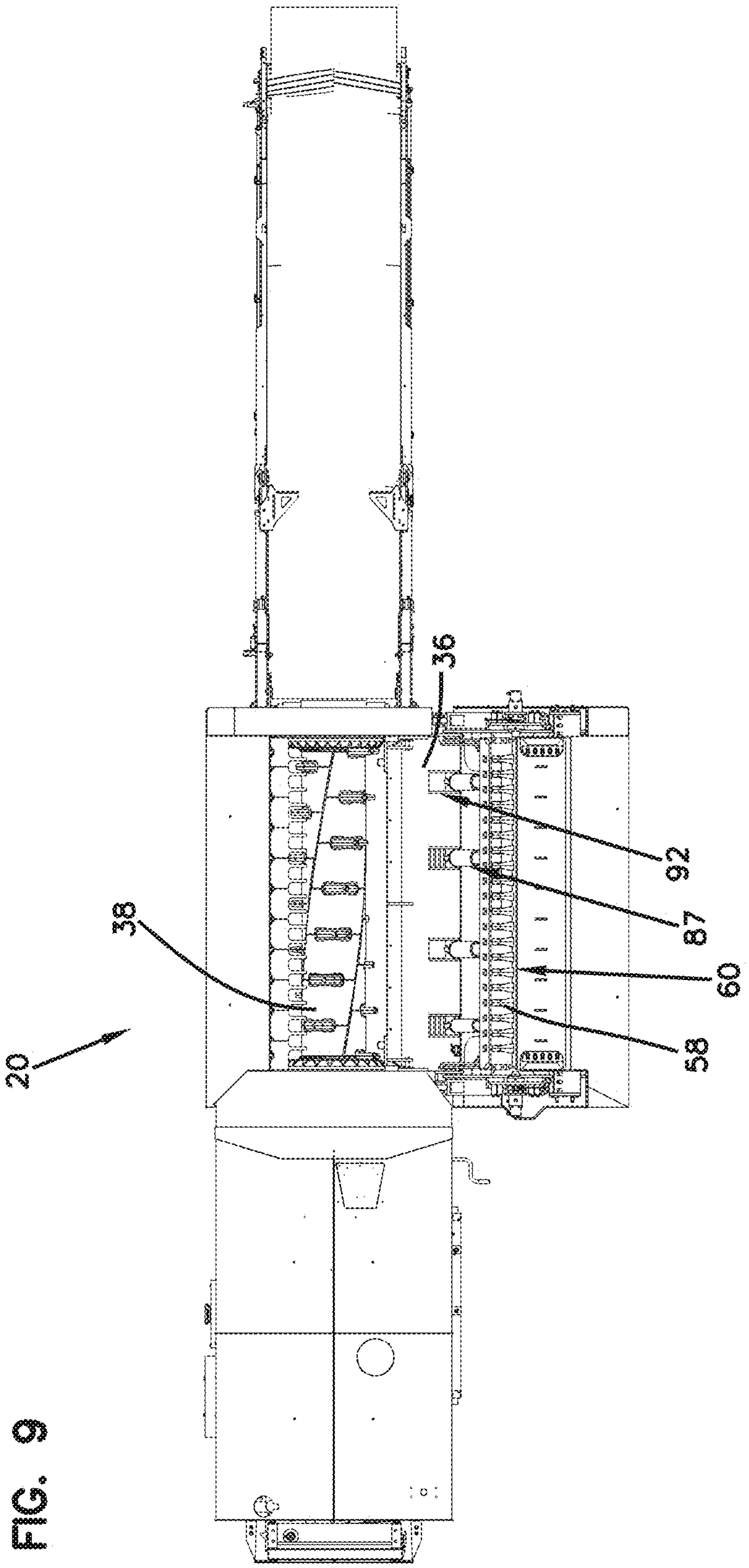
FIG. 9 is a top view of the shredder of FIG. 1 with the access door in the open position.
Figure 10:
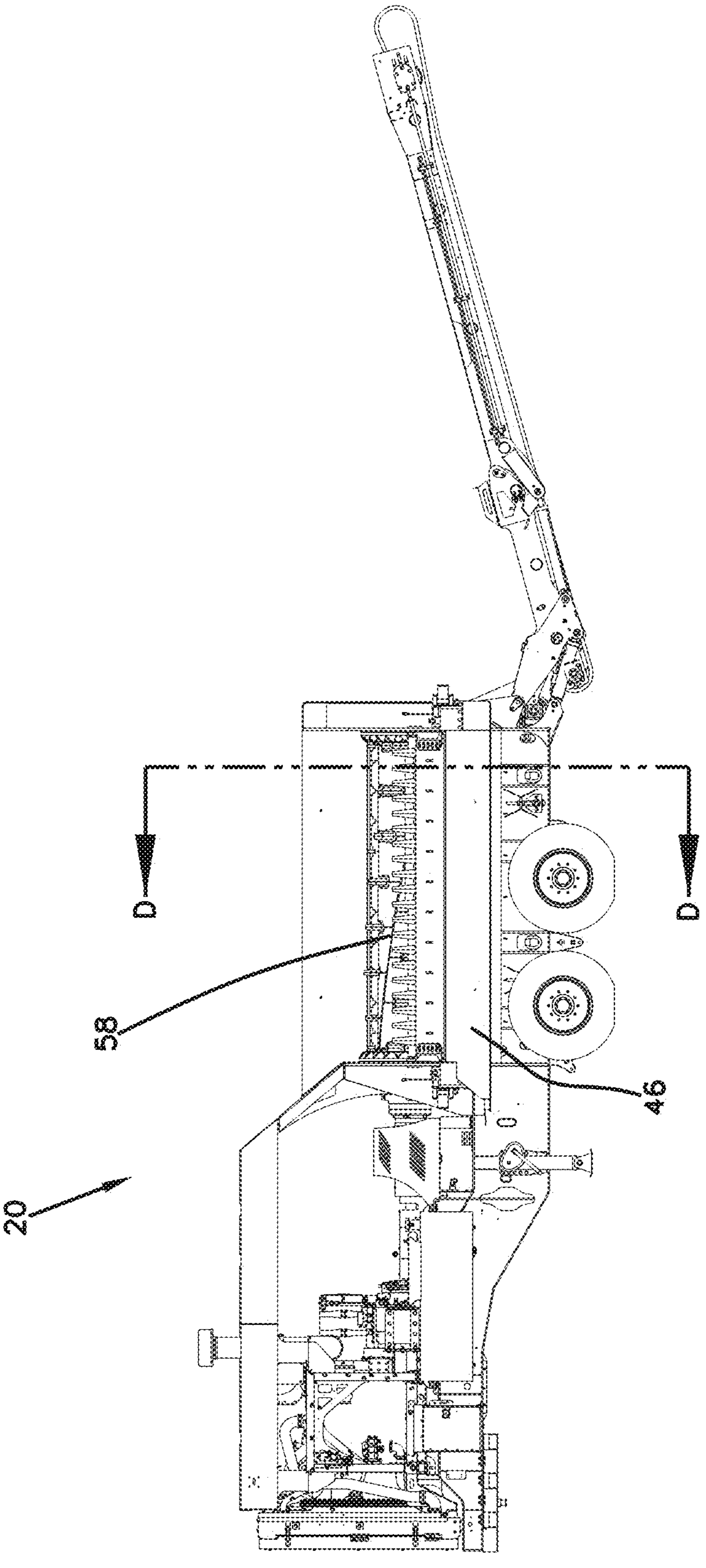
FIG. 10 is a left side view of the shredder of FIG. 1 with the access door in the open position.

As shown in FIGS. 7 and 9, the shredder box 22 may further include a service platform 36 that extends between the first and second end walls 24, 26, and a shredder rotor 38 positioned within an interior of the shredder box 22 adjacent a lower end of the upper hopper 32. The service platform 36 may be substantially flat (i.e., horizontal) and can enable access to several components of the shredder 20. For example, when an operator is standing on the service platform 36, the operator is able to face a first direction toward rotor 38, or the operator may face a second direction towards a shredder comb 58, described in more detail below. An operator may access the full length of the shredder comb 58 by walking along the service platform 36. An operator may also access the complete length of the rotor 38 by walking along the service platform 36.

The shredder rotor 38 may include a main rotor body and a plurality of rotor teeth 42 mounted to the main rotor body. The shredder rotor 38 may be rotatable about a rotor axis 40 that is oriented to extend from the first end wall 24 to the second end wall 26. The first and second side walls 28, 30 are depicted as being oriented to extend in a direction of (i.e., along or parallel to) the rotor axis 40. The shredder rotor 38 may be either or both rotatable in a forward reducing direction about the rotor axis 40, and rotatable in a reverse direction about the rotor axis 40.

The shredder 20 may further comprise a screen unit 100 that is mountable at a screen mounting location for screening shredded material that moves past a shredder comb 58. The shredder 20 is operable with the screen unit 100 mounted at the screen mounting location and with the screen unit 100 removed from the screen mounting location. The screen mounting location may be located above the lower discharge opening 33 and chute 34 and below the rotor 38.

As shown in FIG. 7, in some embodiments the screen unit 100 is loadable beneath the shredder rotor 38 into the screen mounting location through a side access region 62 at the second side of the shredder 20. The screen unit 100 may also be removable from beneath the shredder rotor 38 through the side access region 62 at the second side of the shredder 20. During loading, the screen unit 100 may be positionable at a staged position (see FIGS. 21-24) where the screen unit 100 is partially loaded within the screen mounting location.

Figure 12:
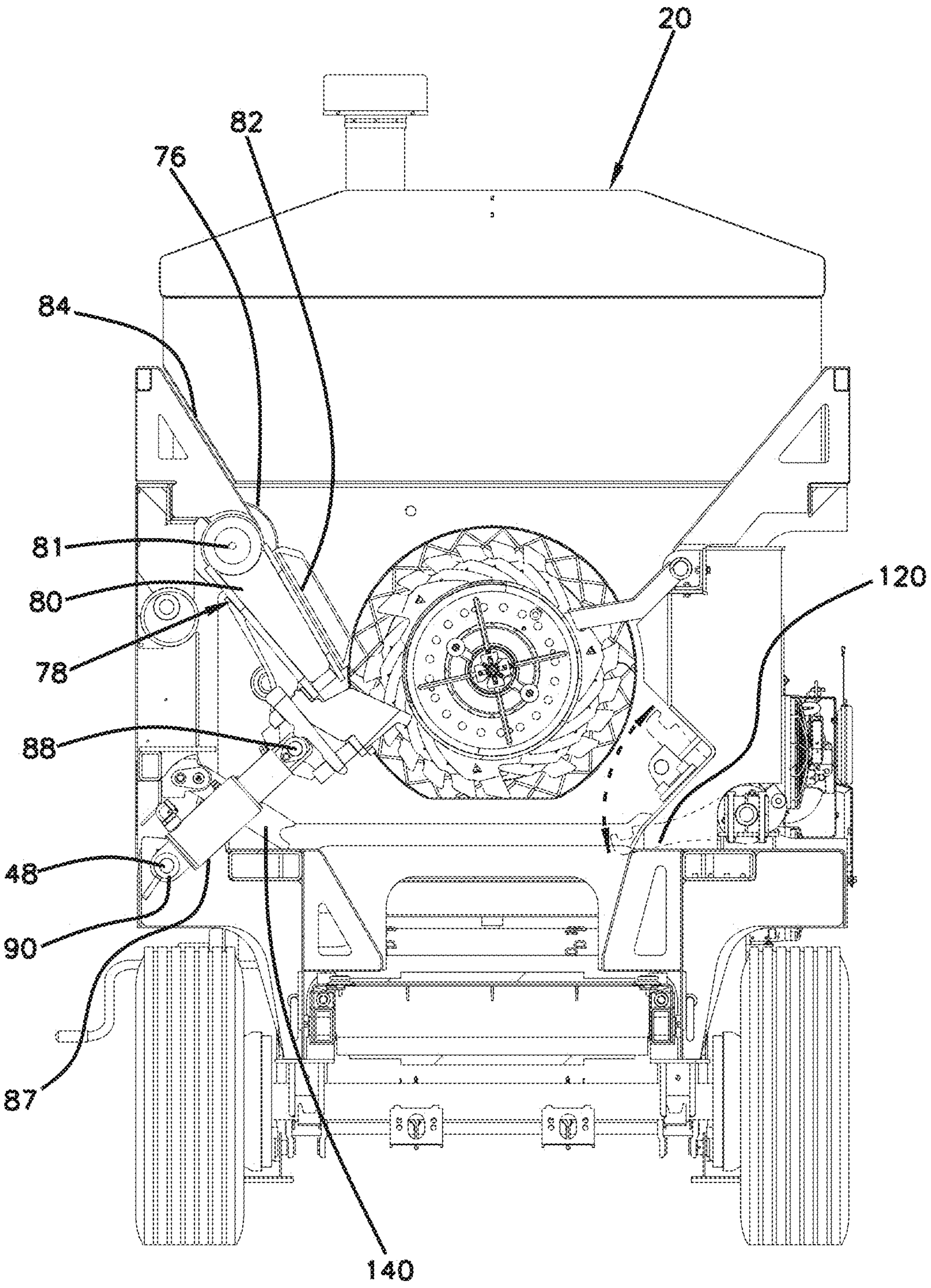
FIG. 12 is a cross-sectional view taken along section line B-B of FIG. 5 showing the shredder comb of the shredder in the shredding position.
Figure 14:
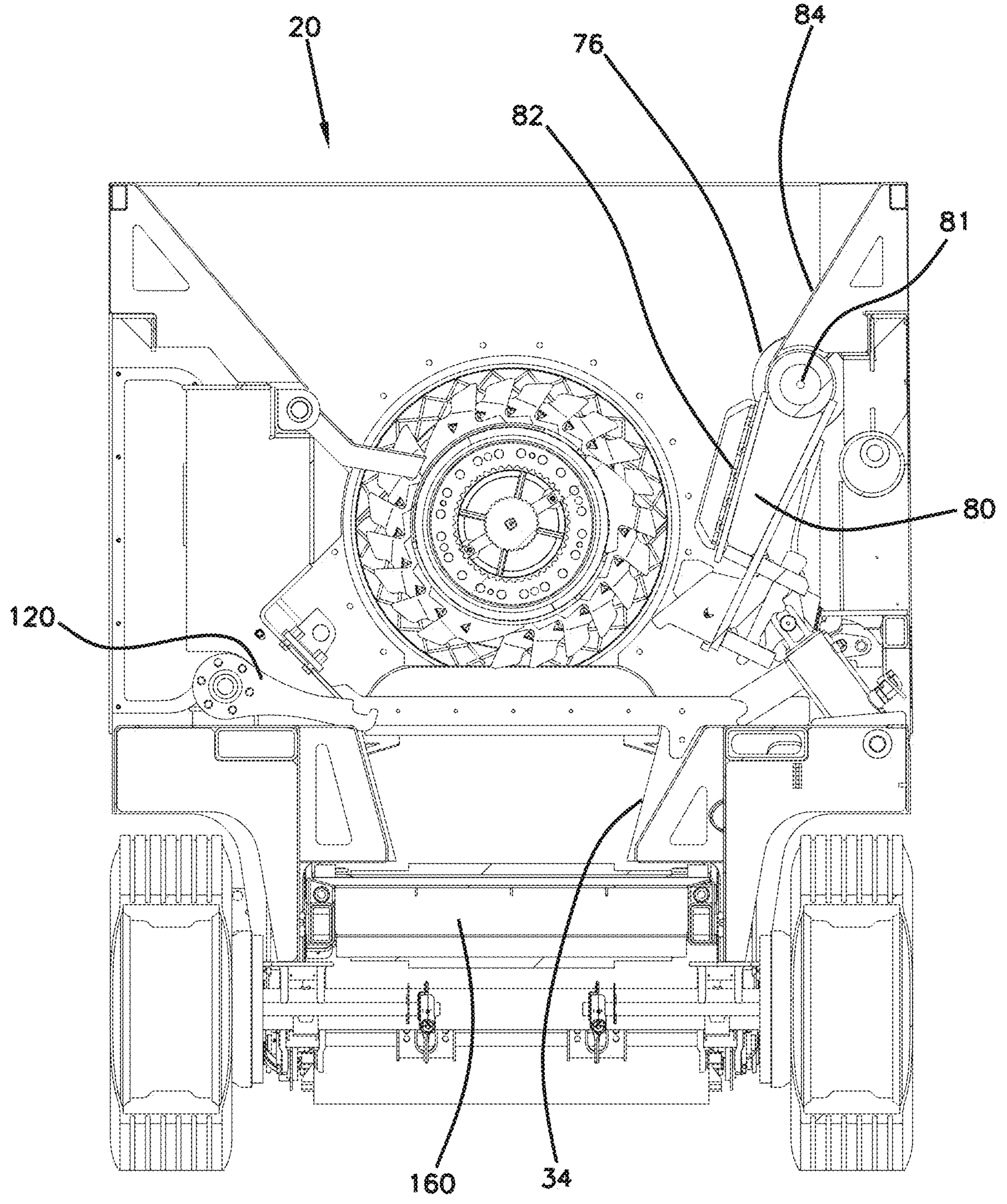
FIG. 14 is a cross-sectional view taken along section line A-A of FIG. 4 showing the shredder comb of the shredder in an overload relief position.
Figure 16:
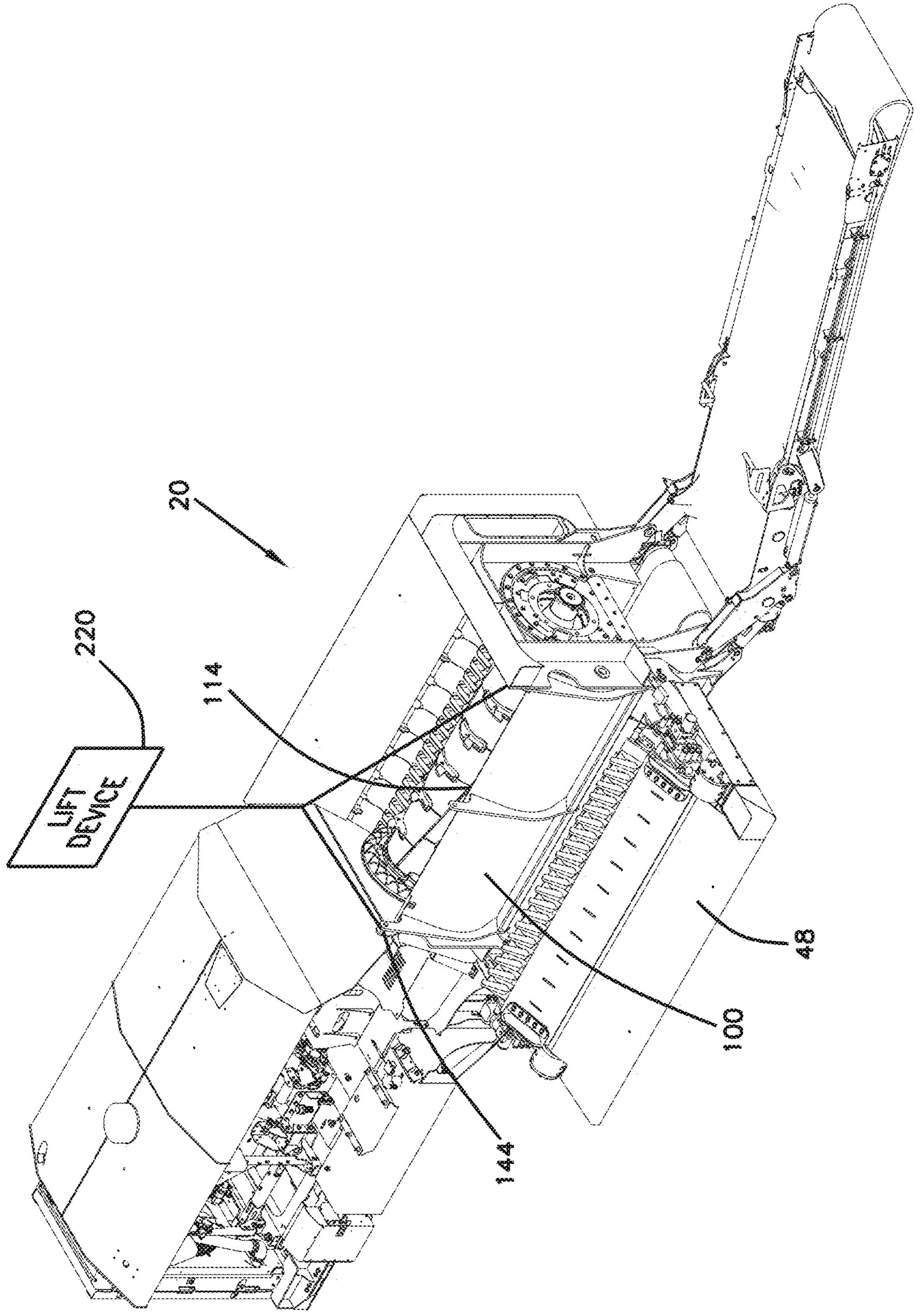
FIG. 16 is a rear, top, left side perspective view of the shredder of FIG. 1 with the access door open and with a screen shown in the process of being installed into the shredder box.
Figure 17:
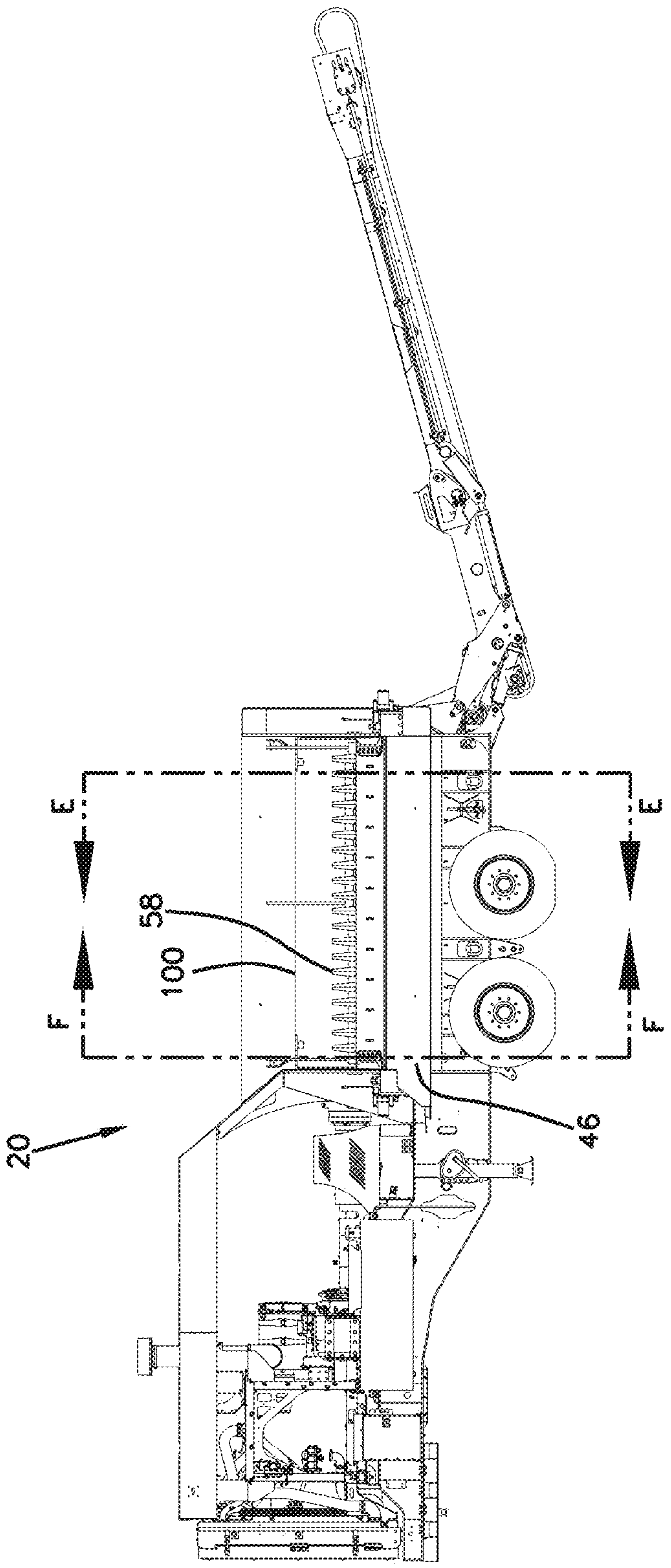
FIG. 17 is a left side view of the shredder of FIG. 1 with the shredder door open and the screen in the process of being installed in the shredder box.
Figure 18:
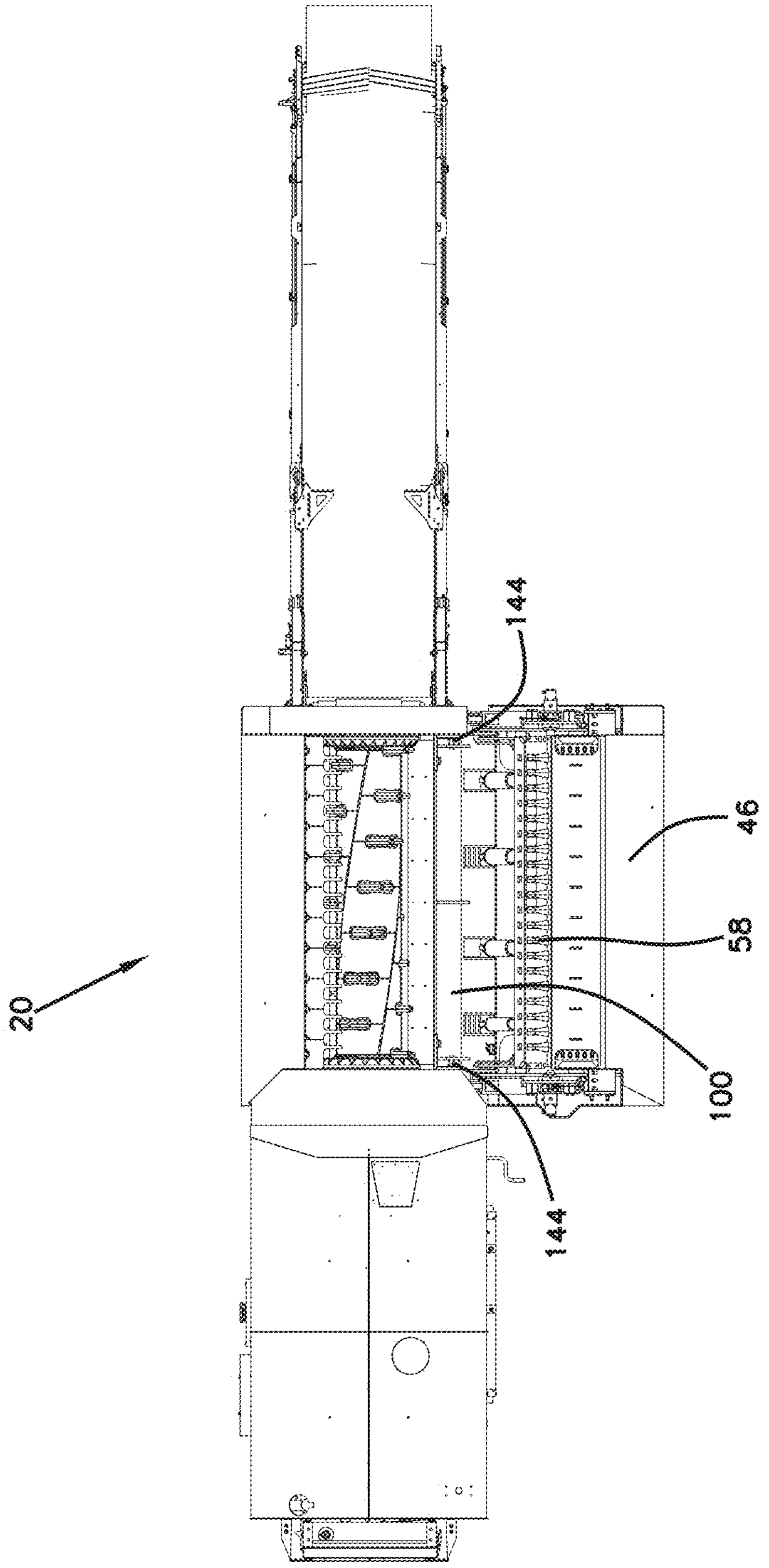
FIG. 18 is a top view of the shredder of FIG. 1 with the access door open and the screen being shown in the process of being installed in the shredder box.
Figure 19:
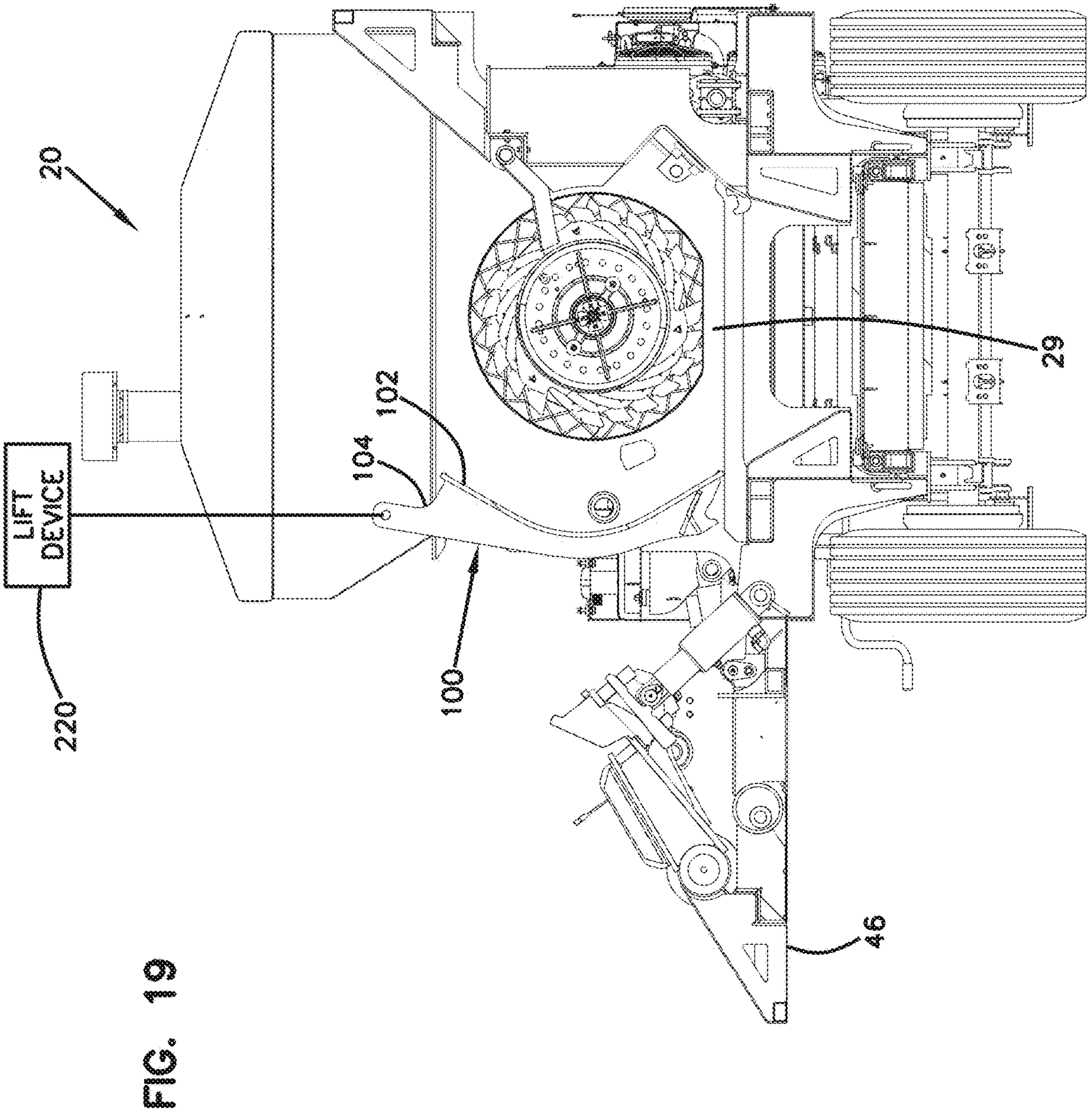
FIG. 19 is a cross-sectional view taken along section line E-E of FIG. 17.
Figure 20:
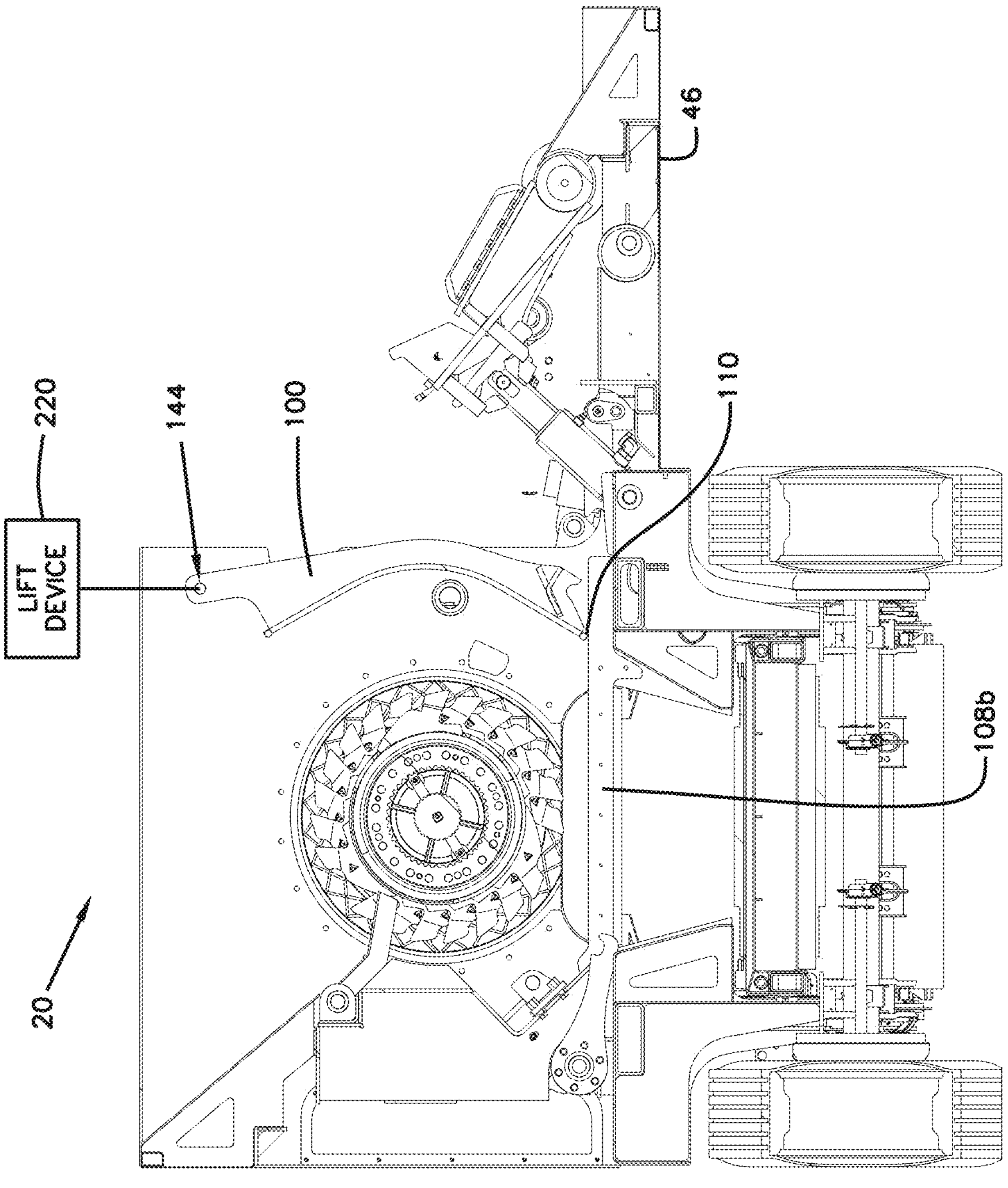
FIG. 20 is a cross-sectional view taken along section line F-F of FIG. 17.

Referring to FIGS. 12-14, the shredder 20 may further comprise at least one lift arm and preferably two lift arms 120 positioned adjacent the first side of the shredder 20. The lift arms 120 can be moved from a first position (see FIGS. 23 and 24) to a second position (see FIGS. 25 and 26) to move or pull the screen unit 100 in a screen loading direction from the staged position toward the first side of the shredder 28 and for lifting the screen unit 100 from the staged position (see FIGS. 23 and 24) to an installed position (see FIGS. 25 and 26) at the screen mounting location. As illustrated in FIGS. 16, and 19-20, the screen unit 100 may be installed using a lift device 220 to lower the screen unit 100 into the shredder box 20 through the top the shredder 20. Lift device 220 may include equipment, such as a backhoe, a front-end loader, or a crane, to vertically lower the screen unit 100 via a chain or other connecting structure. The screen unit 100 may also be loaded horizontally through the open side of the shredder box using a forklift or similar piece of equipment.

Figure 11:
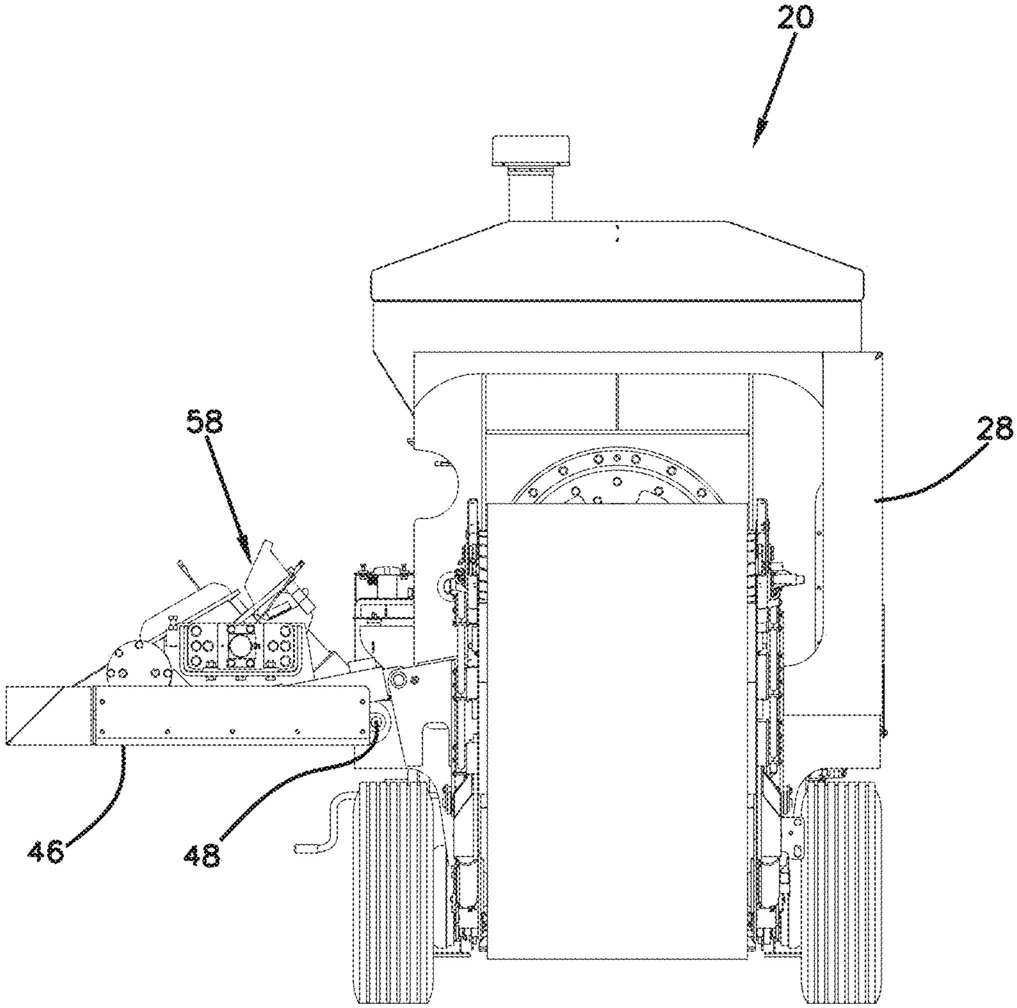
FIG. 11 is a rear view of the shredder of FIG. 1 with the access door in the open position.

As shown in FIGS. 1, 7, and 11, the shredder 20 has an access door 46 that is pivotally moveable relative to the first end wall 24, the second end wall 26 and the service platform 36 between an open position (see FIG. 7) and a closed position (see FIG. 1). The access door 46 pivots about a door axis 48 as the access door 46 pivots between the open and closed positions. The door axis 48 extends in a direction of (i.e., along or parallel to) the rotor axis 40 between the first and second end walls 24, 26. The door axis 48 in the illustrated embodiment is horizontal. When it is in the closed position, the access door 46 defines the second side wall 30 of the shredder box 22. The access door 46 may also include first and second latches 400 (see FIG. 7) for securing the access door 46 respectively to the first and second end walls 24, 26 when the access door 46 is in the closed position. The latches 400 can interlock with openings 401 in the end walls 24, 26 to secure the door 46 in the closed position. In an example embodiment, the access door 46 is vertical in the closed position and horizontal in the open position. Furthermore, in the embodiment illustrated in FIG. 7 the latches 400 operate in the horizontal direction to extend and retract into the openings 401 in the respective end walls 24, 26.

Figure 47:
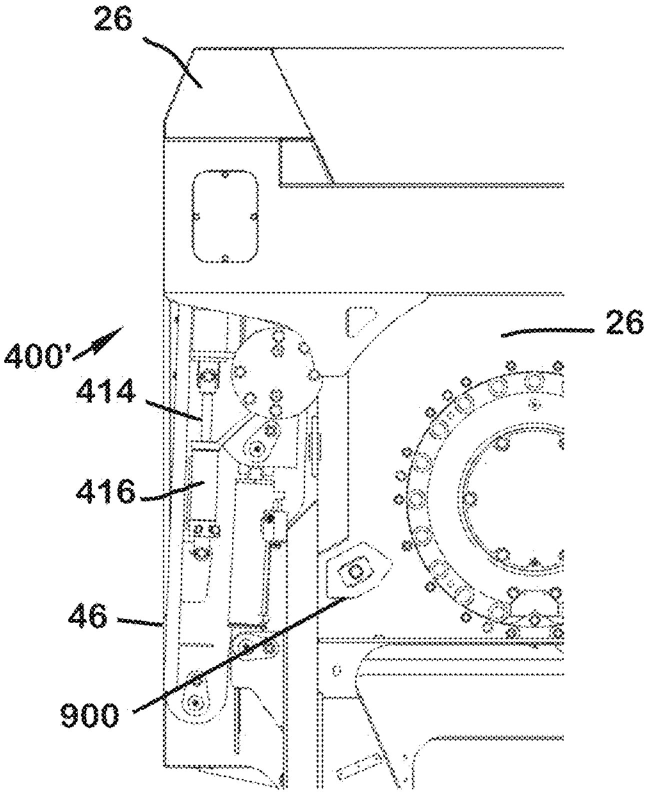
FIG. 47 is a partial end view showing the access door in the closed and latched condition using the latching arrangement of FIG. 46.
Figure 48:
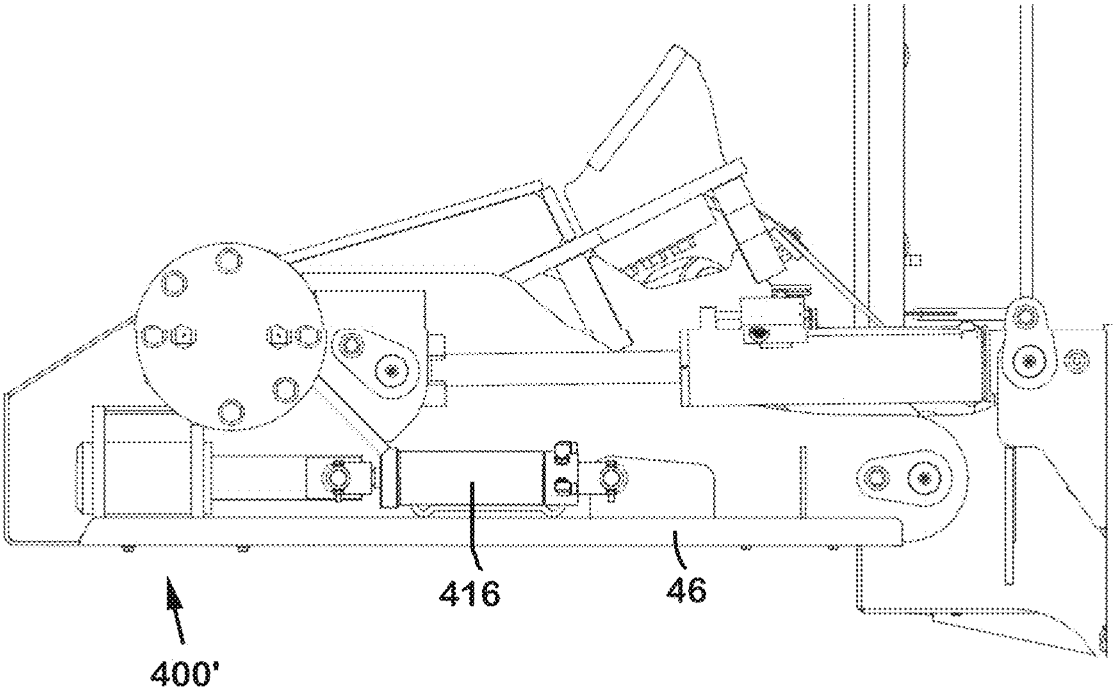
FIG. 48 is a partial end view showing the access door in the open position with the latching arrangement in the retracted position.
Figure 49:
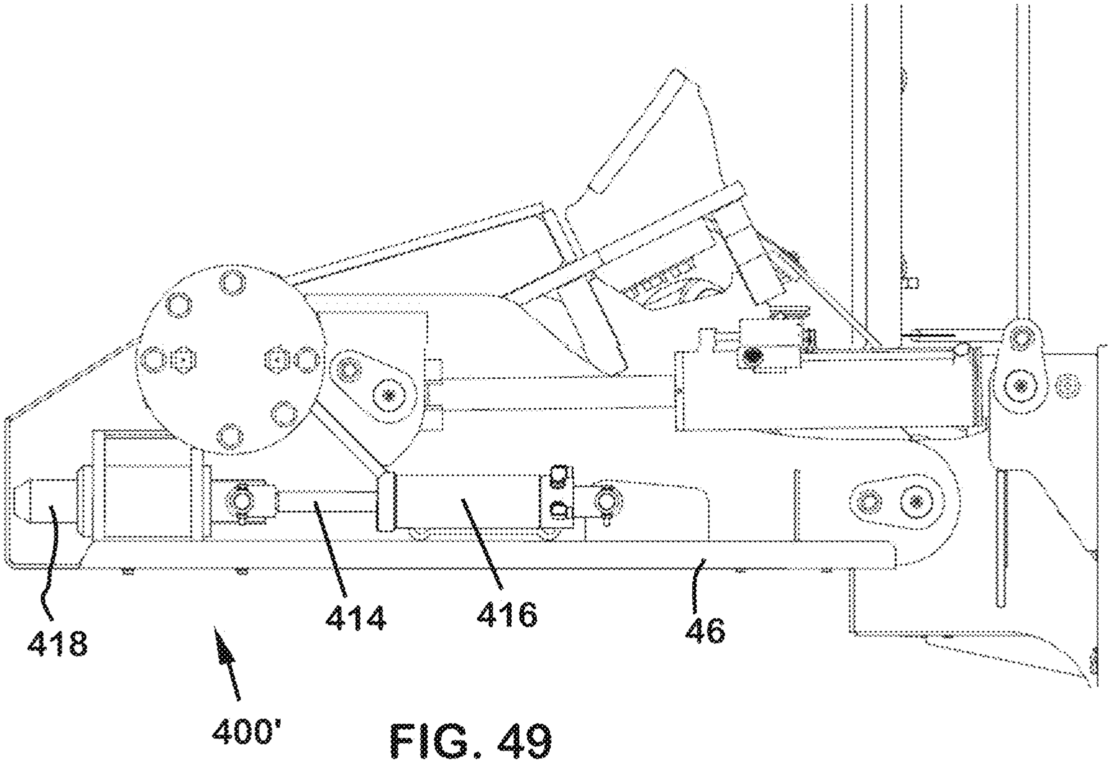
FIG. 49 is a partial end view showing the access door in the open position with the latching arrangement in the extended position.

In another embodiment shown in FIGS. 46-49, the latches 400' cooperate with openings 401' (see FIG. 46—only one opening 401' is shown) in the end walls 24, 26 and operate in the vertical direction when the access door 46 is in the closed position (see FIG. 47). FIGS. 48 and 49 illustrate how the latches 400' each include a rod 414 and a cylinder 416, with the end of the rod 414 including a pin 418 that extends (FIG. 49) and retracts (FIG. 48) with the rod to respectively secure and release the door 46 via engagement or disengagement of the pin 418 with the respective openings 401' in the end walls 24, 26.

Referring to FIGS. 7 and 13, the shredder 20 further comprises a shredder comb 58 that may positioned at an interior side 404 of the access door 46. The shredder comb 58 may be carried with the access door 46 as the access door 46 is pivoted between the open and closed positions. The shredder comb 58 includes shredder comb teeth 60. When the access door 46 is in the closed position, the shredder comb 58 is positioned between the first and second end walls 24, 26 at a shredding location adjacent the lower end of the upper hopper 32.

Figure 27:
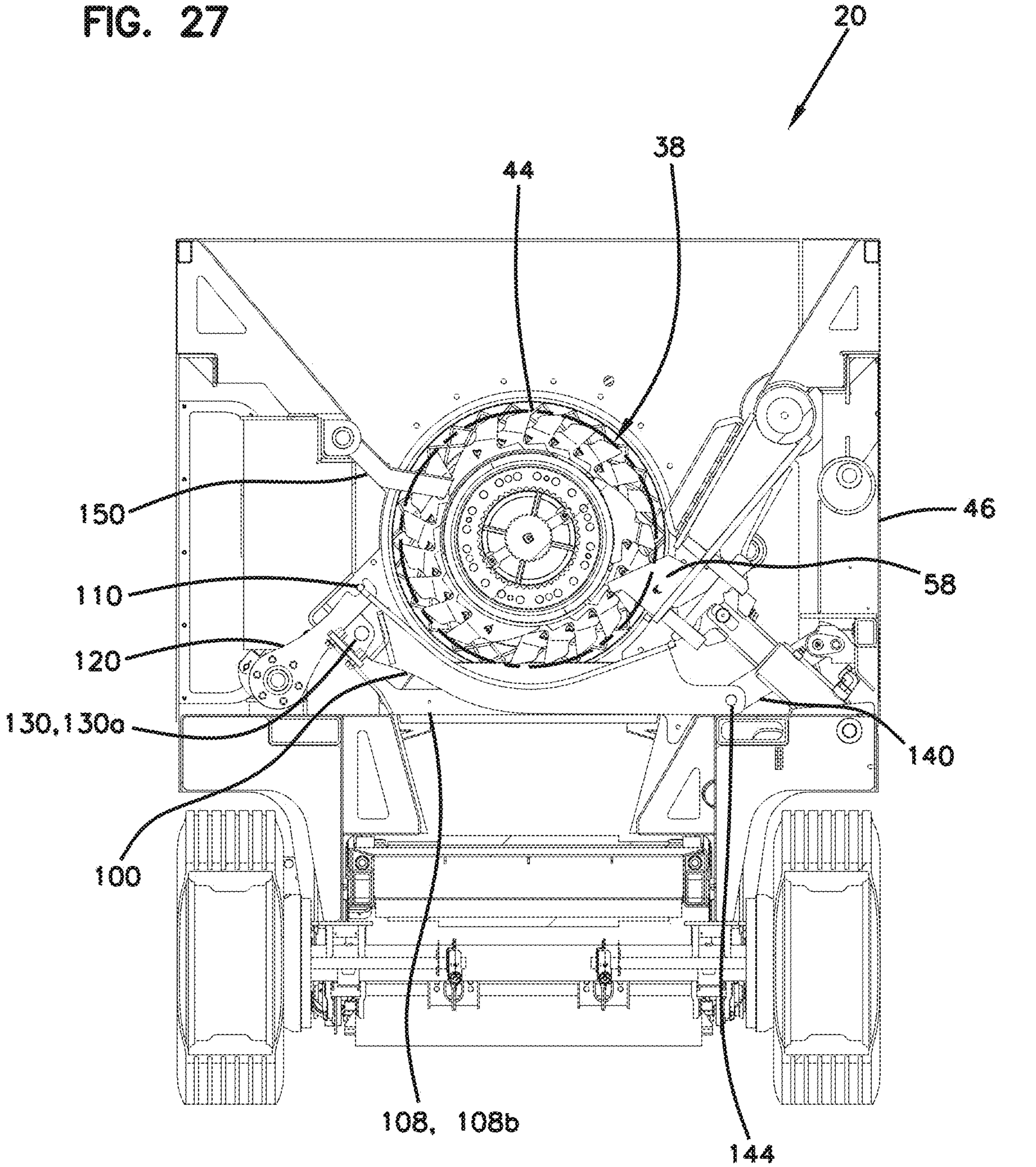
FIG. 27 is a cross-sectional view taken along section line G-G of FIG. 22 with the access door closed and with the screen in the installed position beneath the shredder rotor.
Figure 42:
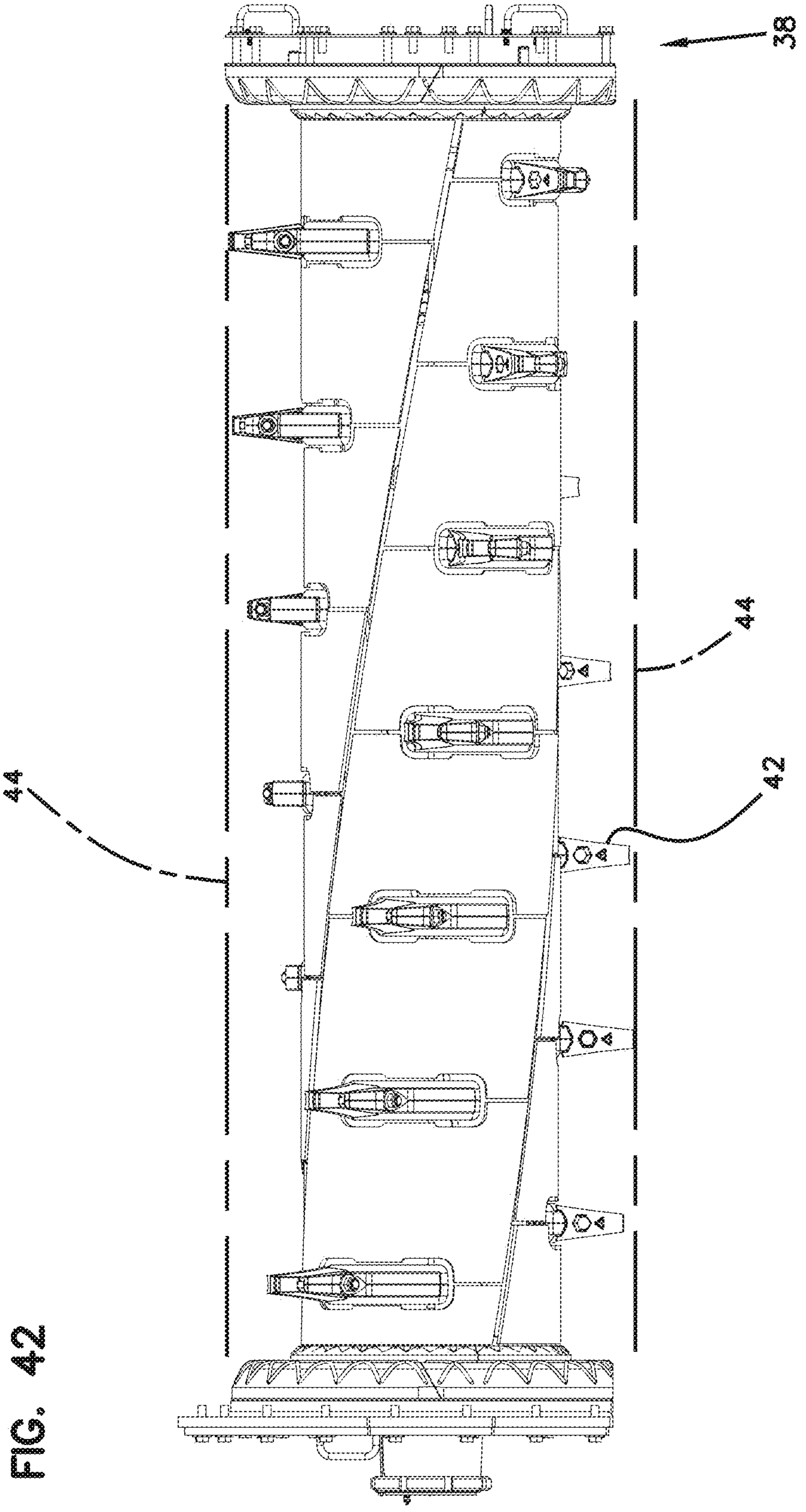
FIG. 42 is a side view of the shredder rotor with the cylindrical reference boundary (e.g., a cylindrical reference envelope) shown surrounding the rotor.

In some embodiments, the shredder comb 58 is configured to cooperate with the shredder rotor 38 to shred material from the upper hopper 32. The shredder comb 58 may be positionable in a shredding position (see FIGS. 12 and 13) where the comb teeth intermesh with the rotor teeth 42, and wherein the comb teeth 60 are located inside a cylindrical reference boundary 44, as defined below. The shredder comb 58 may also be positioned in a relief position (see FIGS. 14 and 15) in which the comb teeth 44 are outside the cylindrical reference boundary 44. As illustrated in FIGS. 27 and 42, the rotor teeth 42 of the shredder rotor 38 may define a cylindrical reference boundary 44 when the shredder rotor 38 is rotated about the rotor axis 40. In some embodiments, when the access door 46 is closed, the shredder comb teeth 60 are positioned to intermesh with the rotor teeth 42 when the shredder rotor 38 is rotated about the rotor axis 40. In some embodiments, the rotor axis 40 may be positioned higher than the service platform 36.

Referring to FIG. 13, when the shredder comb 58 is at the shredding position, the shredder comb teeth 60 can cooperate with the rotor teeth 42 to shred the material desired to be shredded when the shredder rotor 38 is rotated about the rotor axis 40. In contrast, when the access door 46 is in the open position, the shredder comb 58 is displaced laterally outwardly from between the first and second end walls 24, 26 to a shredder comb service location outside the interior of the shredder box 22. Shredder comb 58 may be mounted on access door 46, which can be opened to provide access to the shredder rotor 38. Access door 46 can form at least a portion of a side wall of the shredder box 22 when the access door 46 is closed.

Figure 29:
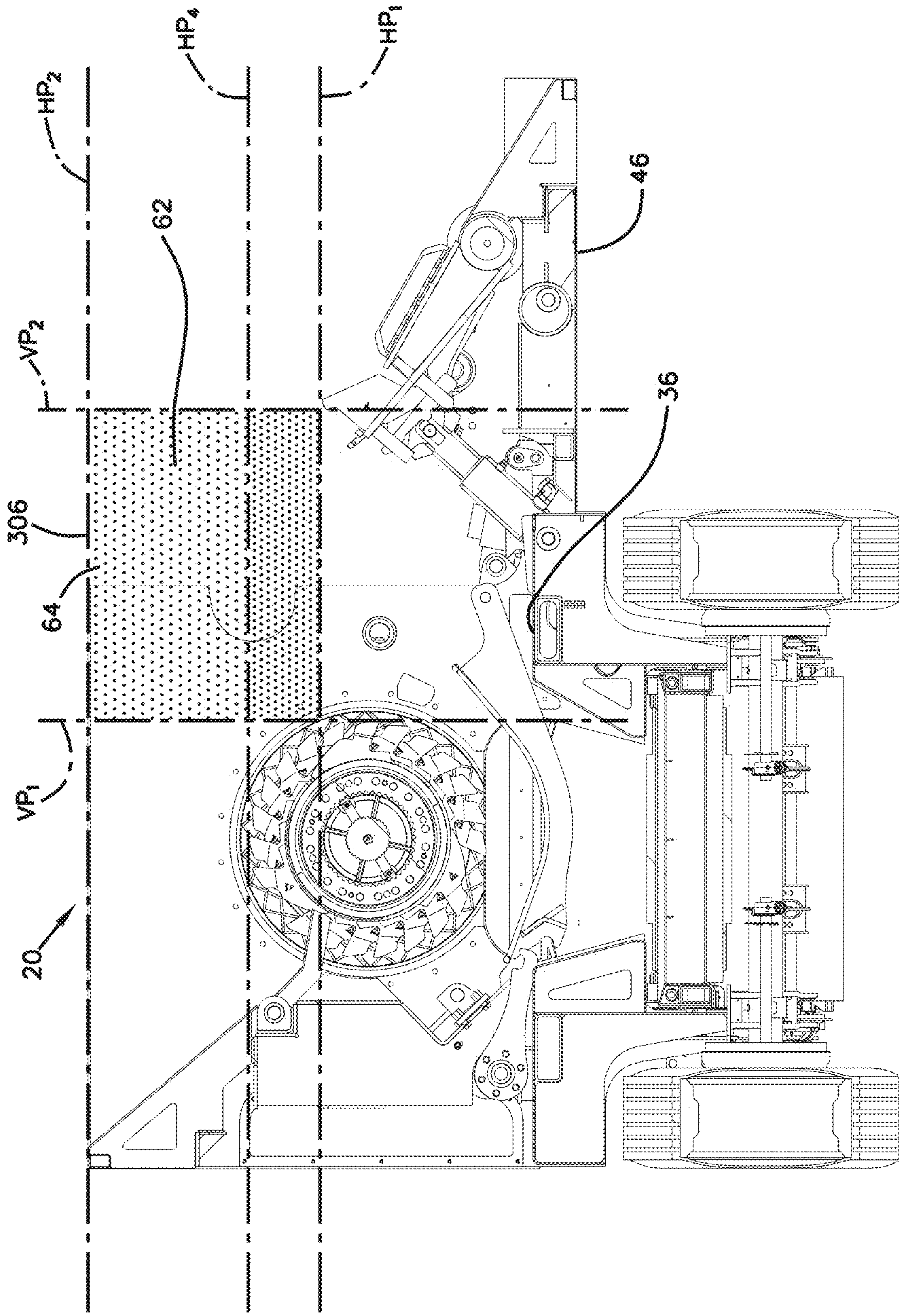
FIG. 29 is a cross-sectional view taken along section line G-G of FIG. 22 showing open space of a side access region of the shredder, the open space is shown shaded.

When access door 46 is in the open position, a side access region 62 is defined for allowing side access to the shredder rotor 38. As seen in FIG. 29, the side access region 62 may include an open space 64 located above the open access door 46 and between the first and second end walls 24, 26. The side access region 62 may be defined between the first and second end walls 24, 26 when the access door 46 is in the open position. The side access region 62 may be configured to provide access to the shredder rotor 38 through the second side of the shredder 20. The open space 64 defined between the first and second end walls 24, 26 may be located at the second side 202 of the shredder 20, and have an open top 306, which is substantially free of obstructions extending between the first and second end walls 24, 26. For example, when the access door 46 is in the open position shown in FIG. 29, there are no structural or frame members that extend from the first end wall 24 to the second end wall 26 in the side access region 62 or in the open space 64.

In some embodiments, and as illustrated in FIG. 29, the open space 64 extends from a first vertical reference plane $VP_1$ that is tangent to the cylindrical reference boundary 44 of the shredder rotor 38, at a location above the service platform 36 to a second vertical reference plane $VP_2$ that extends parallel to or along the rotor axis 40 and is located at the shredder comb 58 (illustrated to the tips of the comb teeth 60). Open space 64 may also be positioned between a lower horizontal reference plane $HP_1$ at a height corresponding to the shredder comb 58 (illustrated to the tips of the comb teeth 60) and an upper horizontal reference plane $HP_2$ at a height corresponding to a top of the upper hopper 32. Open space 64 is also substantially free of obstructions that extend from the first end wall 24 to the second end wall 26.

Figure 33:
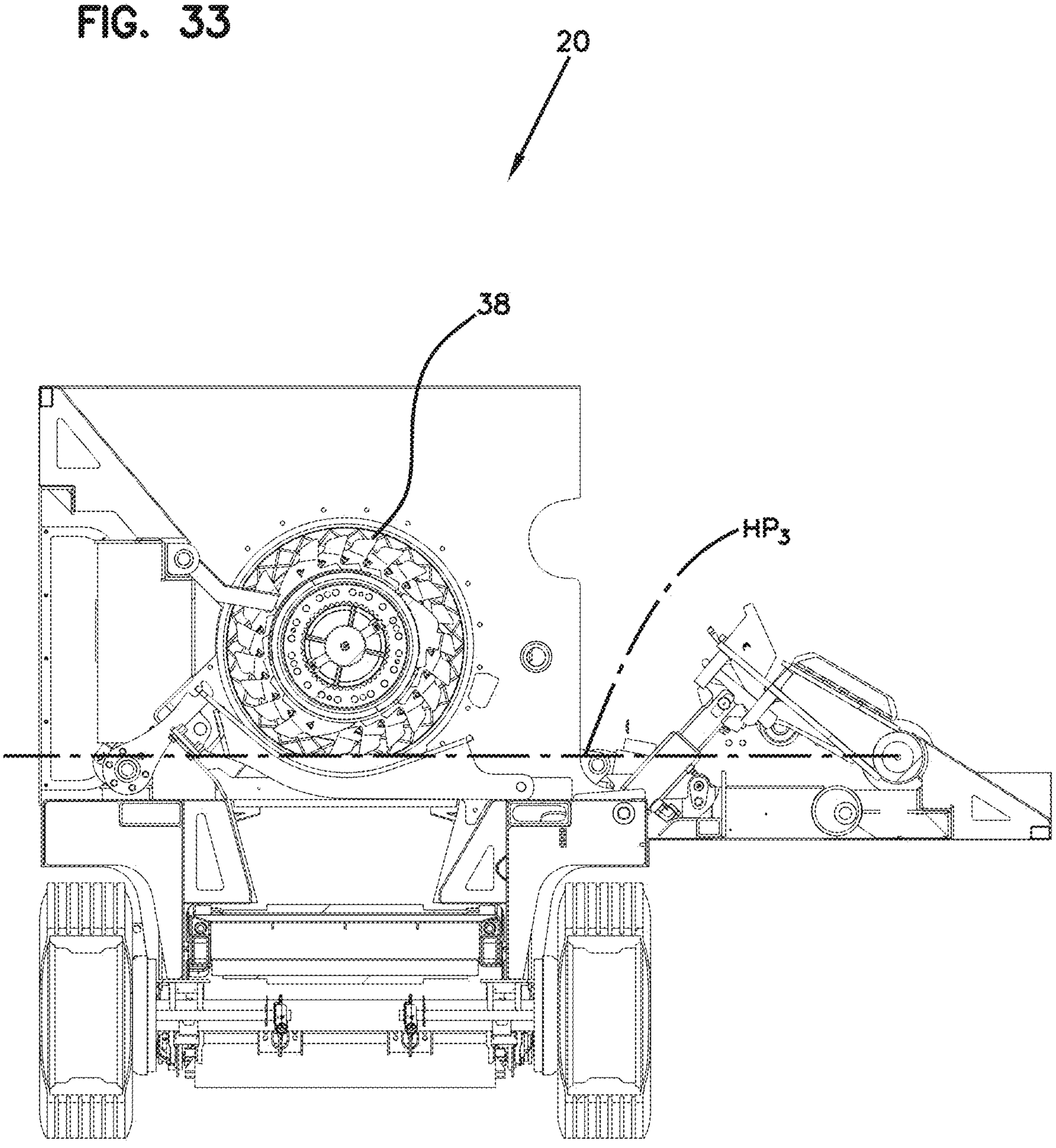
FIG. 33 is a cross-sectional view showing a horizontal reference plane tangent to a lowermost point of the cylindrical reference boundary of the shredder rotor, the service platform is depicted as being lower than the horizontal reference plane.

In another embodiment, the service platform 36 may be below a horizontal reference plane $HP_3$ (see FIG. 33) that is tangent to a lowermost point of the cylindrical reference boundary 44. In yet another embodiment, the service platform 36 may be horizontal. The service platform 36 may also be located adjacent to the lower discharge opening 33 and to an upper end of the lower discharge chute 34.

Figure 31:
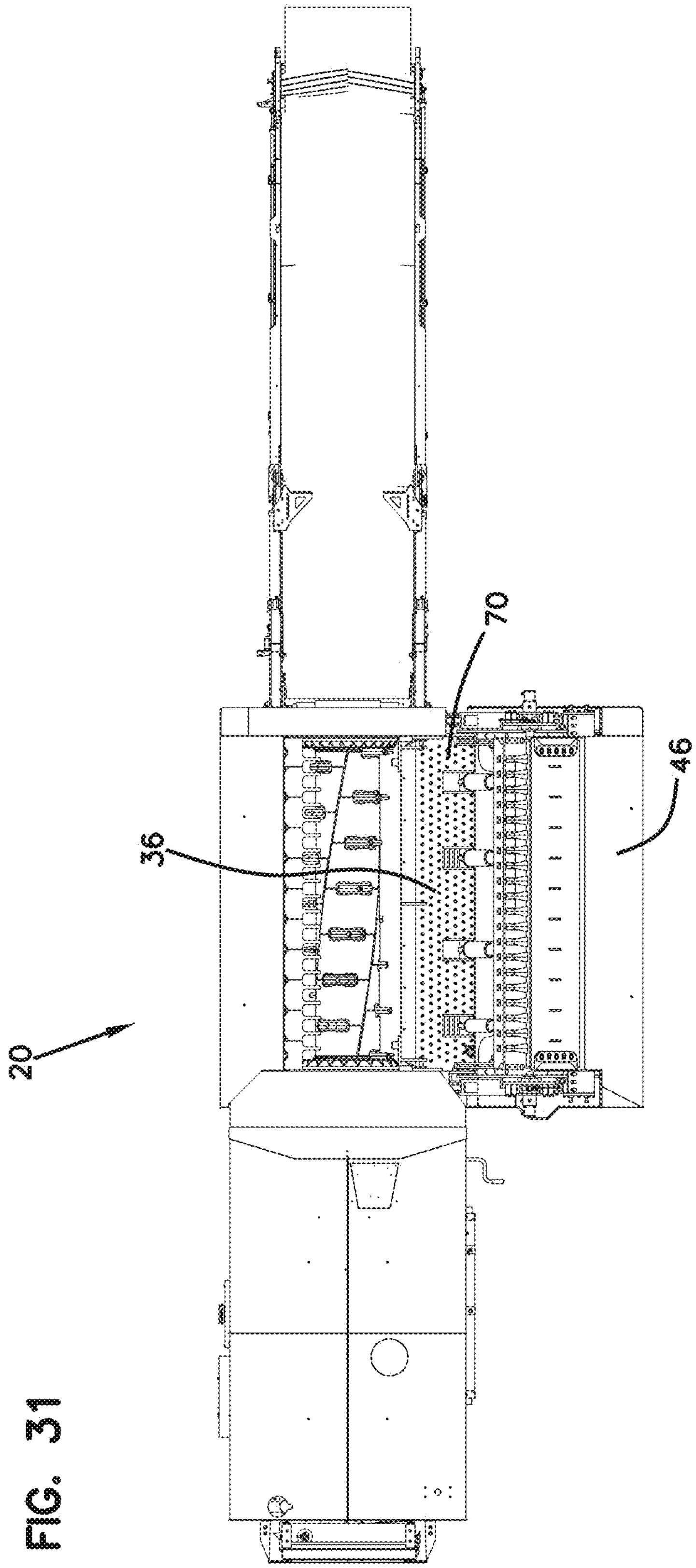
FIG. 31 is a top view of the shredder of FIG. 1 showing an open access region (shown shaded) which is projected vertically upward from a service platform of the shredder.
Figure 32:
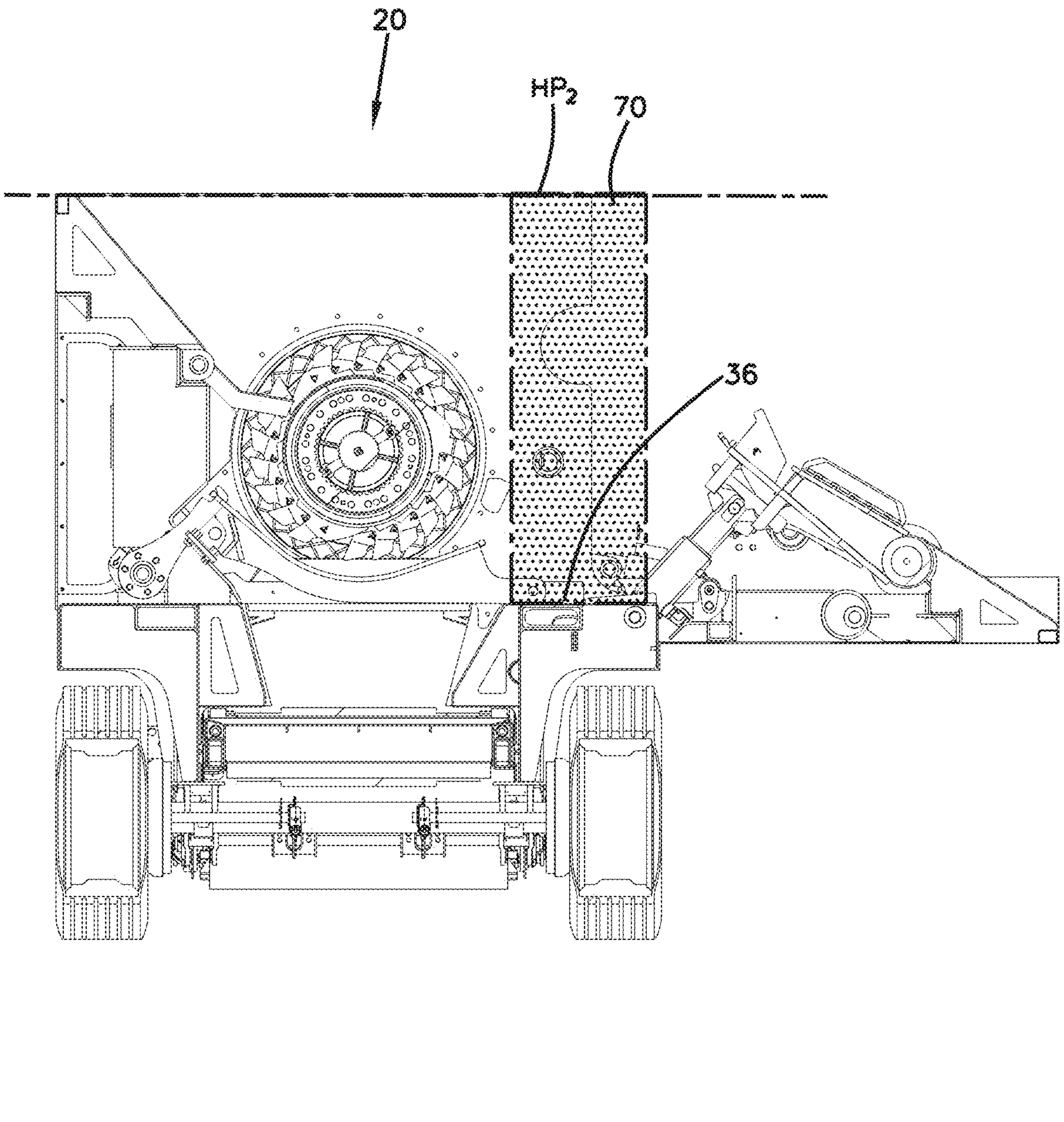
FIG. 32 is a cross-sectional view showing the open access region (shown shaded) of FIG. 31 projected vertically upwardly from the service platform.

In other embodiments, and as shown in FIGS. 31 and 32, when the access door 46 is in the open position, the shredder 20 may define an open access region 70 projected vertically upward from the service platform 36 to the upper horizontal reference plane $HP_2$, with the open access region 70 being free of obstructions extending from the first end wall 24 to the second end wall 26. When the access door 46 is in the open position, there is further defined a substantially flat surface in the form of the service platform 36 and/or the access door 46 itself to stand on for providing service or other maintenance activities.

Figure 30:
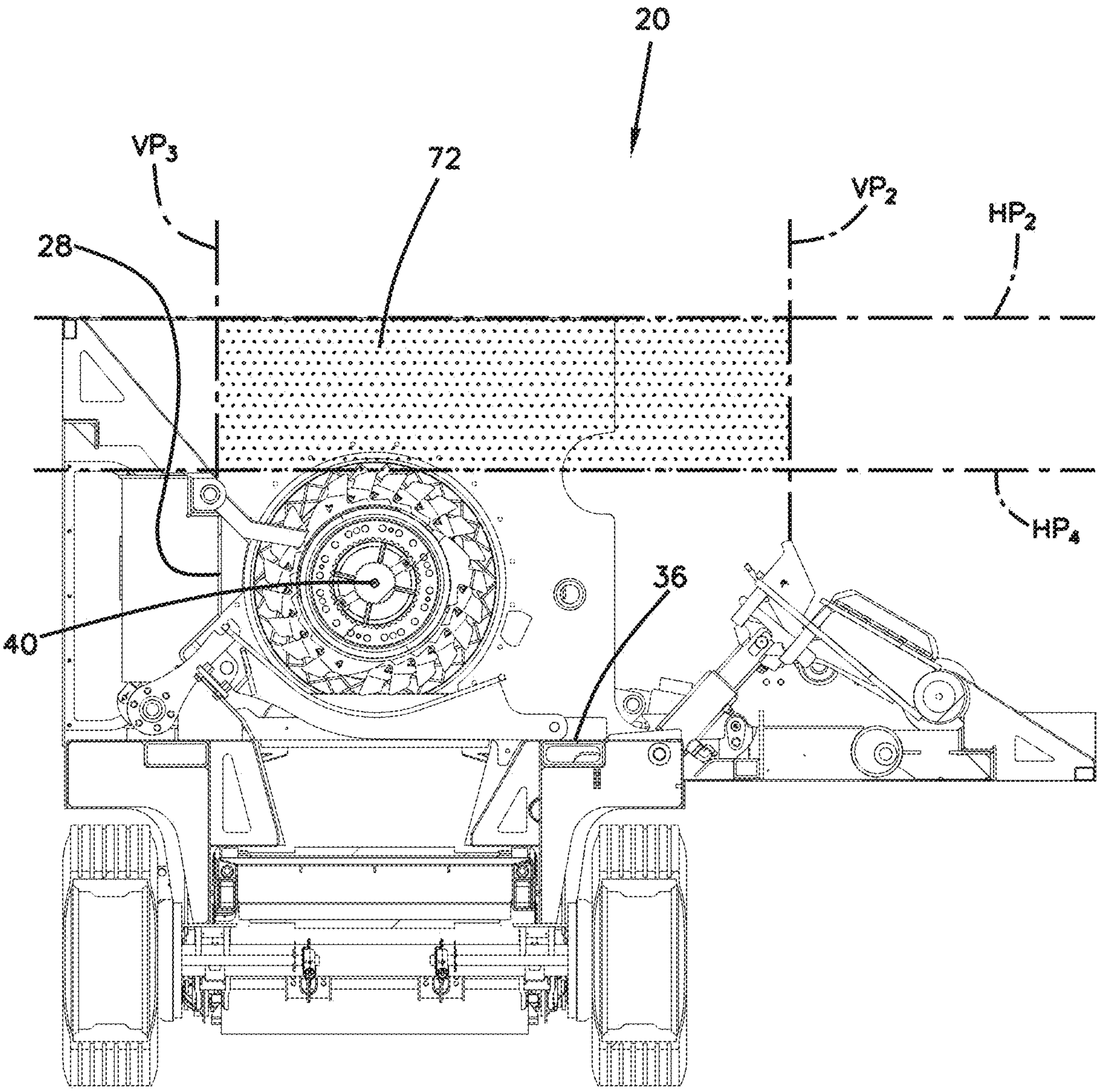
FIG. 30 is a cross-sectional view taken along section line G-G of FIG. 22 showing an open upper region (shown shaded) of the shredder defined when the access door is open.

FIG. 30 shows that when the access door 46 is in the open position, the shredder 20 may define an open upper region 72 extending from a horizontal reference plane $HP_4$ tangent to an uppermost point of the cylindrical reference boundary 44 to the upper horizontal reference plane $HP_2$. The open space 64, as shown in FIG. 29, may extend from a vertical reference plane $VP_3$ at the first side wall 28, over the shredder rotor 38 to a second vertical reference plane $VP_2$ at the comb 58 (illustrated to the tips of the comb teeth 60).

In one embodiment, as shown in FIGS. 7 and 12, the shredder access door 46 carries a hopper defining surface 76 that extends from the shredder comb 58 to the top of the upper hopper 32 when the access door 46 is closed.

Figure 15:
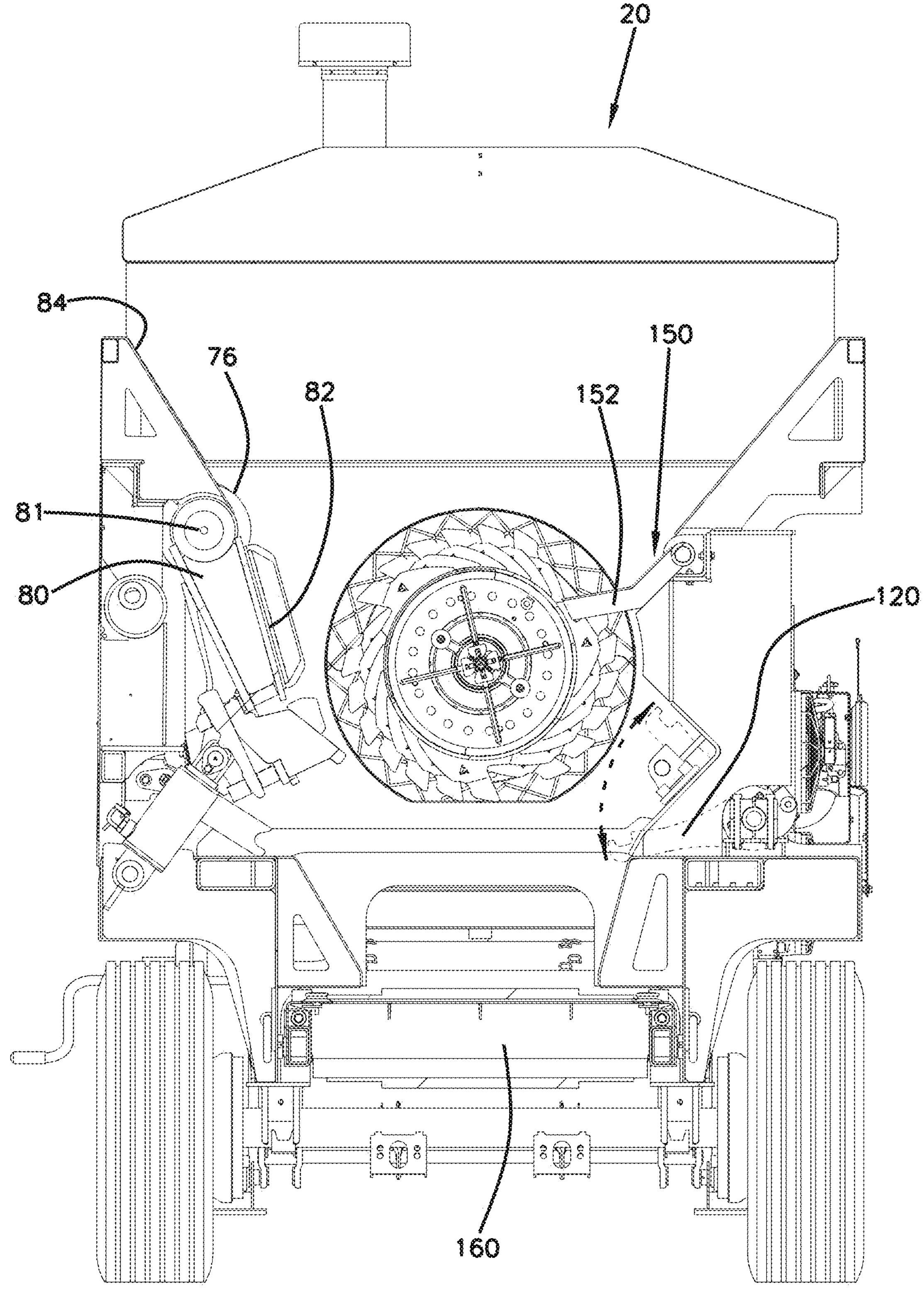
FIG. 15 is a cross-sectional view taken along section line B-B of FIG. 5 showing the shredder comb of the shredder in the overload relief position.

FIGS. 7, 14, and 15 illustrate embodiments where the shredder comb 58 is part of a shredder comb unit 78 carried by the access door 46. The shredder comb unit 78 includes a shredder comb unit frame 80 to which the shredder comb teeth 60 are mounted. The shredder comb unit 78 may be pivotally moveable about an axis 81 relative to a support frame of the access door 46 between the shredding position (see FIGS. 12 and 13) and a relief position (see FIGS. 14 and 15). The axis 81 can be parallel to the rotor axis 40. To allow for pivotal movement of the shredder comb unit 78, the frame 80 can include pivot shafts that are supported within bearings enclosed within bearing housings 410 (see FIG. 7) mounted to the frame of the door 46. When the door 46 is closed, the bearing housings 410 fit within corresponding notches 412 defined by the end walls 24, 26 of the shredder box. The shredder comb unit 78 may also include a first plate structure 82 supported by the shredder comb unit frame 80 above the shredder comb 58. The first plate structure defines a lower portion of the hopper defining surface 76. The access door 46 may also include a second plate structure 84 fixed relative to the support frame of the access door 46. The second plate structure 84 defines an upper portion of the hopper defining surface 76. When the access door 46 is closed and the shredder comb 58 is at the shredding location, the shredder comb teeth 60 may be positioned inside the cylindrical reference boundary 44 of the shredder rotor 38 when the shredder comb unit 78 is in the shredding position. The shredder comb teeth 60 may be located outside the cylindrical reference boundary 44 of the shredder rotor 38 when the shredder comb unit 78 is in the relief position.

As shown in FIGS. 9 and 12, the shredder 20 may also comprise hydraulic cylinder devices 87 for holding the shredder comb unit 78 in the shredding position. The hydraulic cylinder devices 87 can be configured to retract to allow the shredder comb unit 78 to move from the shredding position to the relief position. The hydraulic cylinder devices 87 have first ends 88 pivotally connected to the shredder comb unit 78 and second ends 90 pivotally connected to a base of the shredder box 22. The second ends 90 are pivotal about the door axis 48. FIG. 9 illustrates that the hydraulic cylinder devices 87 may extend through notches 92 defined within the service platform 36.

Figure 21:
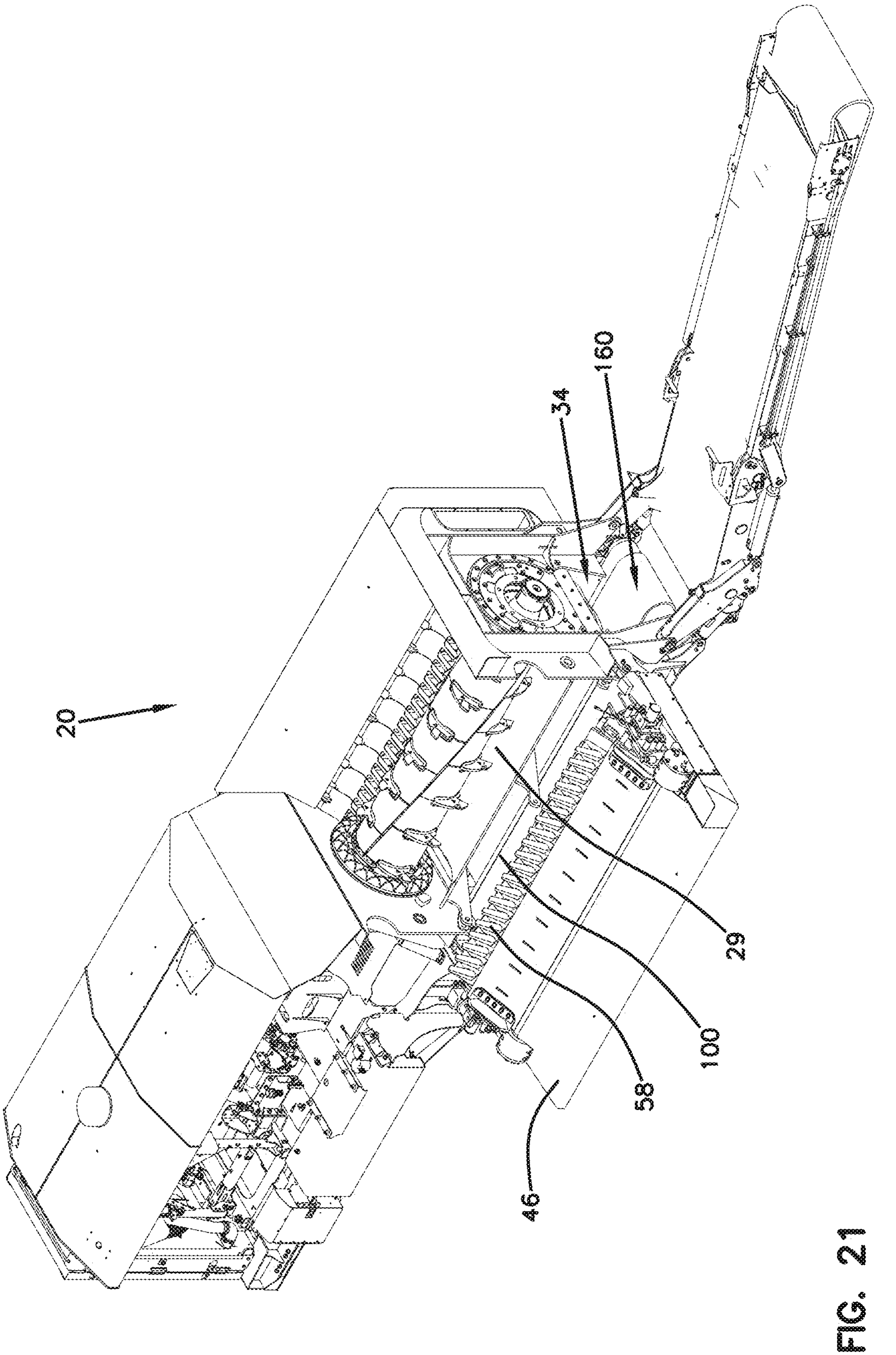
FIG. 21 is a rear, top, left side perspective view of the shredder of FIG. 1 with the access door open and with the screen in a staged position beneath the shredder rotor.
Figure 22:
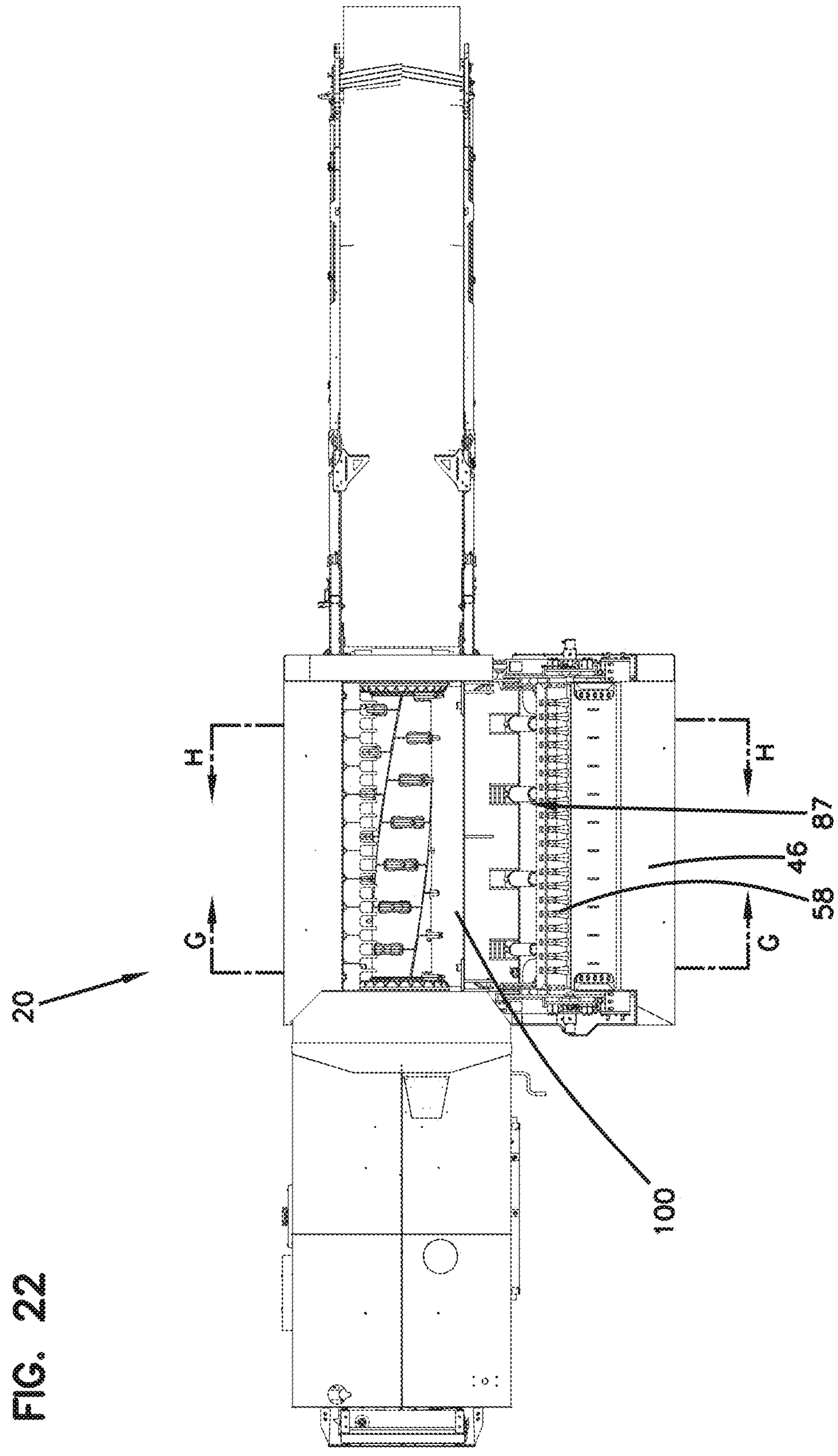
FIG. 22 is a top view of the shredder of FIG. 1 with the access door open and the screen in the staged position beneath the shredder rotor.
Figure 23:
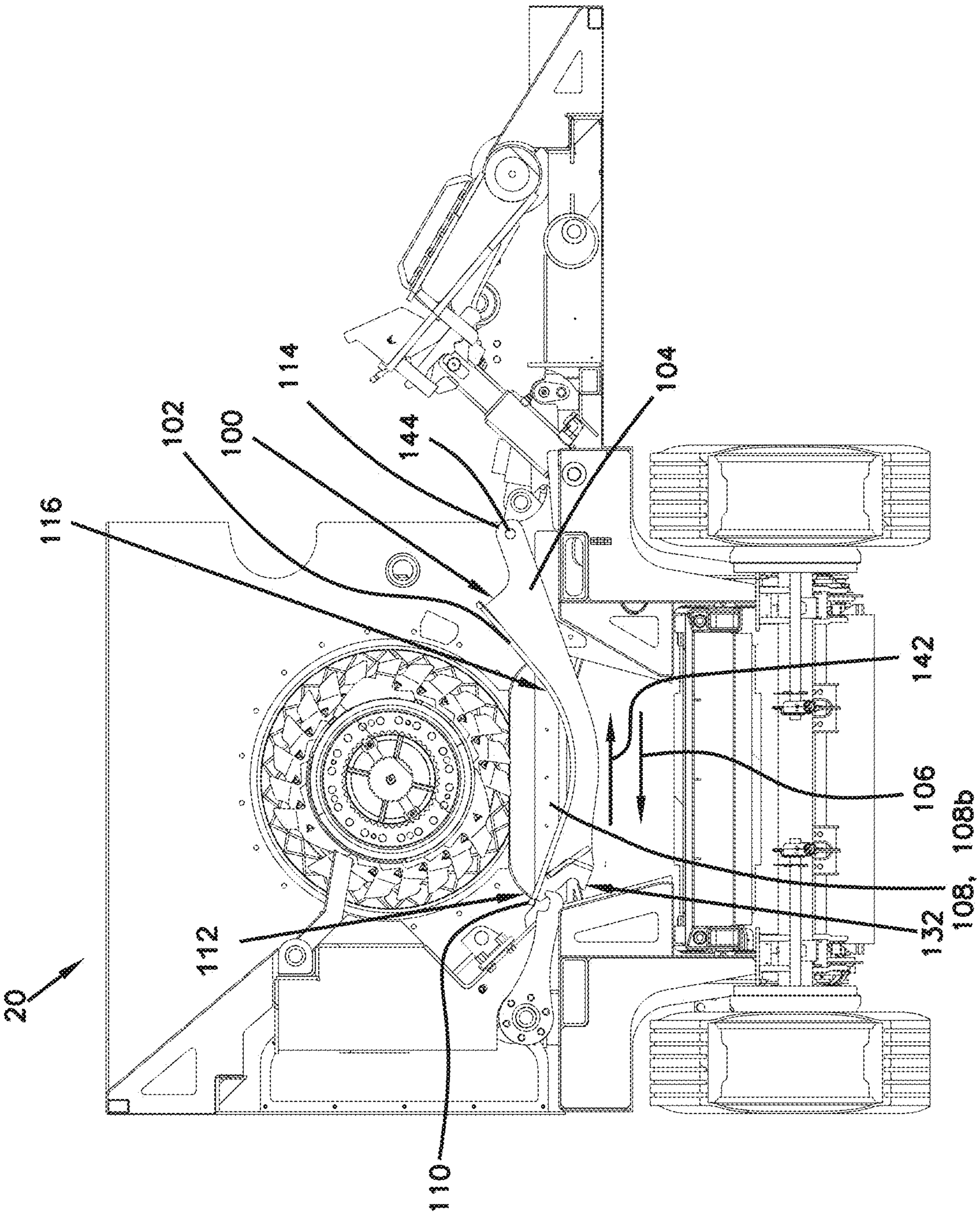
FIG. 23 is a cross-sectional view taken along section line G-G of FIG. 22.

The shredder 20 may further comprise a screen unit 100 that mounts beneath the shredder rotor 38. The screen unit 100 includes a screen section 102 supported by a screen frame 104. For ease of depiction, the screen section 102 is shown as solid, but in reality would define a plurality of screening openings for allowing material to pass through. As shown in FIGS. 19, 20, and 29, when the access door 46 is in the open position, the screen unit 100 can be lowered vertically (e.g., via a crane or other lift equipment in combination with a chain or other structure for attachment to the screen) into the open space 64 between the first and second end walls 24, 26 through an open top of the shredder box 22. Although FIG. 16 illustrates vertical installation of the screen unit 100 with a lift device 220, the screen unit 100 may be installed horizontally by a forklift, truck or other similar machine. As shown in FIG. 23, from the open space 64, the screen unit 100 can be moved or slid beneath the shredder rotor 38 in a screen loading direction 106 extending from the open space 64 toward the first side wall 28. FIG. 21 illustrates that the screen unit 100 may be positioned substantially below a shredder chamber 29, which corresponds to a portion of a swept volume of the teeth mounted to the rotor 38 (i.e., the cylindrical cutting boundary 44). The screen unit 100 may substantially cover the lower discharge opening 33 and the top of the lower discharge chute 34, which may each be approximately as wide as the diameter of the shredder chamber 29 in order to have adequate material flow capacity.

Figure 24:
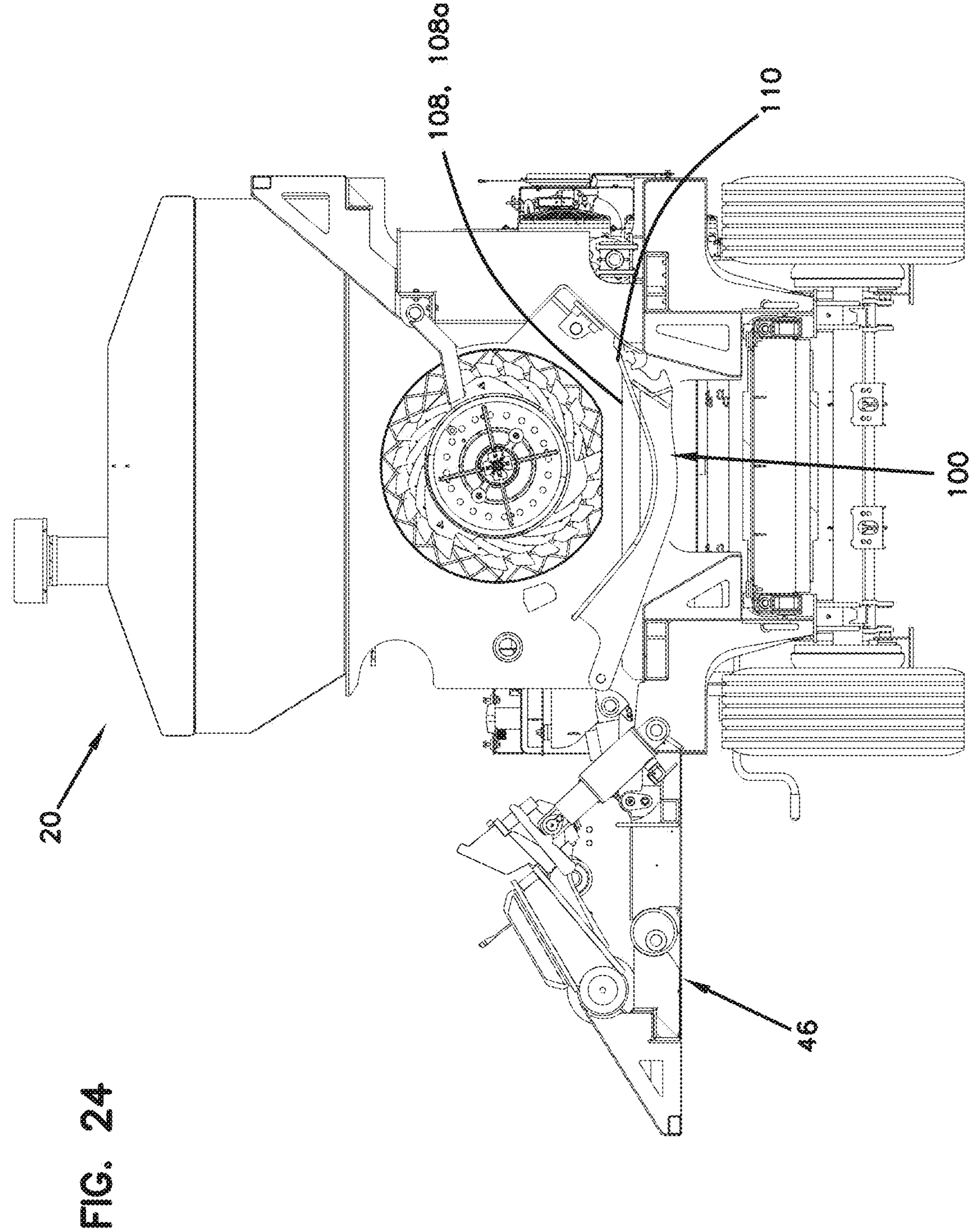
FIG. 24 is a cross-sectional view taken along section line H-H of FIG. 22.

As shown in FIGS. 23 and 24, the shredder 20 may further comprise guide rails 108 for guiding the screen unit 100 at a staged positioned beneath the shredder rotor 38 in the screen loading direction 106. The guide rails 108 may have lengths that extend between the first and second side walls 28, 30. The guide rails 108 may include first and second guide rails 108*a*, 108*b* respectively supported by the first and second end walls 24, 26.

Figure 43:
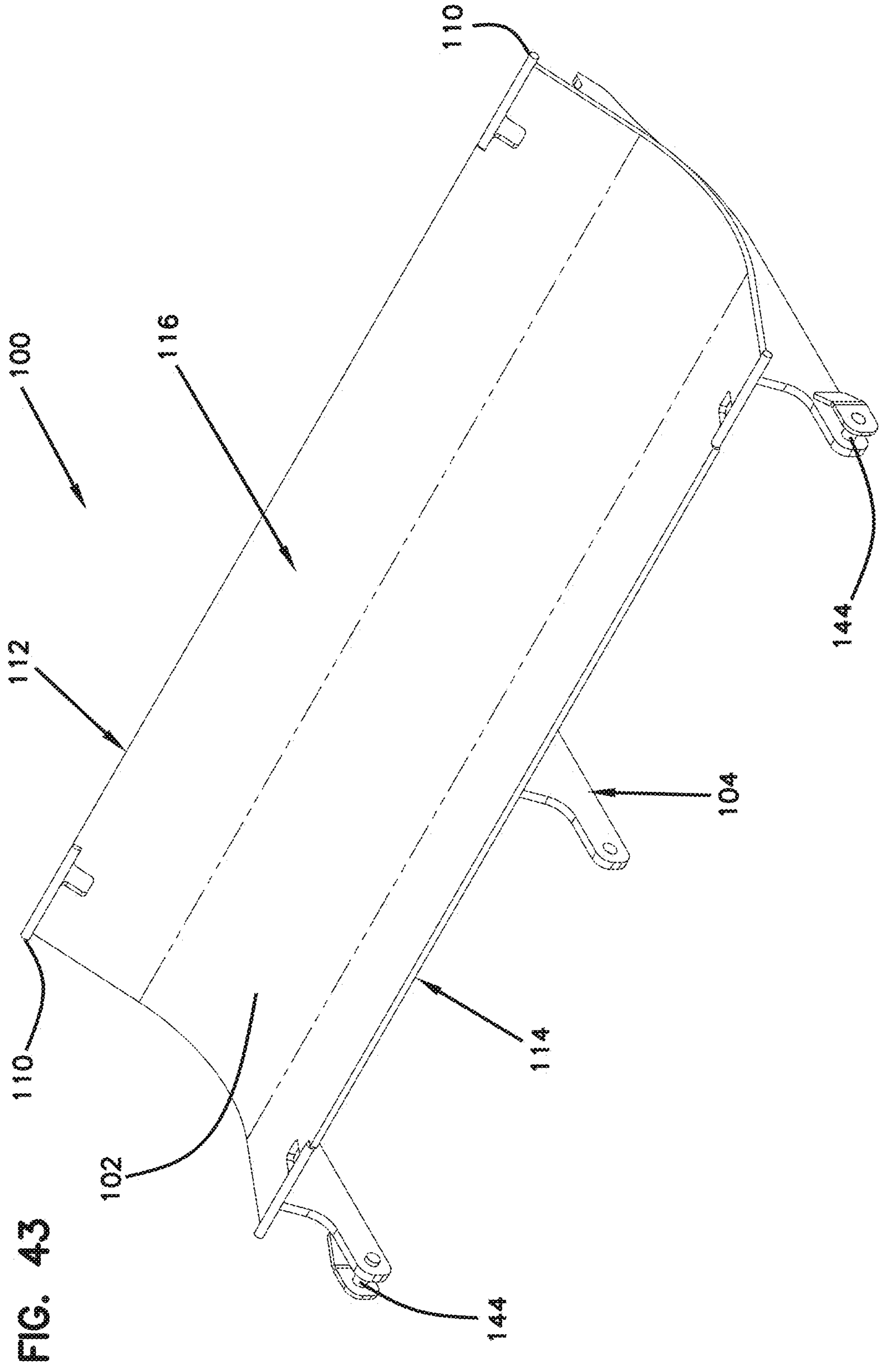
FIG. 43 is a top perspective view of the screen unit.
Figure 44:
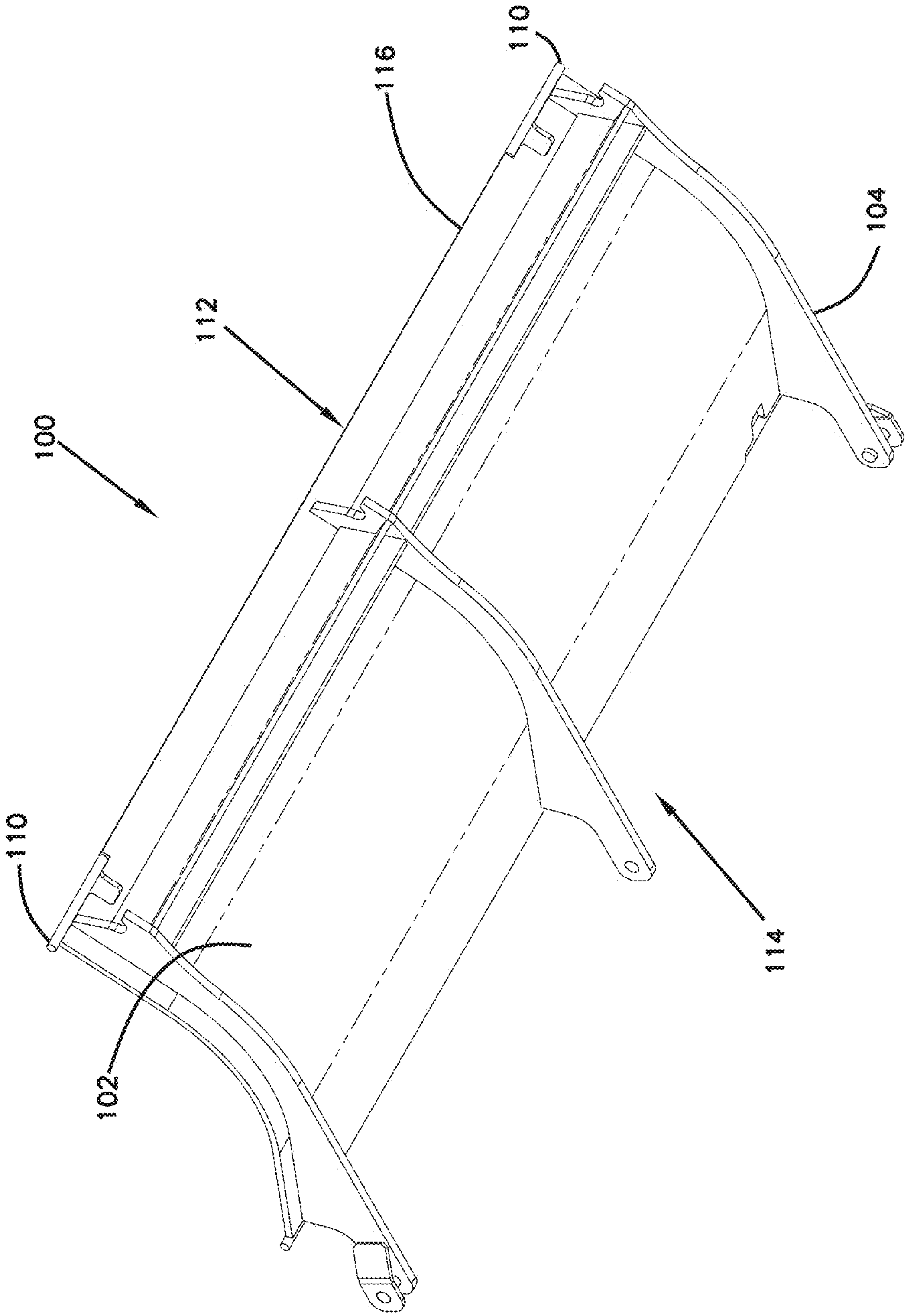
FIG. 44 is a bottom perspective view of the screen unit.

As shown in FIGS. 23-26, screen unit 100 may also include a first pin structure 110 or structures that ride on the first and second guide rails 108*a*, 108*b* as the screen unit 100 is slid beneath the shredder rotor 38. As seen in FIGS. 23, 43, and 44, in one embodiment, the screen unit 100 includes a first end 112 and an opposite second end 114, wherein the first and second ends of the screen unit are respectively positioned adjacent to the first and second side walls 28, 30 of the shredder box 22 when the screen unit 100 is in an installed position beneath the shredder rotor 38, and wherein the first pin structure 110 or structures are positioned adjacent to the first end 112 of the screen unit 100.

Referring to FIGS. 43 and 44, the screen section 102 of the screen unit 100 has an upper surface 116 that curves along a concave curvature as the upper surface 116 extends between the first end second ends 112, 114 of the screen unit 100, wherein the concave curvature is configured to curve about the cylindrical reference boundary 44 of the shredder rotor 38 when the screen unit 100 is in the installed position. The screen section 102 preferably has perforations or a pattern of openings to enable separation of the shredded waste material, and that operate to limit the size of the shredded materials passing through the screen unit 100 to the lower discharge opening 33.

Figure 2:
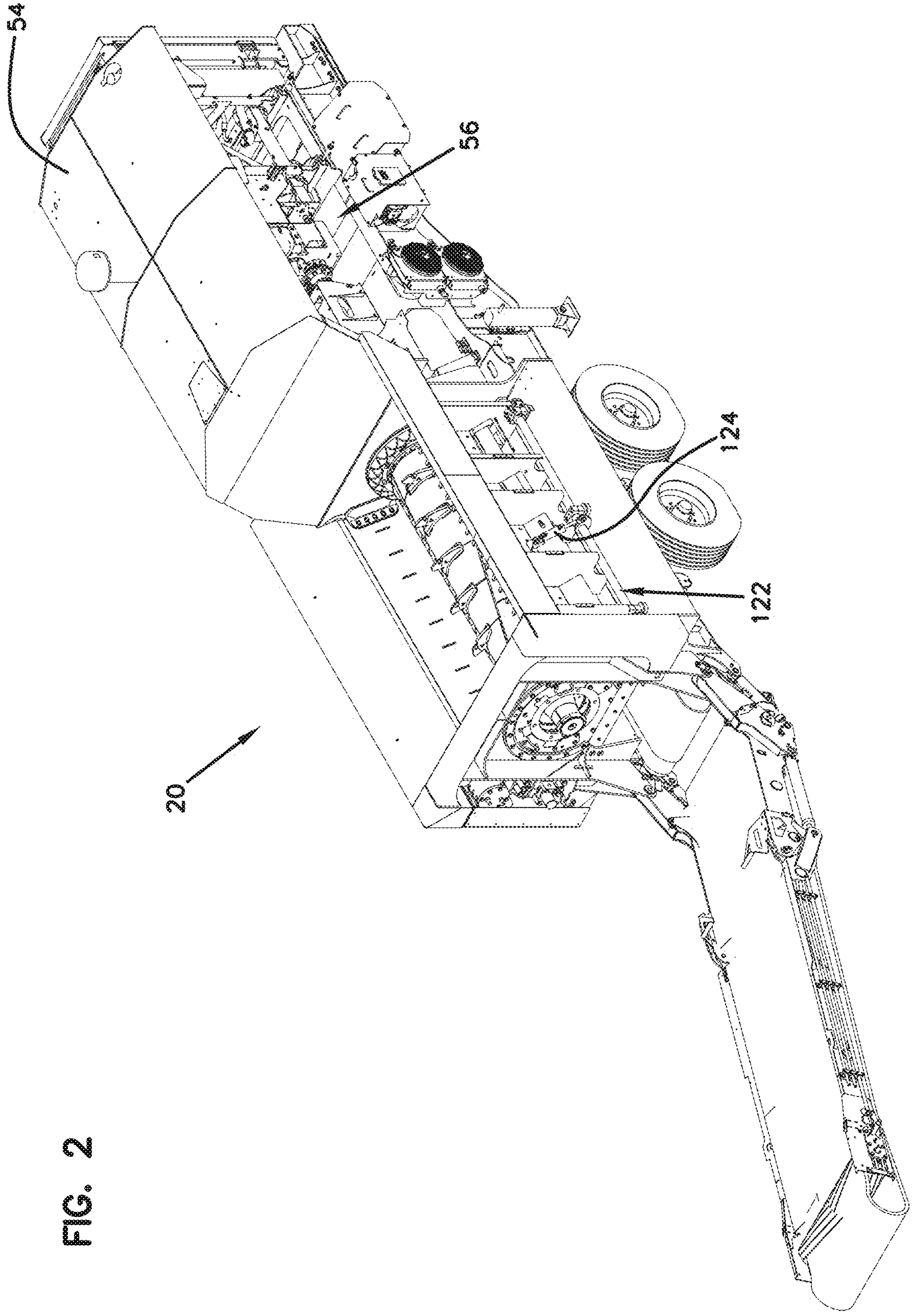
FIG. 2 is a rear, top, right side perspective view of the shredder of FIG. 1.
Figure 25:
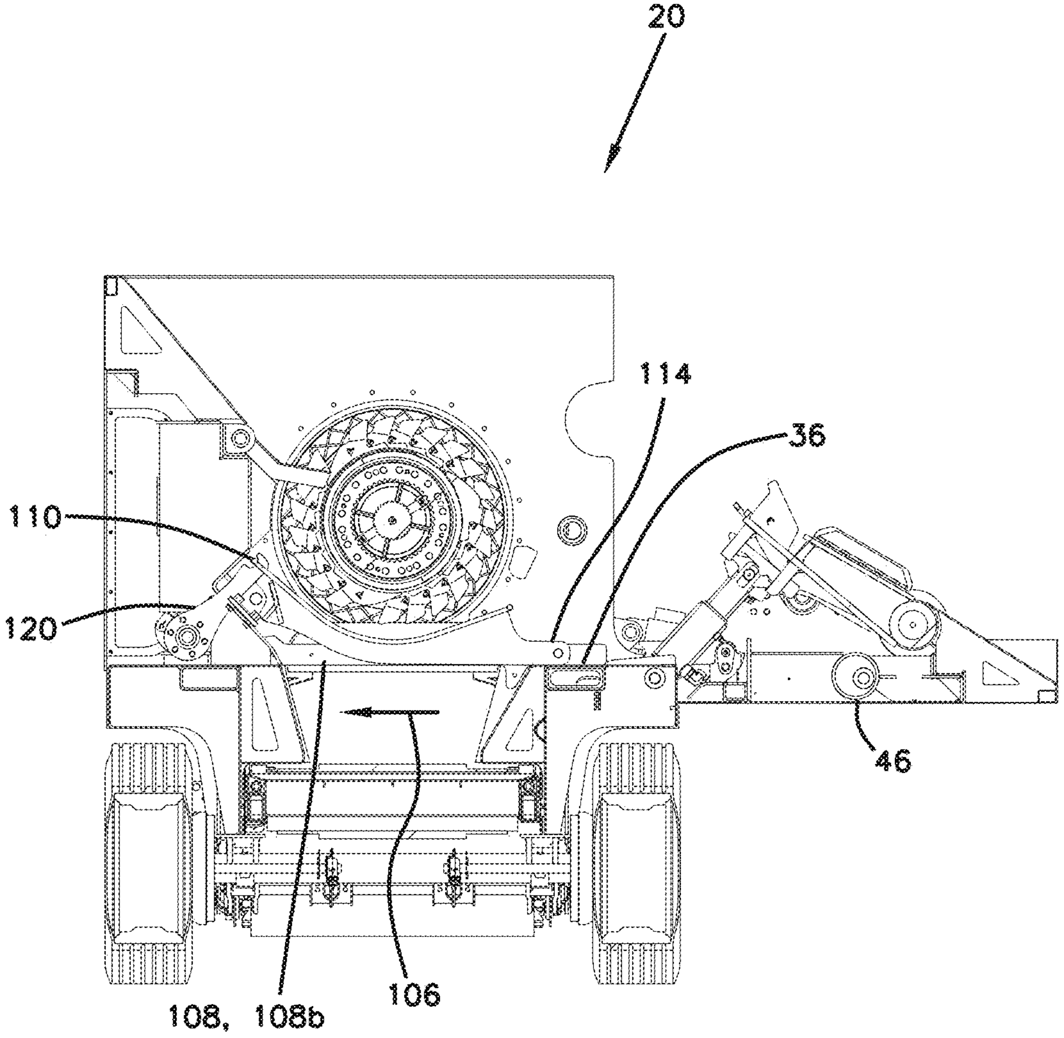
FIG. 25 is a cross-sectional view taken along section line G-G of FIG. 22 with the screen shown lifted by a lift arm assembly to an installed position beneath the shredder rotor.
Figure 26:
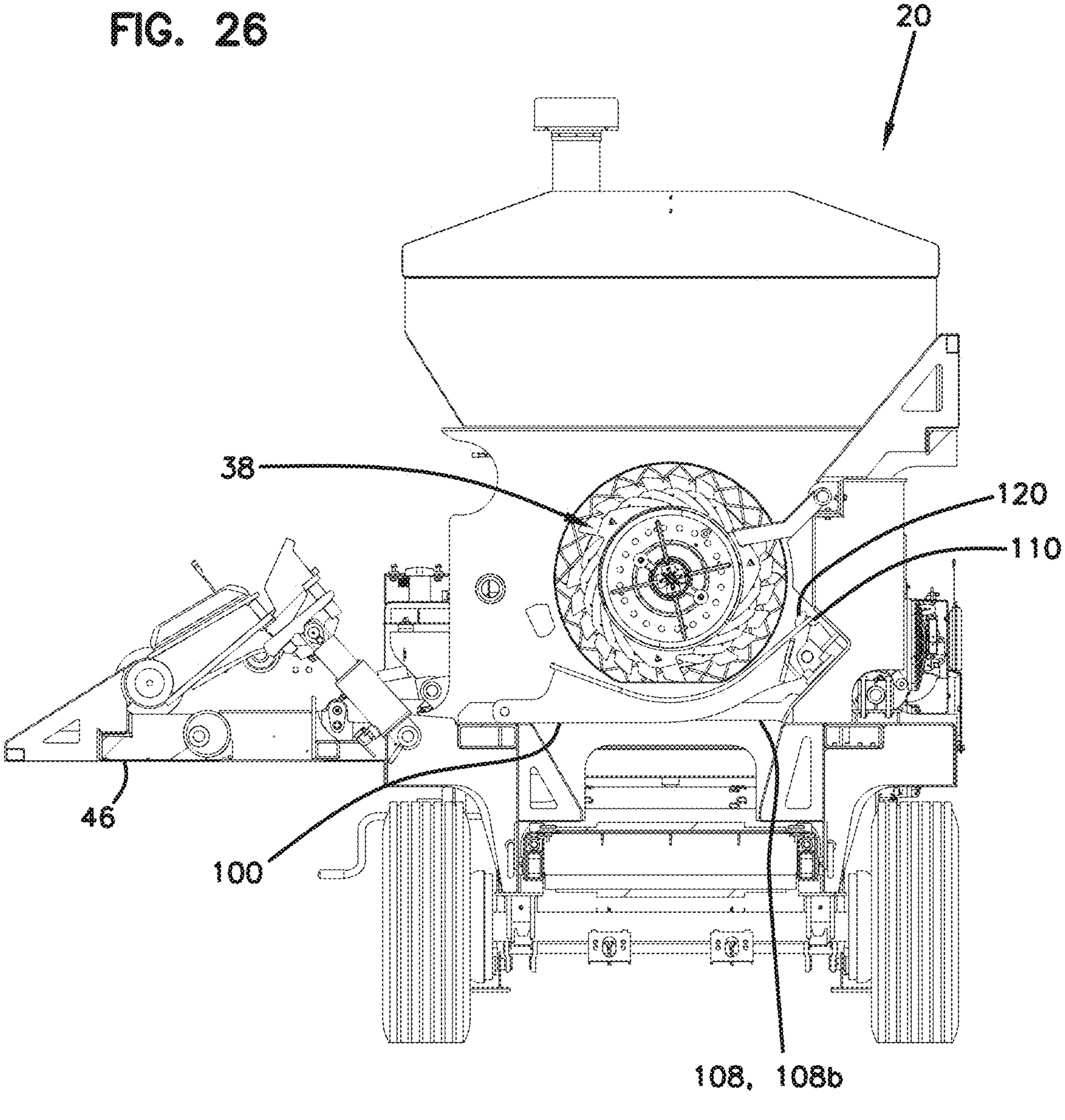
FIG. 26 is a cross-sectional view taken along section line H-H of FIG. 22 showing the screen lifted by the arm assembly to the installed position beneath the shredder rotor.

FIGS. 2, 4, and 13 show that shredder 20 may include at least two lift arms 120 connected by a shaft 122 that is rotated by an activator such as a hydraulic cylinder 124 about an axis 119 to move the lift arms 120 concurrently between first and second positions. The lift arms 120 may be located adjacent the first side of the shredder box 22 for engaging the first pin structure 110 or structures of the screen unit 100 and for moving or lifting the screen unit 100 to the installed position. The lift arms 120 bring the first end 112 of the screen unit 100 into engagement with a positive stop 130 of the shredder box 22 when the screen unit 100 has been lifted to the installed position. As shown in FIGS. 23 and 27, the positive stop 130 may be defined by a positive stop structure of the shredder box 22, where the first end 112 of the screen unit 100 includes a notch 132 that receives the positive stop structure when the screen unit 100 has been moved or lifted to the installed position. FIG. 25 shows that the second end 114 of the screen unit 100 is supported on the service platform 36 when the screen unit 100 is in the installed position.

As shown in FIGS. 37-41, the shredder box 22 may include a first positive stop 130*a* at the first side of the shredder box 28 that engages one end of the screen 100 to stop movement of the screen 100 in the screen loading direction 106 when the screen 100 is moved to the installed position by the lift arms 120. Access door 46 at the second side of the shredder box 22 may carry a second positive stop 130*b* that engages an opposite end of the screen when the access door 46 is closed to stop movement of the screen unit 100 in an unloading direction 142 which is opposite from the loading direction 106. The second positive stop 130*b* may include a link having a first end pivotally connected to the access door 46 and a second end that engages the screen 100 when the access door 46 is closed. In the illustrated embodiment, the lift arms 120 lower the screen 100 and push the screen 100 in the unload direction 142 when the lift arms 120 are moved from the second position to the first position to facilitate unloading the screen 100.

Figure 28:
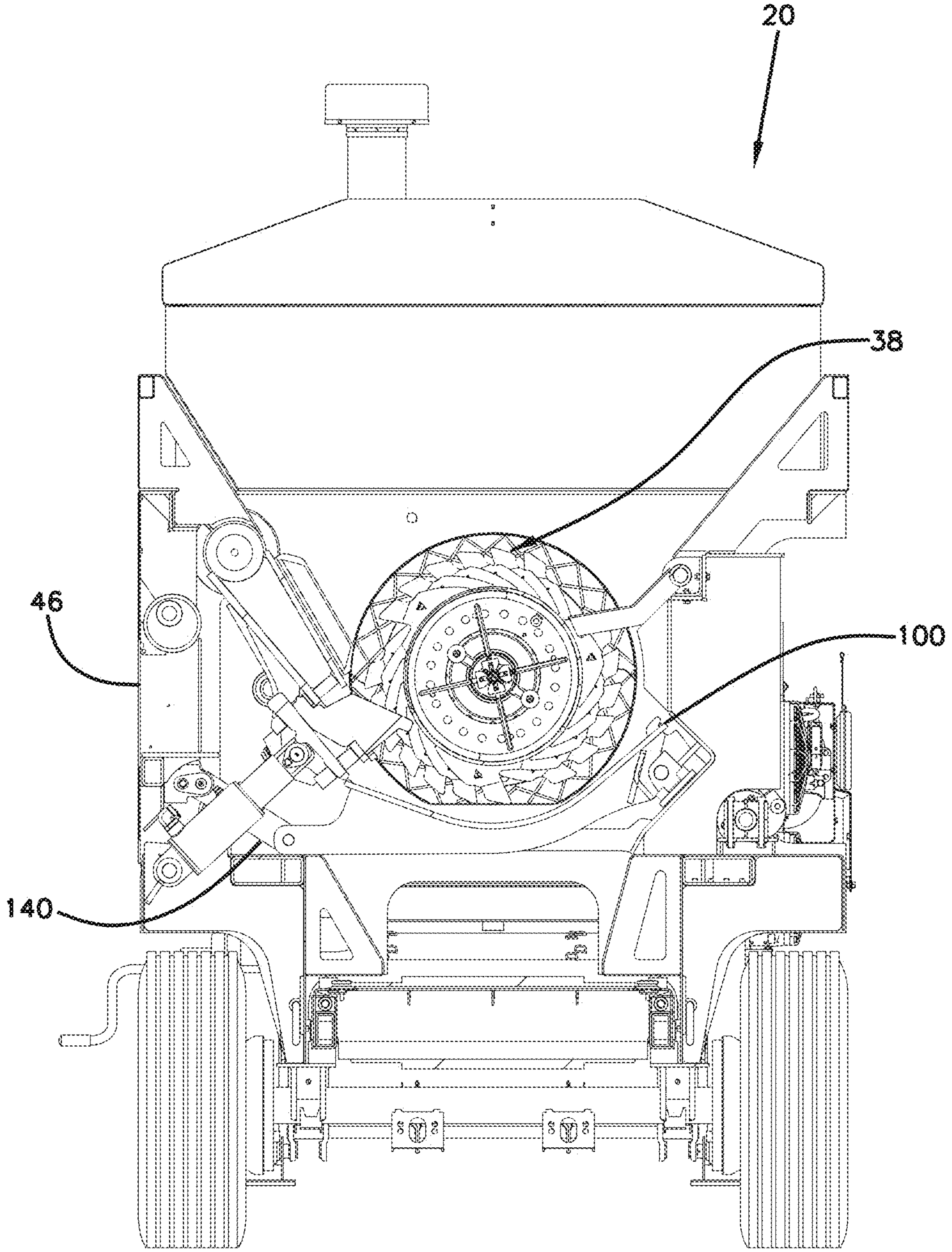
FIG. 28 is a cross-sectional view taken along section line H-H of FIG. 22 with the access door closed and with the screen in the installed position beneath the shredder rotor.

FIGS. 12, 27, and 28 illustrate that a pair of second position stops 130*b* are formed by two of retention links 140. Each screen retention link 140 has a first end pivotally connected to the access door 46 and a second end supported on the service platform 36. When the access door 46 is closed after the screen unit 100 has been installed beneath the shredder rotor 38, the second end of each of the screen retention links 140 slides across the service platform 36 and engages the second end 114 of the screen unit 100 to retain the screen unit 100 in the installed position. To facilitate removal of the screen unit 100 from the shredder box 22, the access door 46 is opened to displace each of the screen retention links 140 from the screen unit 100 and to provide the open space 64 of side access region 62. The lift arms 120 are then lowered to lower the screen unit 100 from the installed position to the staged position beneath the shredder rotor 38. The screen unit 100 is then slid out from beneath the shredder rotor 38 in the screen unloading direction 142 that extends away from the first side wall 28. The screen unit 100 can then be lifted vertically out of the shredder box 22 through the open space 64 of the side access region 62. The screen unit 100 may also include a second pin structure 144 or structures at the second end 114 of the screen unit 100, as seen in FIGS. 16 and 27. The second end of each of the screen retention links 140 engages one or more second pin structures 144 (see FIG. 43) when the access door 46 is closed.

Figure 3:
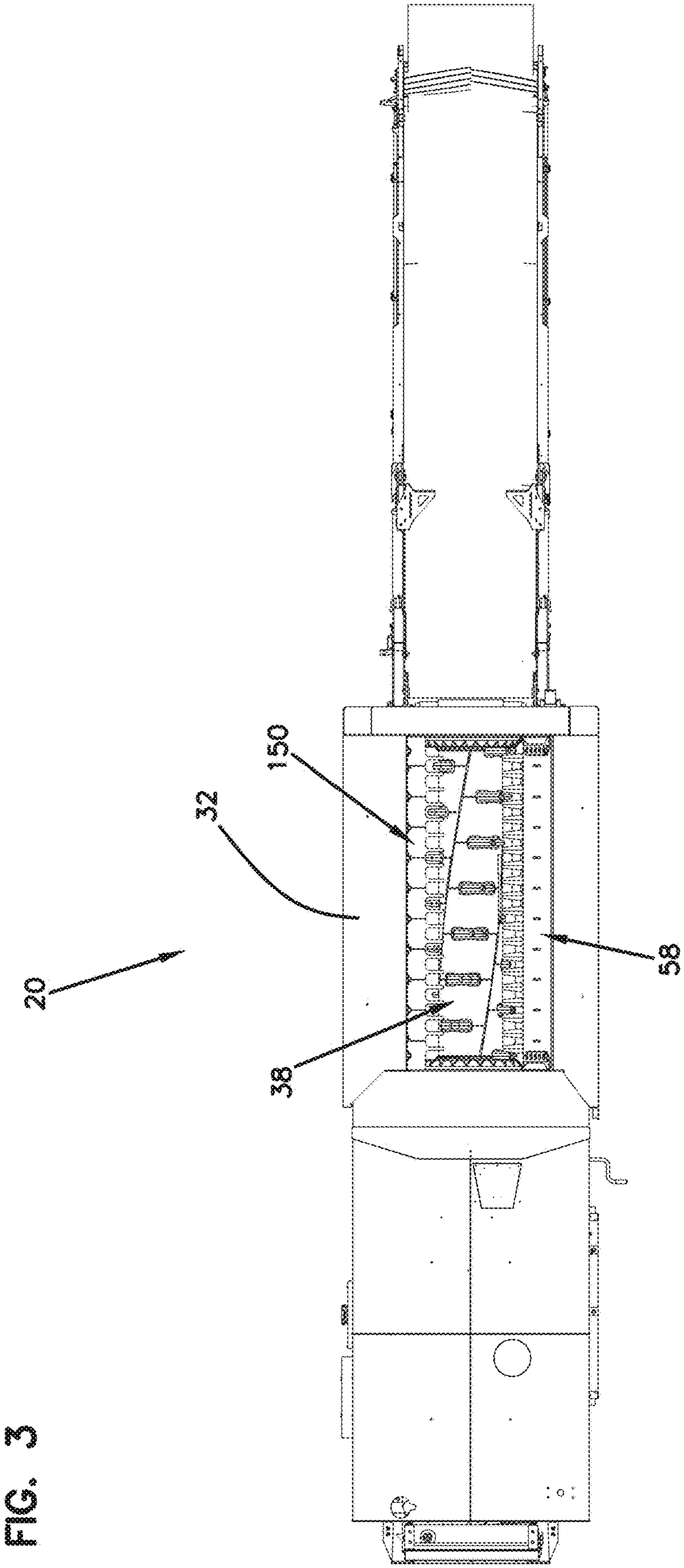
FIG. 3, is a top view of the shredder of FIG. 1.

The shredder 20 may further comprise a flow control comb 150 pivotally connected to the first side wall 28. As shown in FIGS. 1 and 3, the flow control comb 150 intermeshes with the shredder rotor 38 to prevent material desired to be shredded from moving from the upper hopper 32 downwardly to a region between the shredder rotor 38 and the first side wall 28. The flow control comb 150 also has comb elements that can pivot upwardly relative to the first side wall 28 to allow material to be recirculated by the shredder rotor 38 upwardly past the flow control comb 150 and back into the upper hopper 32.

Figure 34:
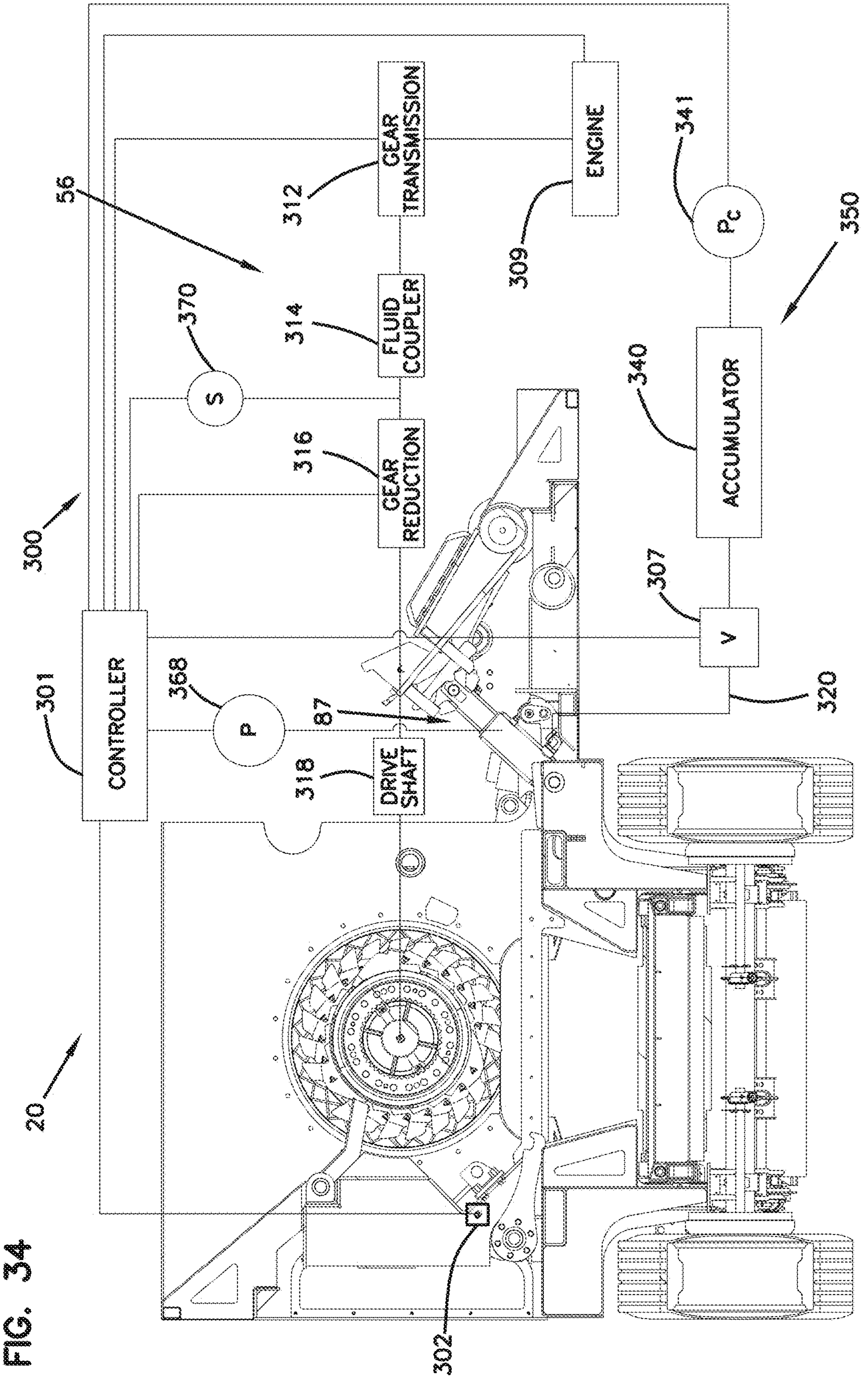
FIG. 34 is a schematic view showing an example drive and control system for the shredder.

FIG. 34 illustrates a control system 300 for monitoring various parameters and controlling various systems of the shredder 20. The control system 300 may include a controller 301 that may include a computer comprising at least one central processing unit ("CPU") with processing capability, a system memory, and a system bus that couples the system memory to the CPU. The system memory includes a random access memory ("RAM") and a read-only memory ("ROM"). A basic input/output system that contains the basic routines that help to transfer information between elements within the control computer, such as during startup, is stored in the ROM. The control computer may further includes a mass storage device. The mass storage device is able to store software instructions and data. The system memory may include instructions which, when executed by the processing unit, cause the electronic computing device to execute various programs from the control system 300. In other examples, the controller may include one or more micro-processors and may include digital or analog controls.

In certain examples, the control system 300 may interface with the power train 56 (i.e., a drive system) to control rotation of the shredder rotor 38. The control system 300 may also interface with various sensors (e.g., pressure sensors, proximity sensors, torque sensors, rotational speed sensors) to monitor operation of the shredder 20 and to implement different functionalities (e.g., auto-reverse for rotor when overload conditions are detected; comb higher relief-pressure operating mode when a screen-presence parameter is detected; etc.) to enhance operation of the shredder 20. A shredder comb higher relief-pressure operating mode may be manually initiated by the operator when no screen is installed, or the shredder comb higher relief-pressure operating mode may automatically activate when installation of the screen 100 is indicated. In certain examples, the control system 300 may include a controller 301 that controls the shredder comb 58 operating mode. Shredder comb 58 may be operable in a first, higher pressure-relief operating mode or in a second, lower pressure-relief operating mode.

When the shredder comb 58 is in the first, higher relief-pressure operating mode, the shredder comb 58 is moveable from the shredding position to the relief position upon a first predetermined pressure observed at the shredder comb 58 and created by material being shredded, to allow an obstruction (e.g., an un-shreddable piece of material) to pass between the shredder comb 58 and the shredder rotor 38. When the shredder comb 58 is in the second, lower relief-pressure operating mode, the shredder comb 58 is moveable from the shredding position to the relief position upon a second predetermined pressure observed at the shredder comb 58 and created by material being shredded to allow an obstruction to pass between the shredder comb 58 and the shredder rotor 38. The second predetermined pressure is lower than the first predetermined pressure. For example, the first predetermined pressure can range from 2,500 to 2,700 psi and the second predetermined pressure can range from 1,100 to 1,600 psi.

In some instances, the first higher pressure-relief mode could include the shredder comb 58 being in a hydraulically-locked operating mode, in which the shredder comb 58 is prevented from moving from the shredding position to the relief position in response to an overload condition. In certain examples, the controller 301 may activate an automatic reversing of the shredder rotor 38 in either or both of the first or second operating modes.

Figure 8:
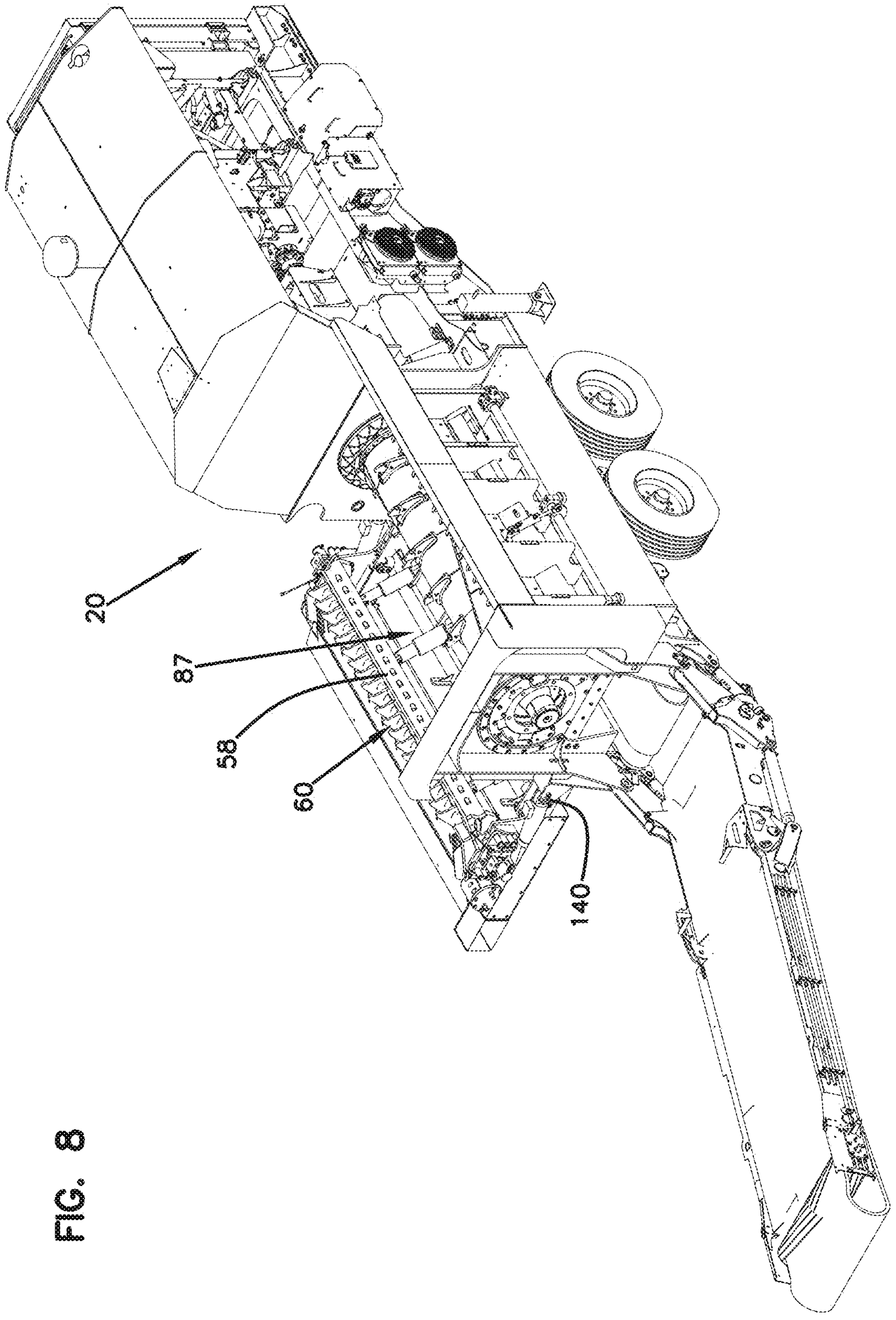
FIG. 8 is a rear, top, right side perspective view of the shredder of FIG. 1 with the access door in the open position.

As described previously and as depicted in FIGS. 8-9 and 22, the shredder 20 includes one or more hydraulic cylinder devices 87 (a plurality of hydraulic cylinder devices 87 is depicted) for retaining the shredder comb 58 in the shredding position. The hydraulic cylinder devices 87 each include a hydraulic cylinder and a piston rod that is reciprocally moveable within the hydraulic cylinder. Referring to FIG. 34, a fluid line 320 or lines fluidly connect the hydraulic cylinders devices 87 to an accumulator 340. The pressure in the accumulator 340 is set by a pressure controller 341, which is controlled by the controller 301. A valve 307 is positioned along the fluid line 320 between the accumulator 340 and the hydraulic cylinder devices 87. In either the first or second operating mode, the valve 307 is open so that fluid communication is provided between the hydraulic cylinder devices 87 and the accumulator 340.

In either mode, when the force applied to the comb 56 by the rotor 38 generates a hydraulic pressure in the hydraulic cylinder that exceeds the set system or accumulator pressure, the hydraulic cylinder devices 87 are forced to retract causing hydraulic fluid to flow from the hydraulic cylinders 87 toward the accumulator 340. Retraction of the hydraulic cylinder devices 87 allows the comb 56 to move from the shredding position to the relief position. Once the load on the comb 56 subsides, hydraulic pressure from the accumulator 340 forces the hydraulic cylinder devices 87 to extend, thereby moving the comb 56 back to the shredding position. The accumulator 340 forms part of a hydraulic pressure relief arrangement 350 of the system.

In certain examples, the control system 300 is adapted to monitor a parameter for indicating the presence or absence of a screen at the screen mounting location beneath the rotor 38. In certain examples, the parameter can be a reading from a sensor (e.g., a proximity sensor) that detects the actual presence of a screen (as indicated by a positive sensor reading) or absence of a screen (as indicated by a negative sensor reading). In other examples, the parameter can be a reading from a sensor that senses a condition indicative of a screen being mounted at the screen mounting location. For example, in the system of FIG. 34, a sensor 302 (e.g., a proximity sensor, a rotary position sensor, etc.) monitors the position of the lift arms 120. In this case, the condition indicative of the screen being in place beneath the rotor 38 is the positioning of the arms 120 in the upper position (see FIG. 25). The controller 301 interfaces with the sensor 302 and therefore constantly monitors whether a screen has been installed based upon the position of the lift arms 120. Based on the sensed status of the parameter relating to the presence of the screen beneath the rotor 38, the controller can selectively enable the first or second operating mode for the system.

For example, if the sensed parameter indicates the presence of a screen, the system can be operated with the comb 58 in the first or higher pressure-relief mode. In contrast, if the sensed parameter indicates the absence of a screen, the system can be operated with the comb 58 in the second or lower pressure-relief mode. Thus, the control system 300 may allow for automatically operating the shredder 20 with the shredder comb 58 in the first operating mode when the parameter indicates that the screen unit 100 has been installed at the screen mounting location. The control system 300 may additionally allow for automatically operating the shredder 20 with the shredder comb 58 in the second operating mode when the parameter indicates that the screen unit 100 has not been installed at the screen mounting location. The control system 300 can automatically program the functionality of the power train 56 to operate in an auto-reverse mode in the event an overload condition is detected at the rotor 38.

Figure 50:
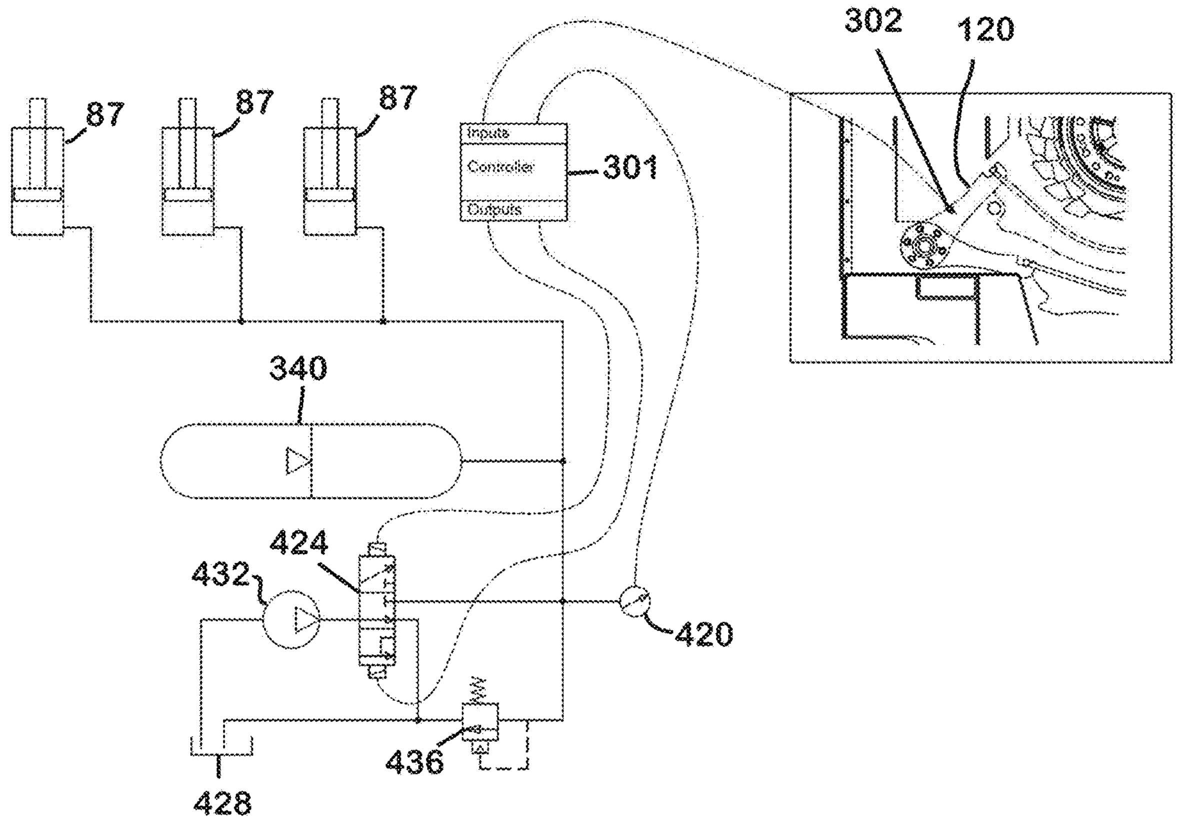
FIG. 50 is a first exemplary hydraulic circuit for controlling shredder comb relief.

Referring now to FIG. 50, a first example of a hydraulic circuit operable with the above-described comb relief operating modes is provided. The controller 301 receives input from one or more proximity sensors 302 that monitor the position of the lift arms 120. In the illustrated circuit, the arm 120 being positioned adjacent the proximity sensor 302 is indicative of the shield unit 100 being present, and therefore the circuit would control operation in the first, higher pressure-relief operating mode. The controller 301 further receives input from a system pressure sensor 420 to determine when the system achieves the first predetermined pressures above which the comb 58 would overcome the system pressure to move to the relief position. The controller 301 outputs a signal to control a 3-position valve 424 (e.g., the implement valve). By opening or closing the valve 424, the system pressure can be controlled to arrive at the desired predetermined pressure by forcing more fluid into the accumulator 340 (i.e., from the tank 428 by the pump 432) or by removing fluid from the system. A pressure relief valve or safety block 436 is provided in the circuit and can be set at a pressure that is higher than either of the first or second predetermined pressures (e.g., 2,755 psi).

Figure 51:
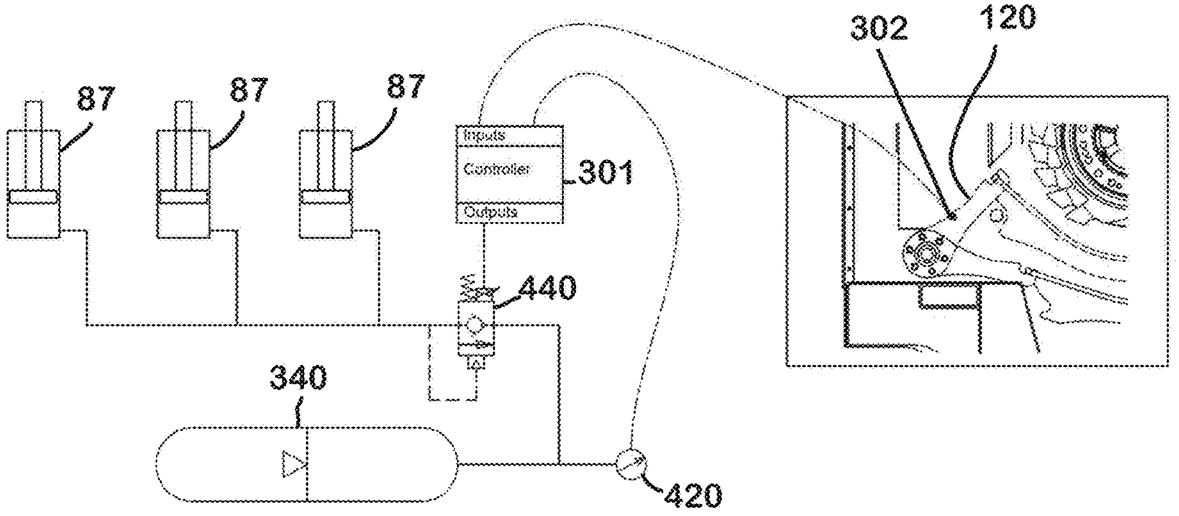
FIG. 51 is a second exemplary hydraulic circuit for controlling shredder comb relief.

FIG. 51 illustrates a second example of a hydraulic circuit operable with the above-described comb relief operating modes. Like parts have been given like reference numerals. With the circuit of FIG. 51, the proximity sensor 302 inputs to the controller 301 are the same, and the pressure sensor 420 reads the pressure in the accumulator 340. The controller 301 outputs a signal to control the pressure relief setting of a pressure control valve 440. Depending upon the operating mode, the controller 301 can set the pressure relief setting of the valve 440 to either of the first or second predetermined pressures depending upon the input from the proximity sensor 302. The pressure in the accumulator 304 can be maintained at a lower pressure (e.g., 750 psi) suitable to move the comb 58 back to the shredding position after the overload condition has subsided. While not shown, a pressure relief valve or safety block can be provided in the circuit and can be set at a pressure that is higher than either of the first or second predetermined pressures (e.g., 2,755 psi).

Figure 45A:
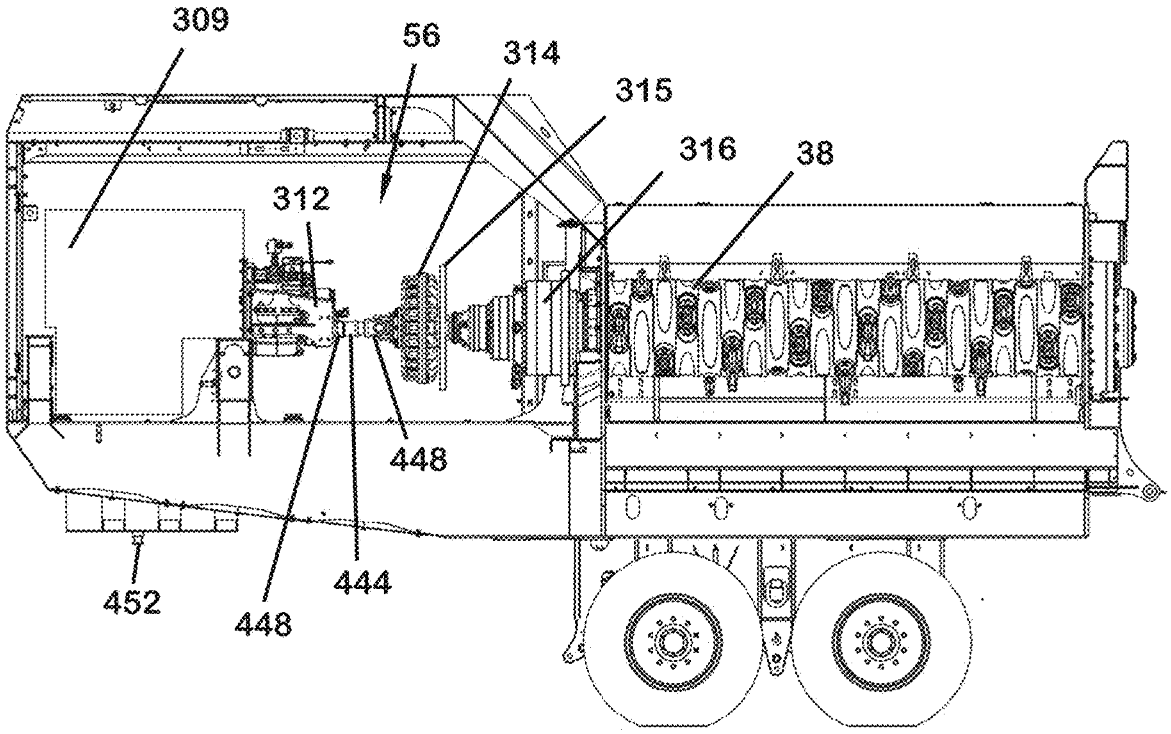
FIG. 45A is a side view showing a power train of the shredder of FIG. 1.
Figure 45B:
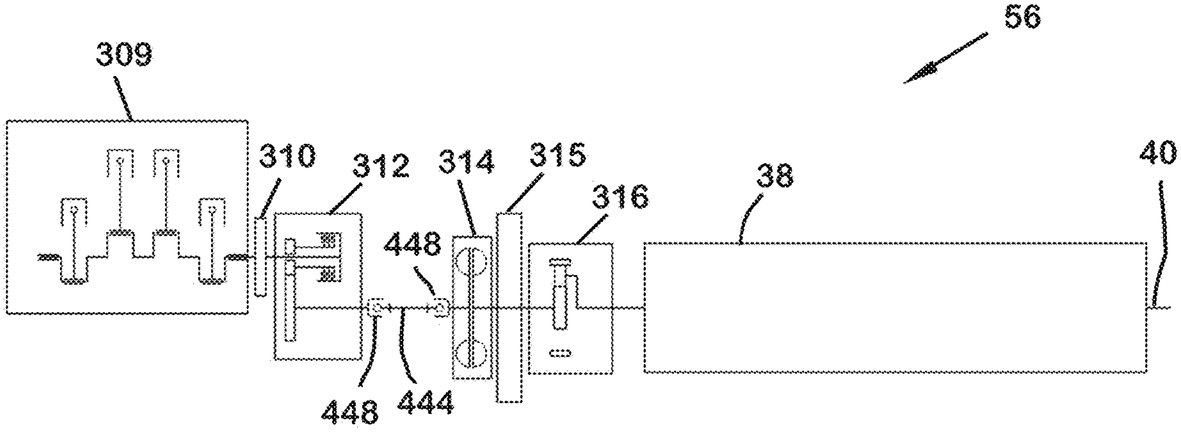
FIG. 45B is a schematic view of the power train shown in FIG. 45A.
Figure 46:
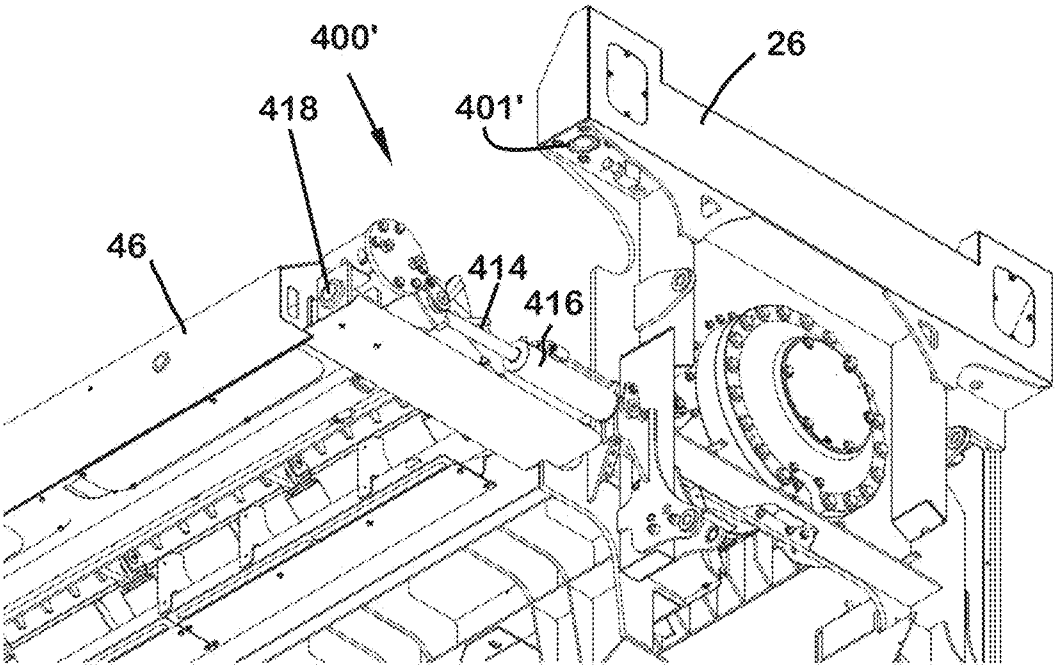
FIG. 46 is a partial perspective view showing an alternative access door latching arrangement.

As shown in FIGS. 34, 45A, and 45B, the power train 56 (i.e., drive system or drive train) for the slow speed shredder includes an engine 309 (which can include an engine flywheel 310) and a reversible gear transmission 312 that is connected to the output shaft of the engine 309. The reversible gear transmission 312 contains hydraulic clutches. One example of a reversible transmission is disclosed by U.S. Pat. No. 6,666,312, which is hereby incorporated by reference in its entirety. The input shaft of the reversible gear transmission 312 is connected to the output shaft of the engine 309, and the output shaft of the reversible transmission 312 is connected to an optional fluid coupler 314. The fluid coupler 314 is connected with a flywheel 315 and both are connected to an input shaft of a gear reduction unit 316. The flywheel 315 is provided and sized to level out loading spikes commonly observed during shredding operations. An output shaft of the gear reduction unit 316 is drivingly received in the shredder rotor 38 to drive rotation of the rotor 38. Further details and aspects of the drive drain 56 will be discussed below.

In one example, the fluid coupler 314 can transfer torque from the transmission 312 to the gear reduction unit 316 by hydraulic fluid pressure, and can also function as a torque overload protection device since a fluid coupling is used rather than a direct mechanical connection (e.g., the fluid coupler will slip when torque exceeds a predetermined maximum value). In other examples without the fluid coupler 314, the clutches in the reversible gear transmission 312 will perform the clutching function of the fluid coupler 314.

The gear reduction unit 316 can include a planetary gear set. The gear reduction unit 316 will reduce the rotational speed of the shredder rotor 38 to the desired operating speed when the engine 309 is running at rated speed. The output shaft of the gear reduction unit 316 is coupled to a rotor drive shaft, or in the illustrated embodiment, is drivingly received in a female receiving opening of the rotor 38, which is aligned along the axis of rotation 40 of the shredder rotor 38. The controller 301 can interface with the transmission 312 to control the direction torque is applied to the fluid coupler 314. Thus, by interfacing with the transmission 312 and controlling the mode of operation of the transmission 312 (e.g., forward or reverse), the controller 301 can selectively drive the rotor 38 in clockwise and counterclockwise rotational directions about the axis of rotation 40.

In the embodiment illustrated in FIG. 45A, the centerline of the engine crankshaft is below (e.g., about 9.75 inches below) the centerline of the output shaft of the transmission 312. Furthermore, the centerline of the output shaft of the transmission 312 is positioned vertically below or lower than the centerline of the input shaft of the fluid coupler 314 and the centerlines of the input and output shafts of the gear reduction unit 316, which are each coaxial with the axis of rotation 40 of the rotor 38. A driveshaft 444 with U-joints 448 interconnects the output shaft of the transmission 312 to the input shaft of the fluid coupler 314 (or to the input shaft of the gear reduction unit 316 in embodiments without a fluid coupler 314) and accommodates the vertical offset. These vertical offsets of an inline drive arrangement, without any belt drives, helps reduce the overall transport height of the shredder 10 while maximizing the height of the lower discharge chute 34 to permit optimum material outflow from beneath the shredder 10. Note how the engine 309 is above the hitch 452 of the fifth wheel hitch attachment, yet has a lower output shaft centerline than the axis of rotation 40 of the rotor 38.

The system can also include sensing functionality for determining when the shredder is experiencing an overload condition. For example, the controller 301 can interface with a pressure sensor 368 that senses a pressure corresponding to a pressure in the hydraulic cylinder devices 87. An overload condition is detected when the sensed pressure exceeds a predetermined pressure threshold. The controller 301 can also interface with a rotational speed sensor 370 that senses a rotational speed of the shredder rotor 38. An overload condition is detected with the sensed rotational speed of the rotor 38 decreases below a predetermined threshold value. The rotational speed sensor 370 can sense the actual rotational speed of the shredder rotor 38 (e.g., by sensing the rotational speed of the rotor drive shaft or output of the planetary gear set 316, or can sense other parameters indicative of the speed of the shredder rotor 38 (e.g., the rotational speed of the input shaft of the planetary gear set 316 or the rotational speed of the output side of the fluid coupler 314). In one example, the rotational speed sensor 370 can be positioned between the output side of the fluid coupler 314 and the input shaft of the planetary gear set of the gear reduction 316.

As indicated previously, the control system 300 includes a controller 301 for controlling the drive system components. Inputs for the control system 300 may include the speed of rotation of the shredder rotor 38, the hydraulic pressure within the hydraulic cylinder devices 87, the rotational speed of the input side of the fluid coupler (e.g., as monitored via CAN based on the output RPM of the transmission) and the presence or absence of the screen unit 100. Outputs for the control system 300 may include a control for controlling the direction of rotation for the shredder rotor 38 and a control for controlling whether the system is in the first, higher pressure-relief operating mode or the second, lower pressure-relief operating mode. The control system 300 may be used with or without the screen unit 100 in place. As described in detail above, when the screen unit 100 is in place, the hydraulic cylinder devices 87 will keep the shredder comb 58 in place until the first predetermined pressure is reached, thus minimizing the ability of shredder comb 58 to relieve in order to protect the screen unit 100 from damage. If a screen unit 100 is not in place, the shredder comb 58 will relieve when the hydraulic cylinder devices 87 reach the second, lower predetermined pressure.

Figure 35:
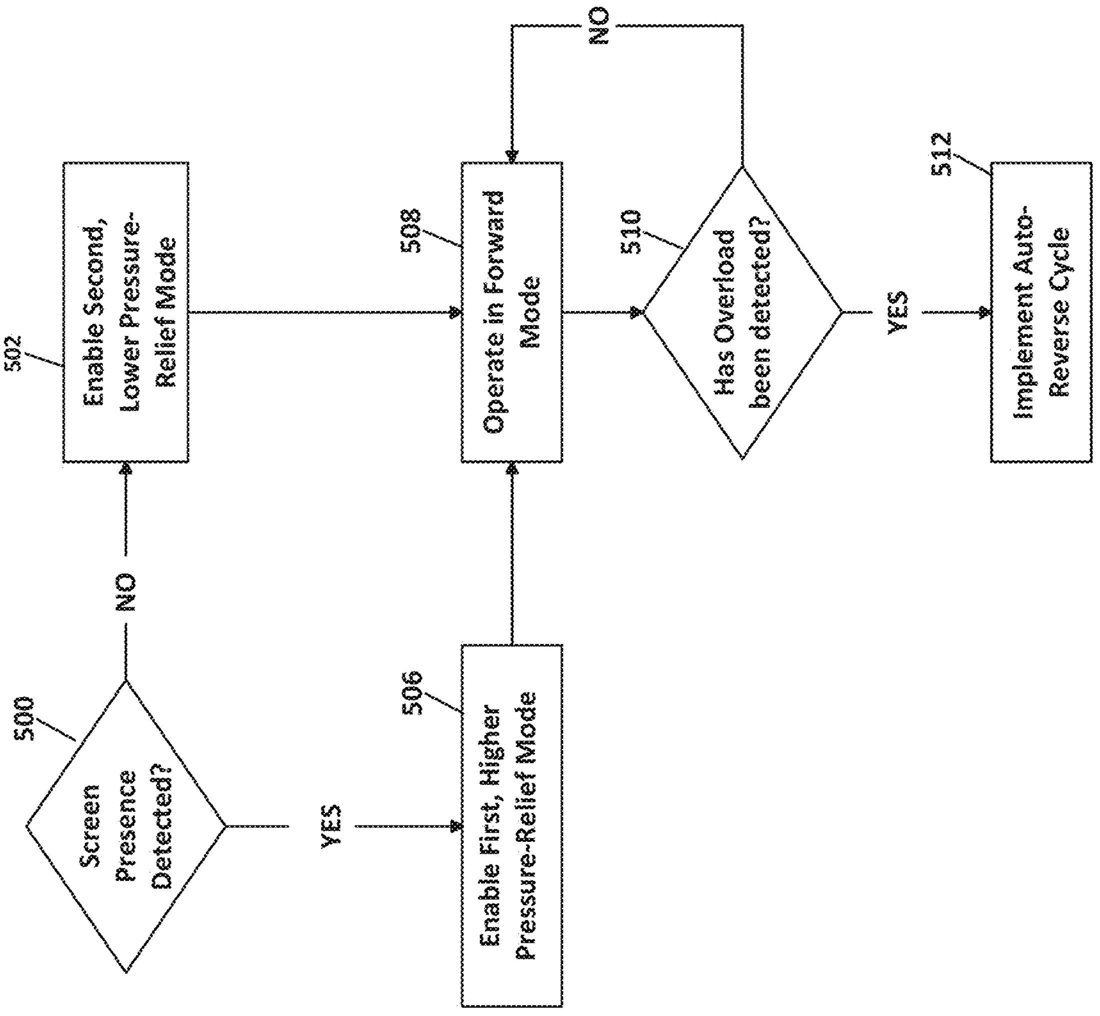
FIG. 35 is a flow chart showing an example of the control system logic for the shredder comb relief.

One example of control logic suitable for use with the shredder 20 is shown in FIG. 35. At step 500, the system determines whether the presence of a screen installed beneath the rotor 38 has been indicated. If no screen presence has been indicated, the system proceeds to step 502 where the second, lower pressure-relief mode is enabled and the rotor 38 is driven in the forward rotational direction (see step 508) for performing shredding operations. If a screen presence has been indicated, the system proceeds to step 506 where the first, higher pressure-relief operating mode is enabled. The system then proceeds to step 508 where the rotor is driven in the forward rotational direction for conducting shredding operations. In each operating mode, the auto-reverse function is enabled. At step 510, the system senses if an overload condition has been detected at the rotor 38. If no overload condition has been detected, the system proceeds back to step 508. In contrast, if the system detects an overload condition, an auto-reverse cycle is initiated to clear any jam that may have occurred between the comb 58 and the rotor 38.

Control system 300 may further comprise controlling an auto-reverse function that automatically reverses the direction of rotation of the shredder rotor 38 from the forward reducing direction to the reverse direction when an overload condition is detected. The control system 300 will automatically reverse the shredder rotor 38 if a stall or excessive torque is detected. A mechanical drive system will automatically reverse the shredder rotor 38 by utilizing a reversing gearbox having hydraulic shift clutches. Controls on the shredder 20 may also include a manual reverse button to jostle the feedstock at the operator's discretion. The auto-reverse function can occur independently of whether the screen unit 100 is installed.

When the auto-reverse function is active and the shredder rotor 38 speed in RPM drops below a threshold speed setting, an auto reverse sequence is initiated and the shredder rotor 38 will reverse. The engine 309 will reduce the rotor speed, via automatic control by the controller, and eventually the rotor speed will reach an RPM level at which the fluid coupling 314 or clutch can be disengaged, or the ENGAGE SPEED. When the rotor speed reaches the ENGAGE SPEED, the transmission 312 shifts to the REVERSE setting. The fluid coupling 314 or clutch will then engage and then engine speed is increased to full RPM for the time set by a control function REVERSE TIME (X) (rotor turning in reverse). At the end of REVERSE TIME (X), the engine speed is reduced to ENGAGE SPEED, and the fluid coupling 314 or clutch is disengaged. While the engine 309 is at ENGAGE SPEED the transmission 312 shifts to forward, the fluid coupling 314 or clutch is engaged, and engine speed increases to full speed to attempt shredding material. The threshold speed setting is based on a torque level that prevents damage to the shredder rotor 38, shredder comb 58 components, and the power train 56 components, which may include the engine 309, transmission 312, fluid coupler 314, flywheel 315, and gear reduction unit 316.

Figure 36:
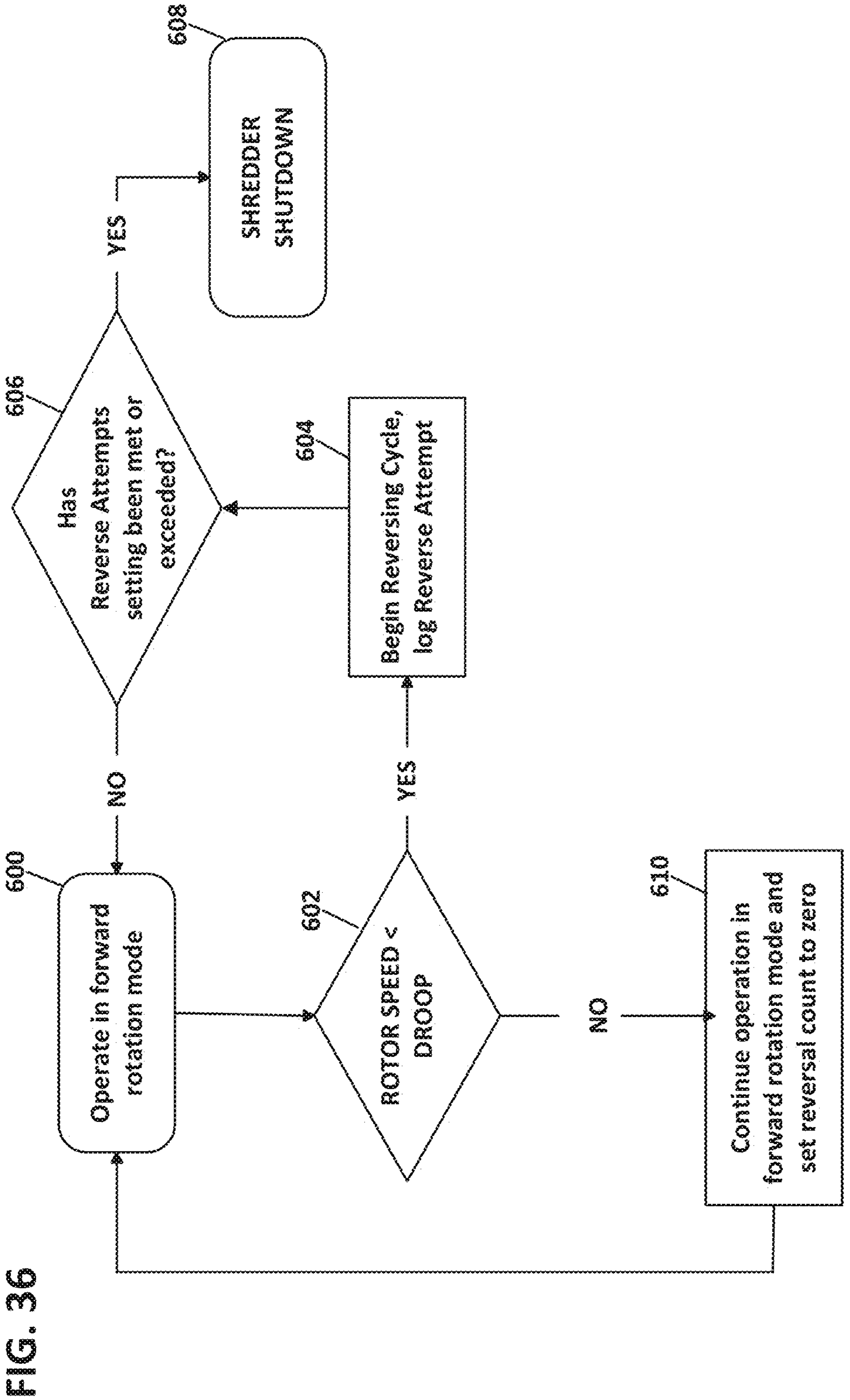
FIG. 36 is a flow chart showing one example of the control system logic for the shredder rotor auto reverse function.
Figure 37:
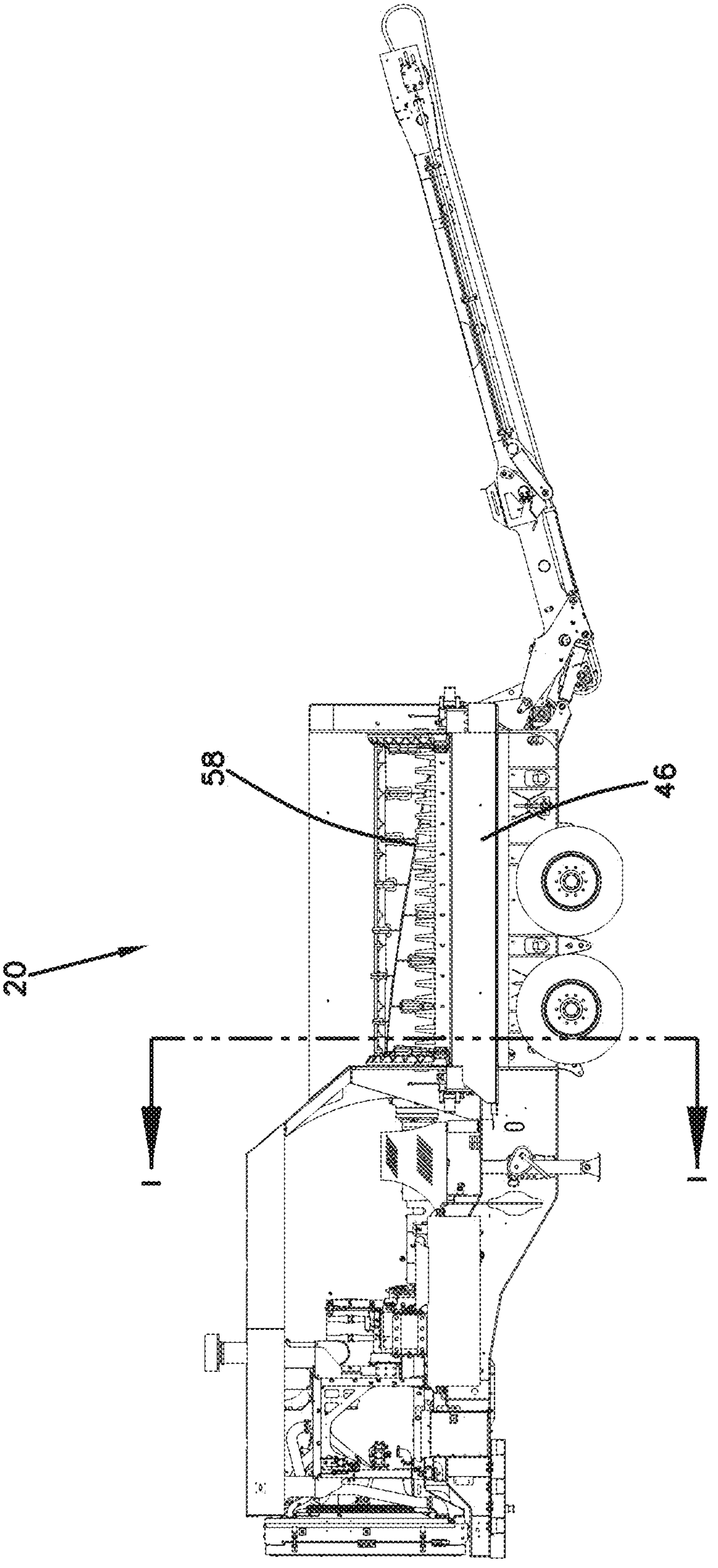
FIG. 37 is a left side view of the shredder of FIG. 1 with the shredder door open and illustrates a cross-section of the shredder observed in FIGS. 38-41.
Figure 38:
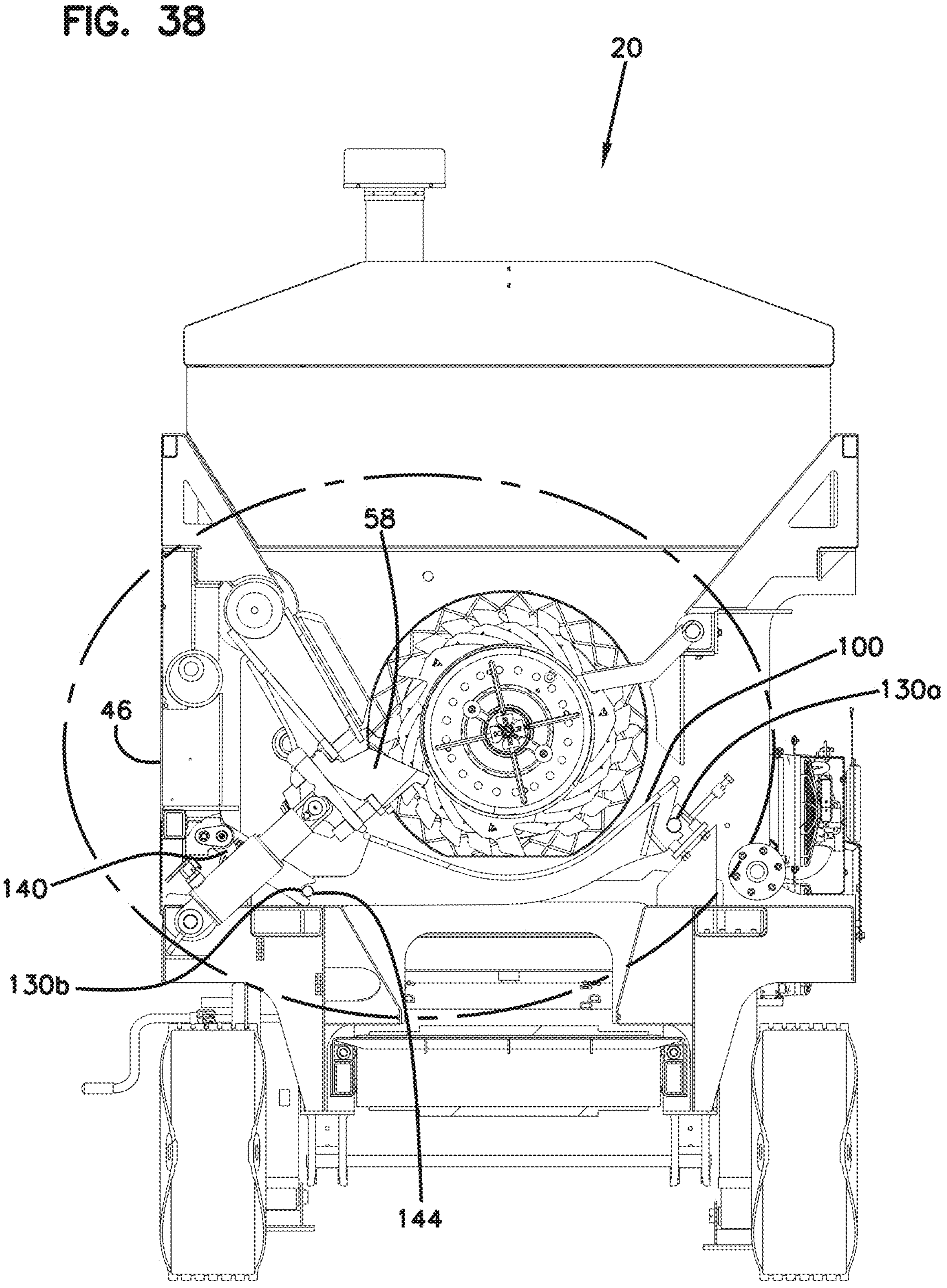
FIG. 38 is a cross-sectional view showing the installed screen secured by two positive stops on opposing ends of the screen.
Figure 39:
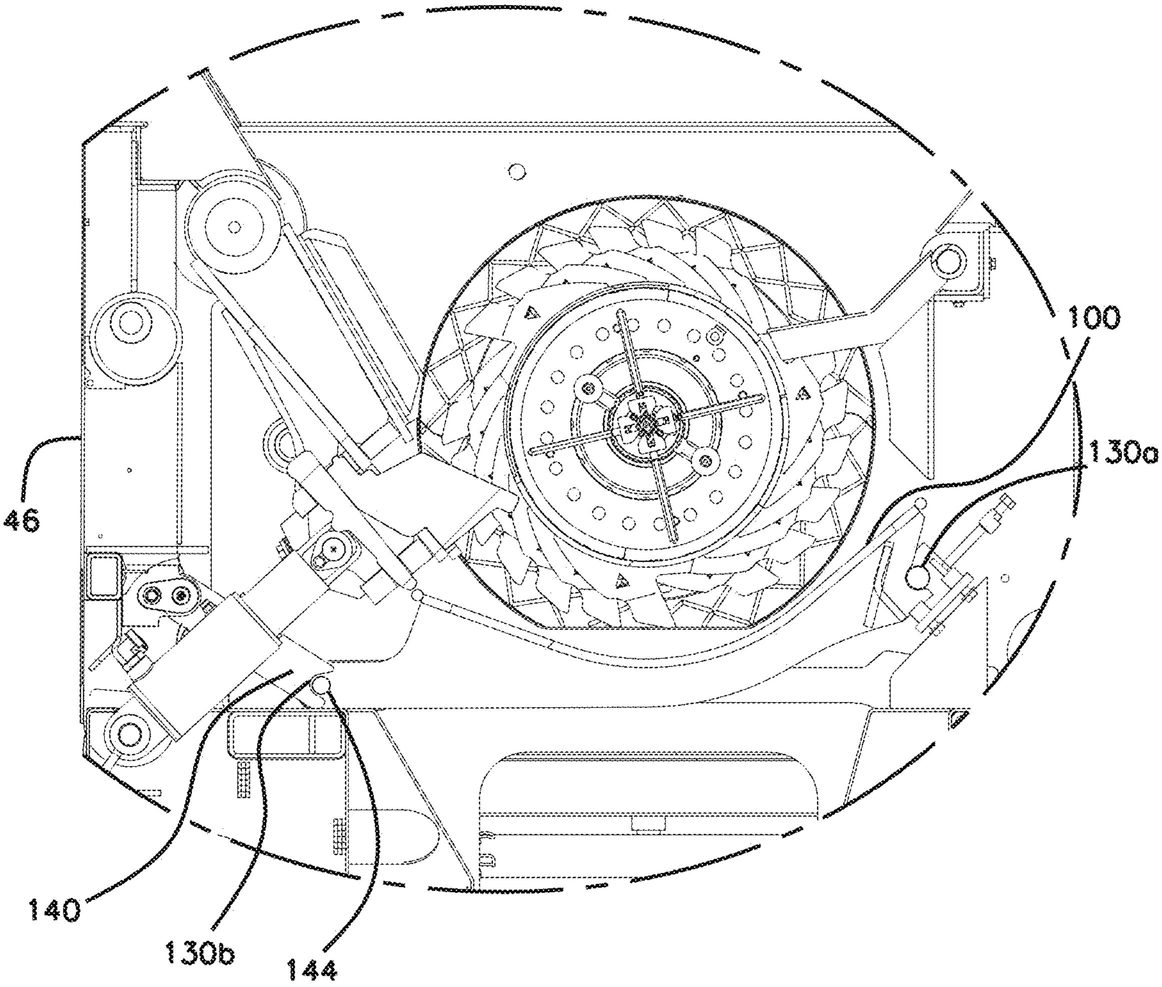
FIG. 39 is an enlarged, detailed view taken along section line I-I of FIG. 37 of the screen depicted in FIG. 38 being held in place by the two positive stops.
Figure 40:
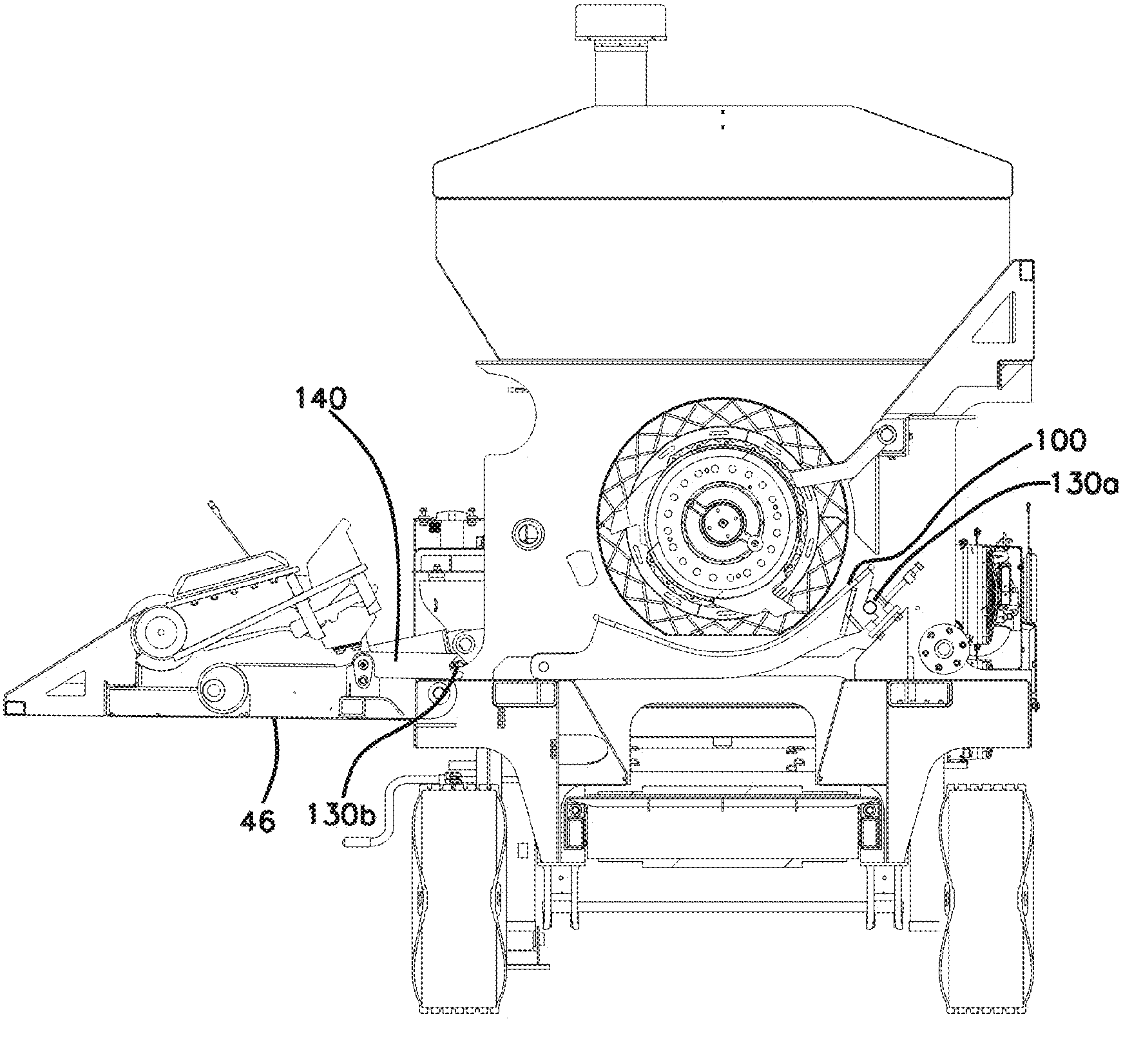
FIG. 40 is another cross-sectional view taken along section line I-I of FIG. 37 showing the access door opened and the end of the screen nearest the access door unsecured from the second positive stop.
Figure 41:
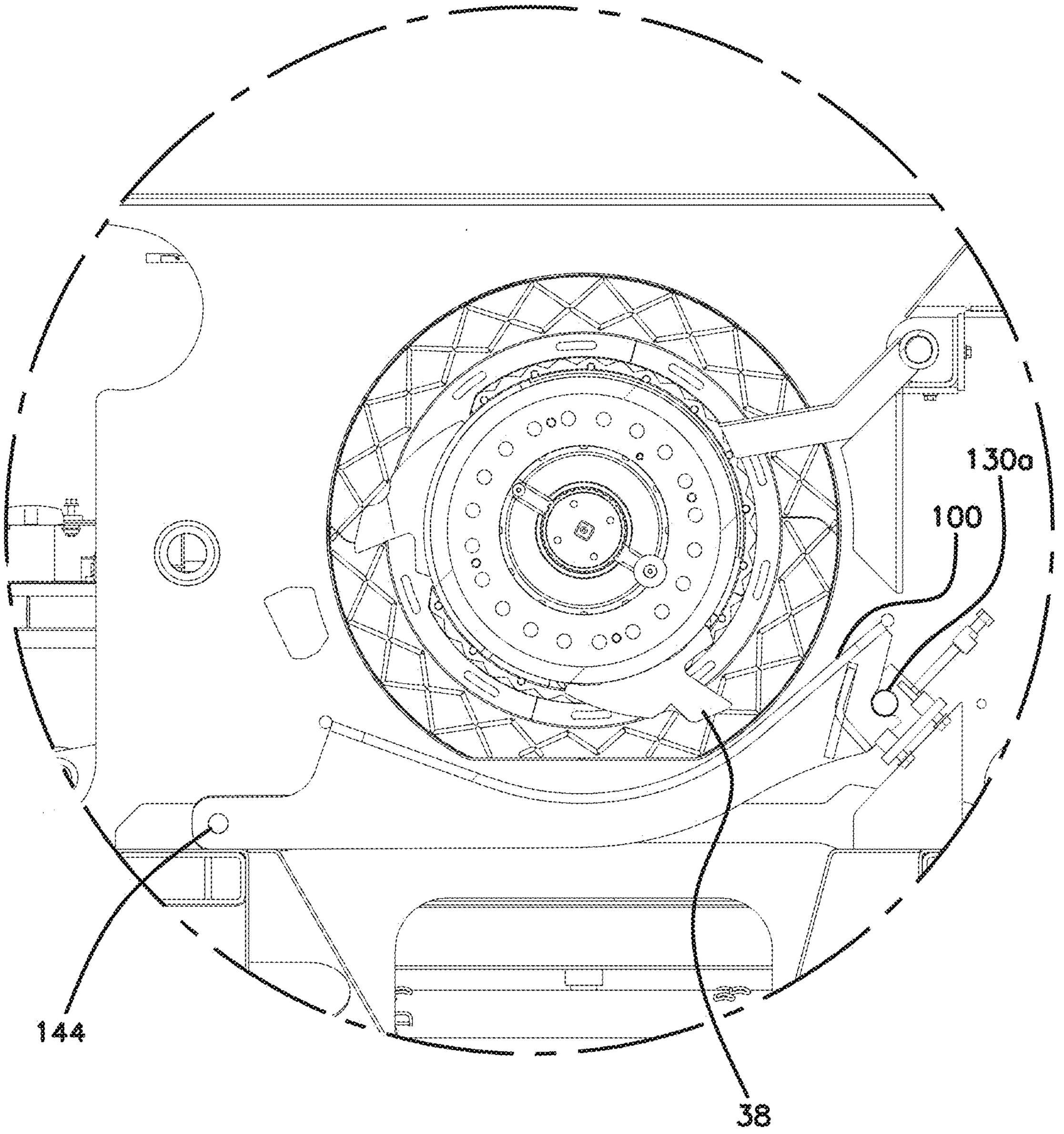
FIG. 41 is an enlarged, detailed view of the screen depicted in FIG. 40 where the end of the screen nearest the access door unsecured from the second positive stop.

The number of rotor reverse attempts can be set by the operator. For example, if the number of rotor reverse attempts is set to three, the control system 300 will attempt a maximum of three reversing sequences before the rotor automatically stops for any required maintenance or operator attention. The operator may also manually start reversing the rotor as needed by pushing a reversing button. The control system 300 may also use additional inputs to control the shredder comb 58 relieving mechanism. Such input variables may include time spent at a low rotor speed in RPM, as well as the measured fluid coupling temperature. As shown in FIG. 36, after the rotor reverses for a set time, the rotor rotates forward to attempt shredding again, and the reverse sequence count resets to zero.

In one embodiment, the control system 300 comprises a reverse sequence that reverses the rotor and then returns it to forward motion. To complete the reverse sequence, the rotor must be running in a low speed setting. After a preset delay, which may be about 250 millisecond, the control system 300 disengages the fluid coupling 314 or clutch and waits for the engine to slow to a speed at which the engine can engage the fluid coupling 314 or clutch, or the ENGAGE SPEED. The control system 300 then shifts the transmission to REVERSE and engages the fluid coupling 314 or clutch. The engine speed is then increased to the full RPM. The rotor 38 runs in reverse for a time set by the parameter REVERSE TIME(x), which is the time that the rotor 38 will reverse for each given reverse attempt. Each reverse time is individually adjustable and each is longer than the previous reverse time (i.e. REVERSE TIME(2) is longer than REVERSE TIME(1)). The control system 300 will disengage the high engine speed. After another delay, which may be approximately 250 millisecond, the control system 300 then disengages the fluid coupling 314 or clutch. When the engine slows to the ENGAGE SPEED, the control system 300 shifts the transmission to the FORWARD setting, and then the fluid coupling 314 or clutch engages, which then causes an increase in the engine speed to the full RPM setting. At this point, the rotor 38 is now rotating in a forward motion.

One embodiment for the logic for the auto-reverse program is illustrated in FIG. 36 and may proceed as follows. Initially, an adjustable rotor speed threshold in RPM is set, specifically, the rotor speed at which a rotor reversal sequence will be triggered. This speed setting may be referred to by a variable name DROOP. The number of reverse attempts in the progressive reversing cycle sequence is set based upon an input from the operator. At step 600, the rotor is operated in a forward drive mode. At step 602, the system determines whether sensed forward rotor speed is above DROOP. If the rotor speed drops below DROOP, the shredder will begin a reversing cycle sequence (see step 604) in order to dislodge any debris caught in the shredder comb 58 and/or the screen unit 100 and will add a reversal count to a reversal count log in memory. Once an operator-programmed time length for the initiated reversing cycle sequence has expired, the system checks whether the reversal count stored in the reversal count log exceeds the predetermined maximum amount of attempts (see step 606). If the maximum number of reversal attempts has been reached without creating a condition where forward rotor rotation exceeds DROOP, the system moves to step 608 and the rotor clutch will disengage, and a message will display to inform the operator that the machine is shut down due to unprocessed debris or feedstock. If the maximum number of reversal attempts has not been reached, the system proceeds back to step 600 and the rotor is rotated in a forward direction. If the forward rotor speed fails to exceed DROOP, the system proceeds back to step 602 and the previously described protocol is repeated. If the forward rotor speed exceeds DROOP, the system will proceed to step 610. At step 610 the system continues operation in the forward drive mode, and resets the reversal in the reversal count log to zero. Thereafter, the system returns to step 600.

An example of the automatic shutdown from control system 300 may be carried out as follows. The operator presses the Auto button for 500 milliseconds, whereupon the operator display has a message which reads "Disengaging AutoShred". The engine 309 will decrease the rotor speed to an RPM level that is low enough to disengage the clutch. Upon disengaging of the clutch, the operator display will show a different prompt which reads "Disengage Conveyor? Y/N", whereupon the control system may be shutdown.

The operator may also manually engage individual functions that can put the shredder 20 in a grinding state. This requires the operator to place the shredder in a designated AutoShred setting. To place the shredder 20 in this setting, the operator presses the Rotor Fwd button for approximately 500 milliseconds, whereupon the operator display shows a message indicating the conveyor is not running. This begins a countdown sequence for disengaging the rotor 38, which will be indicated on the screen by a message and an accompanying, simultaneous alarm sequence. The display will readout "Rotor Engaged" for 2 seconds, and then switch to the main menu. The operator must then engage the maximum engine RPM setting by pressing the Engine High button. The shredder AutoShred setting will engage when the rotor speed is above a system-designated RPM level.

Figure 52:
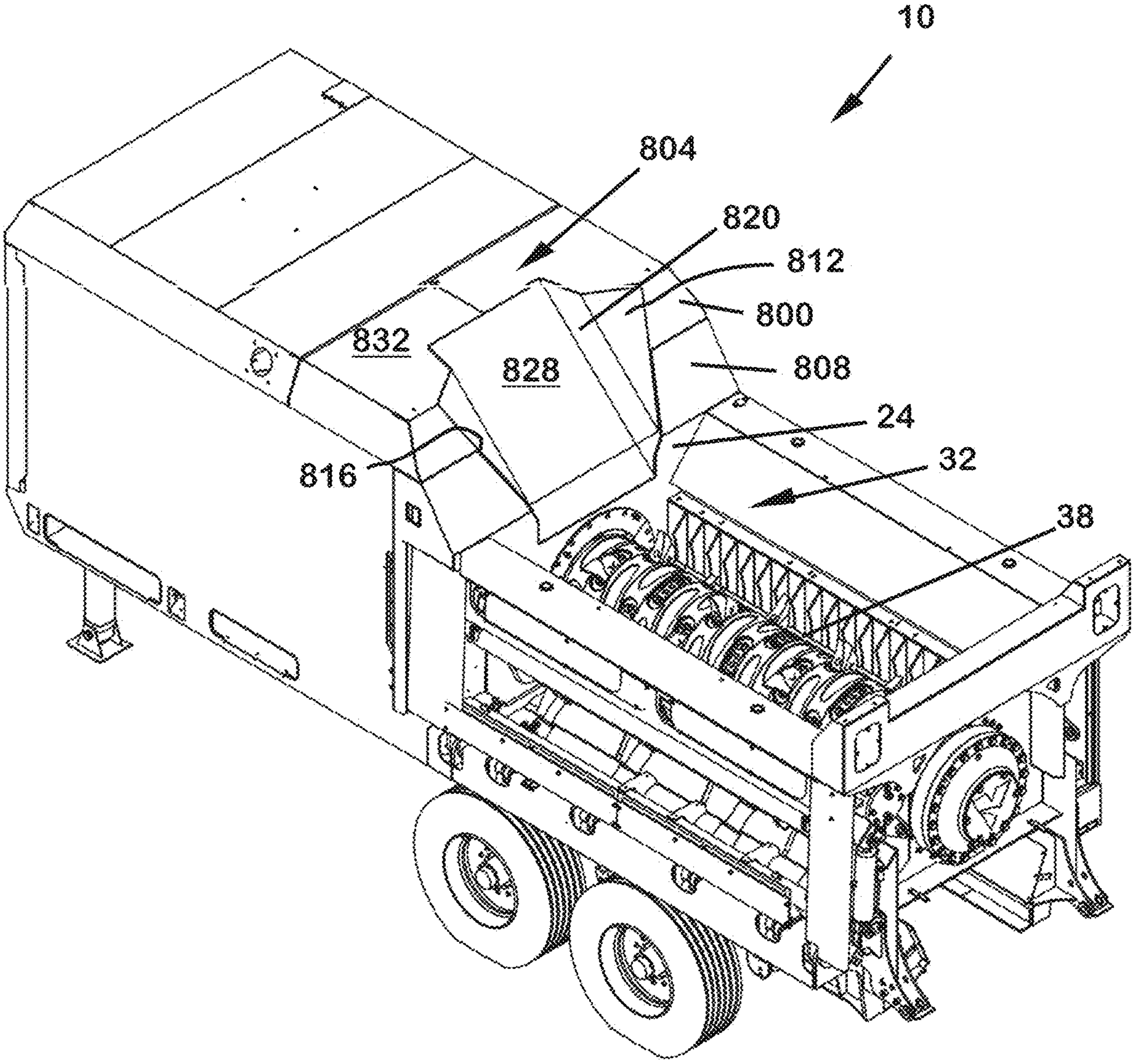
FIG. 52 is a rear perspective view of a shredder having a concavity formed in a forward end of the upper hopper.
Figure 53:
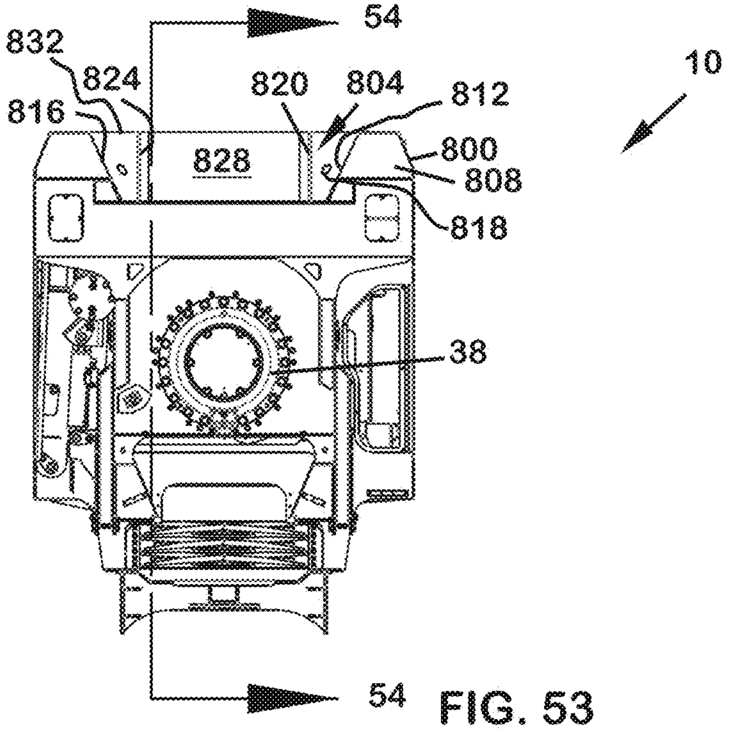
FIG. 53 is a partial rear end view of the shredder of FIG. 52.
Figure 54:
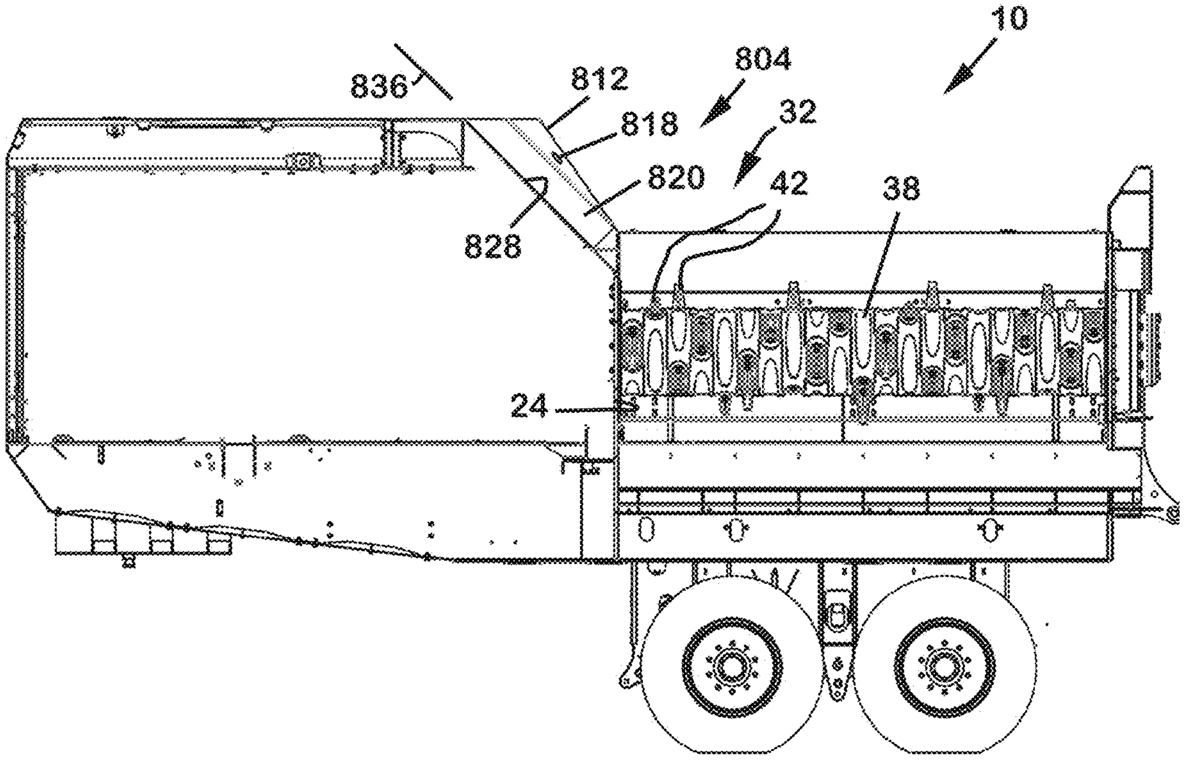
FIG. 54 is a section view taken through line 54-54 of FIG. 53.

FIGS. 52-54 illustrate an example of the shredder 10 in which a forward or end wall 800 of the upper hopper 32 adjacent the first end wall 24 is formed with a concavity 804 to facilitate the feeding of material to be shredded into the upper hopper 32 and to the rotor 38. The concavity 804 is defined in a rearwardly-facing, sloped wall 808 located above the first end wall 24. First and second wall portions 812, 816, respectively, are angled symmetrically forwardly and inwardly from the sloped wall 808, toward the longitudinal centerline of the shredder 10. Optional water nozzles 818 (FIGS. 53 and 54) can be provided in the first and second walls 812, 816 for spraying water into the upper hopper 32 for dust suppression. Third and fourth wall portions 820, 824, respectively, extend forwardly and in generally parallel fashion to one another from the respective first and second wall portions 812, 816 until they intersect with a fifth wall portion 828. The fifth wall portion 828 slopes from a top wall 832 of the shredder 10 rearwardly and downwardly toward the rotor 38 until it intersects the vertically-extending portion of the first end wall 24. As best shown in FIG. 54, the slope of the fifth wall portion 828 is designed to direct material to a forward end of the rotor 38, and in the illustrated embodiment, is sloped such that waste sliding along the fifth wall portion 828 will be engaged by the first and/or second forward-most row of rotor teeth 42 on the rotor 38. Reference line 836 (FIG. 54) illustrates how the plane containing the fifth wall 828 intersects with the second row of rotor teeth 42 on the rotor 38. The illustrated reference line 836 forms an angle of about forty-five degrees to vertical.

This concavity 804 helps to more evenly distribute the waste along the length of the rotor 38, and particularly to the forward-most end of the rotor 38, thereby utilizing the forward-most end of the rotor 38 and its teeth 42 to maximize shredding efficiency. In other prior art shredders, the forward end of the rotor is largely inaccessible to waste inserted into the upper hopper do to the presence of overhanging structure. The concavity 804 operates to eliminate structural impediments to the waste directly encountering an end portion of the rotor 38 as it falls downwardly toward the rotor 38.

Figure 55:
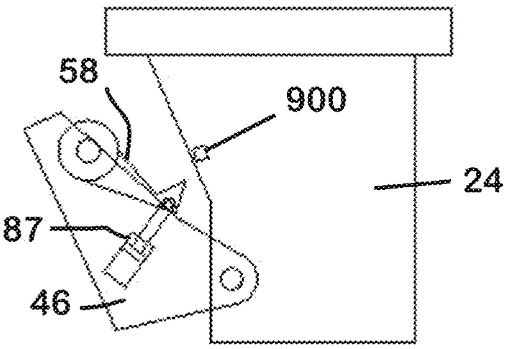
FIGS. 55-57 schematically illustrate the interaction between the shredder comb and an adjustable comb stop that sets the clearance between the shredder comb and the shredder rotor.
Figure 56:
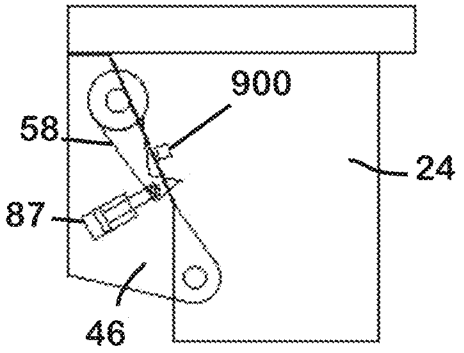
Figure 57:
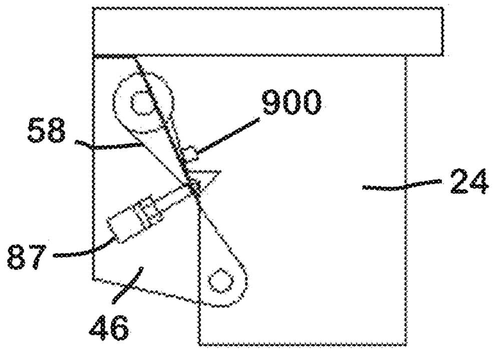

The shredder 10 can further include a feature for adjusting the clearance between the shredder comb 58 and the rotor 38 when the access door 46 is in the closed and latched position. This clearance ultimately adjusts the clearance between the comb teeth 60 and the rotor teeth 42, and can be adjusted to compensate for different types of materials being shredded by the shredder 10. FIGS. 55-57 schematically illustrate how the adjustment feature interacts with the shredder comb 58 to set the clearance. The illustrated adjustment feature includes an eccentrically-adjustable block assembly 900 mounted on each of the first and second end walls 24, 26. FIGS. 55-57 illustrate the block assembly 900 mounted on the first end wall 24, and while not shown, another block assembly 900 is mounted on the second end wall 26 (see FIG. 47). FIG. 55 illustrates the access door 46 in a partially open position. FIG. 56 illustrates the access door 46 in the closed and latched position, but prior to the comb 58 being fully extended by the hydraulic cylinder devices 87 to the shredding position (or in the comb-relief positions).

FIG. 57 illustrates the door 46 in the closed and latched position and with the shredder comb 58 extended by the hydraulic cylinder devices 87 to the shredding position. When in this position, portions of the shredder comb 58 abut each block assembly 900, thereby limiting the extent to which the hydraulic cylinder devices 87 can pivot the comb 58 toward the rotor 38 to set the desired shredding position of the comb 58. In other words, the block assemblies 900 act as adjustable stops against which the shredder comb 58 abuts to limit the extension of the comb 58 into engagement with the rotor 38. As will be further explained below, adjusting the orientation/positioning of the block assembly 900 adjusts the location at which the comb 58 abuts the block assembly 900 to limit the extent the comb 58 can be pivoted by the hydraulic cylinder devices 87 toward the rotor 38. This enables the operator to adjust the desired clearance between the comb 58 and the rotor 38 for different shredding applications.

Figure 58:
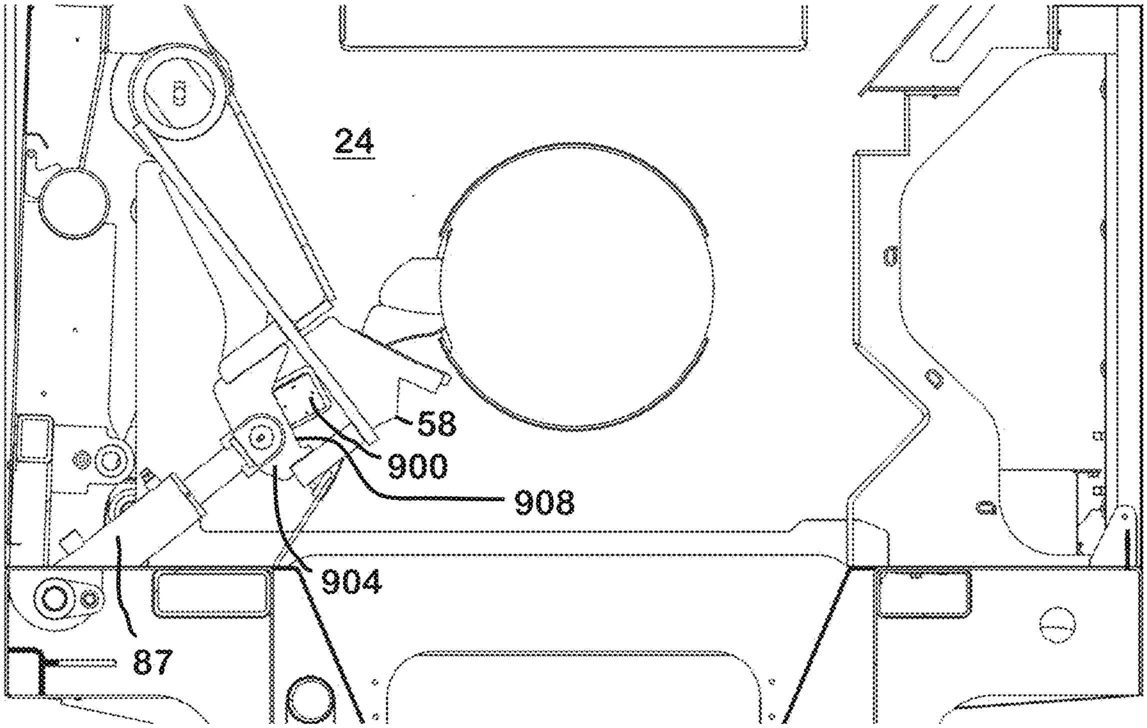
FIG. 58 is a partial section view looking toward the front of the shredder from within the cavity housing the rotor, and illustrates the comb/rotor clearance adjustment arrangement.
Figure 59:
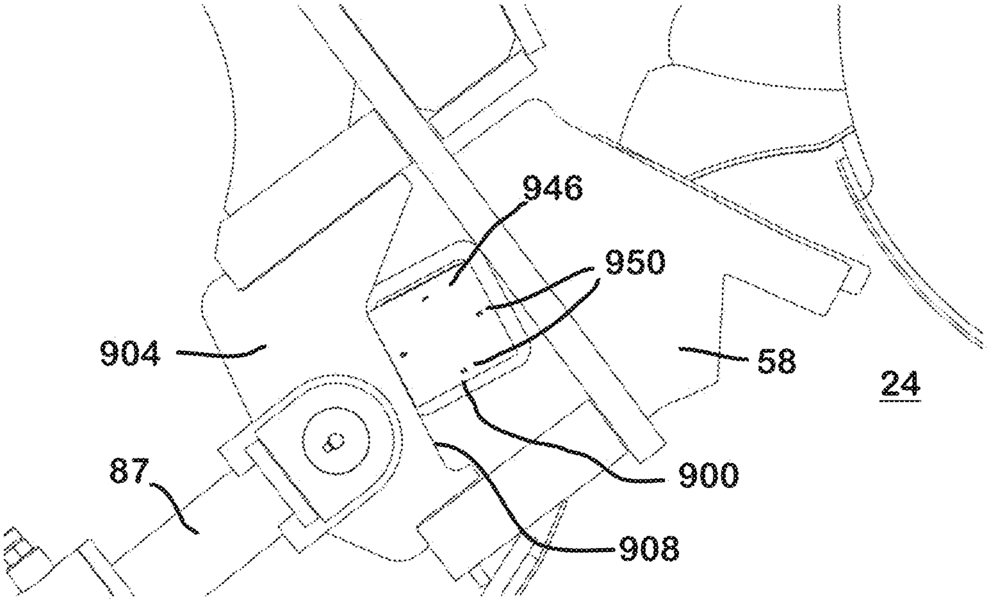
FIG. 59 is a view of an enlarged portion of FIG. 58.

FIGS. 58 and 59 are partial section views looking toward the front of the shredder from within the cavity housing the rotor 38, and illustrate the interaction between the front block assembly 900 and the shredder comb 58. The comb 58 includes a comb stop plate 904 at each end of the comb 58 to be positionable adjacent the respective end walls 24, 26. The stop plate 904 includes an engagement surface 908 configured to selectively abut the block assembly 900. It should be noted that the hydraulic cylinder device 87 shown in FIGS. 58 and 59 is mounted to a mounting plate (not shown) that has been removed for clarity for viewing the stop plate 904 and the block assembly 900.

Figure 60:
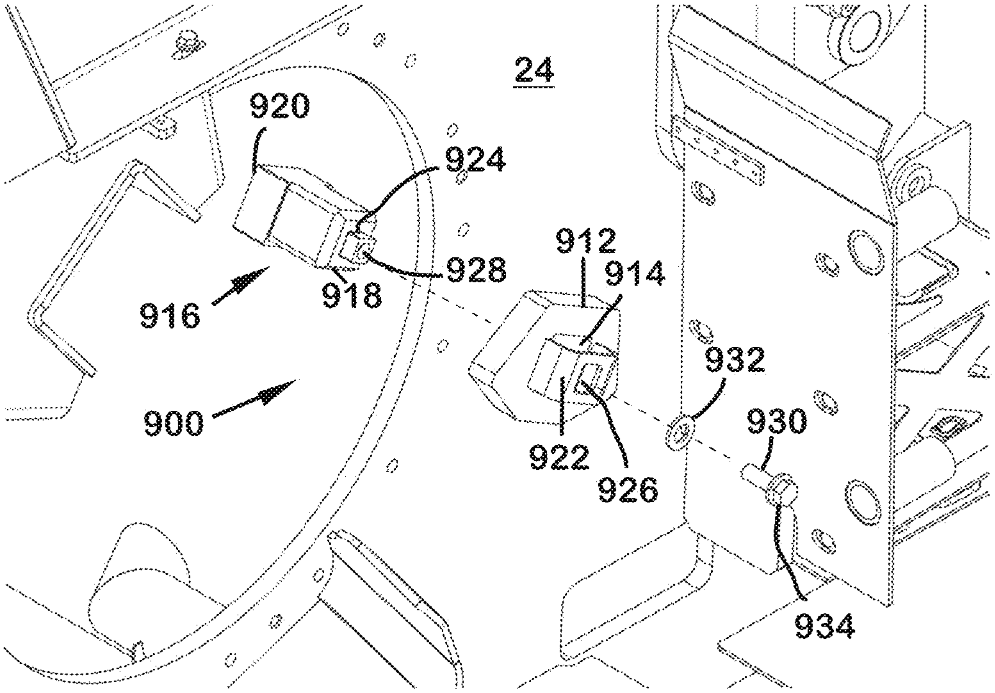
FIG. 60 is a partially exploded view of the adjustable block assembly as viewed from within the engine compartment and looking toward the cavity housing the rotor.
Figure 61:
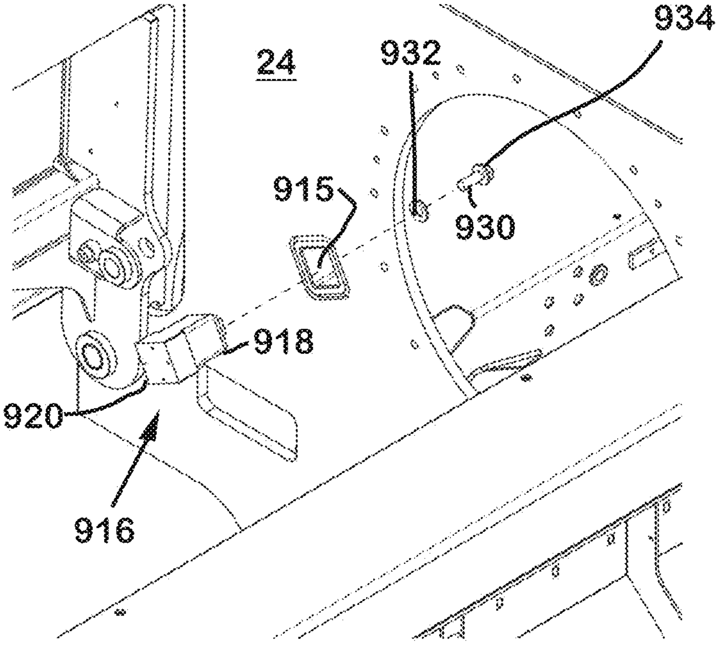
FIG. 61 is a partially exploded view of the adjustable block assembly as viewed from within the cavity housing the rotor and looking toward the engine compartment.
Figure 62:
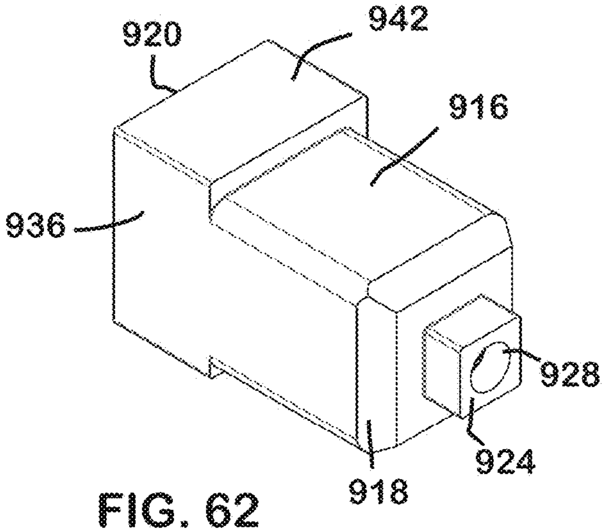
FIGS. 62-65 are perspective views of the eccentric stop block of the adjustable block assembly.
Figure 63:
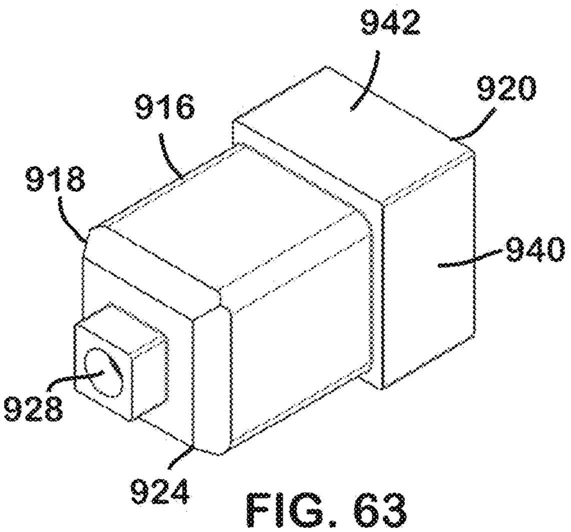
Figure 64:
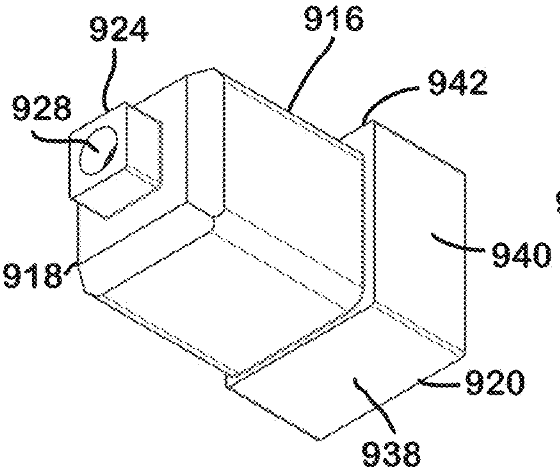
Figure 65:
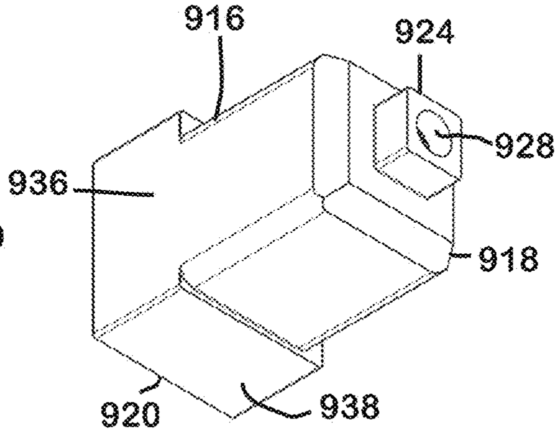
Figure 66:
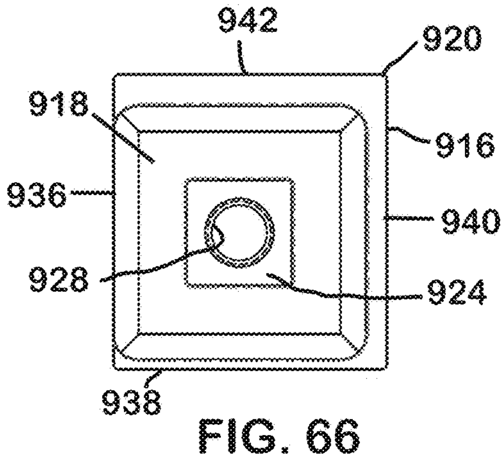
FIG. 66 is an end view of the eccentric stop block shown in FIGS. 62-65.

FIGS. 60-66 illustrate the block assembly 900 at the first end wall 24 in detail. The description below applies equally to the block assembly 900 at the second end wall 26, as shown in FIG. 47. Referring first to FIGS. 60 and 61, a mounting plate 912 is secured (e.g., welded) to the end wall 24 such that an aperture 914 in the mounting plate 912 aligns with a similarly-configured aperture 915 in the end wall 24. An eccentric block 916 includes a first end 918 configured to be inserted through the aperture 915 in the end wall 24 and through the aperture 914 in the mounting plate 912. A second end 920 of the block 916 is larger in size such that the second end 920 abuts the end wall 24 and cannot pass through the aperture 915 in the end wall 24. A flange 922 (FIG. 60) is secured (e.g., welded) to the mounting plate 912 and receives the first end 918 of the block 916, and more specifically, a projection 924 on the first end 918 of the block 916 is received in an aperture 926 in the flange 922. The block 916 includes a threaded bore 928 in the first end 918 that extends through the projection 924 and that receives a fastener 930 (e.g., a threaded bolt). A washer 932 and/or the head 934 of the fastener 930 is configured to have a dimension larger than the aperture 926 in the flange 922 so that when the fastener 930 is inserted and secured in the threaded bore 928, the block 916 is secured to the end wall 24 via the engagement between the fastener 930 and the flange 922.

As best shown in FIGS. 62-66, the illustrated block 916 is four-sided and is eccentric at the second end 920 about its longitudinal axis, which is coaxial with the threaded bore 928. The first end 918 of the block 916 is symmetrical about the threaded bore 928 and the longitudinal axis, and can be inserted through the aperture 915 in the end wall 24 and the aperture 914 in the mounting plate 912 in one of four different rotational positions or orientations. Likewise, the projection 924 is symmetrical about the threaded bore 928 and fits through the aperture 926 in the flange 922 in one of four different rotation positions or orientations. However, the second end 920 of the block 916 is eccentric relative to bore 928 to provide four different stop surfaces 936, 938, 940, 942 for engagement by the engagement surface 908 of the stop plate 904 on the comb 58. The stop surface 936 is substantially co-planar with the adjacent surface of the first end 918. The stop surface 938 is offset by a first predetermined distance from the adjacent surface of the first end 918. The stop surface 940 is offset by a second predetermined distance from the adjacent surface of the first end 918 that is larger than the first predetermined distance. The stop surface 942 is offset by a third predetermined distance from the adjacent surface of the first end 918 that is larger than both the first and second predetermined distances. The predetermined distances can be selected as desired, and can be set at the appropriate increments, to provide the desired clearance options for the comb stop 58 relative to the rotor 38. The blocks 916 are made of metal such that the stop surfaces 936, 938, 940, 942 can endure the repeated engagement by the engagement surfaces 908 and the pressure applied by the hydraulic cylinder devices 87. In alternative embodiments, the block may have a different number of sides and stop surfaces to provide the desired number of comb adjustment options.

Changing the desired comb/rotor clearance is easy. The operator need only loosen and remove the two fasteners 930 (one on each block assembly 900), remove and re-install the blocks 916 so that the desired stop surfaces are in facing relationship to the engagement surface 908 of the stop plate 904, and then re-insert and tighten the fasteners 930. As best seen in FIG. 59, to assist the operator, an end face 946 of the second end 920 of the block 916 can include indicia 950 indicative of the amount of clearance provided by each stop surface of the block 916. As illustrated in FIG. 59, the indicia 950 can include numbers provided (e.g., etched) on the end face 946 adjacent each stop surface 936, 938, 940, 942 (with "0" representing the maximum clearance setting and "3" representing the minimum clearance setting).

Figure 67:
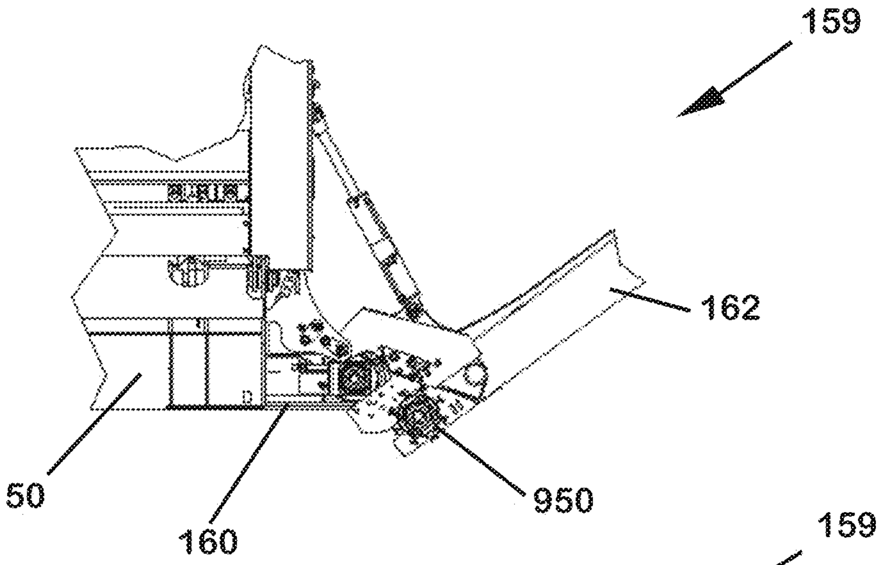
FIG. 67 is a partial side view illustrating the outer conveyor in an operating position.
Figure 68:
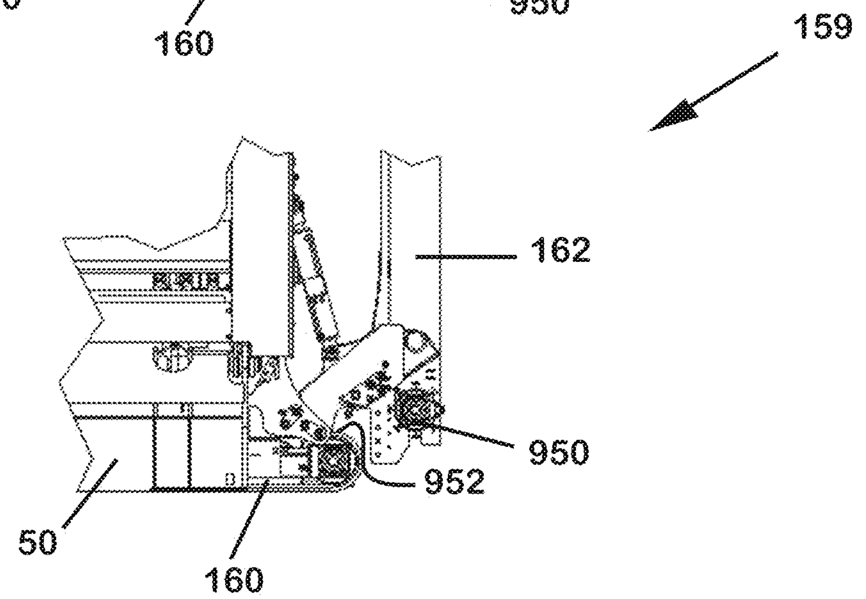
FIG. 68 is a partial side view illustrating the outer conveyor in a transport position.

FIGS. 67-74 illustrate features of the conveyor system 159, and specifically illustrate how the lower conveyor 160 is configured to be removed from its operating position beneath the rotor 38 and the discharge chute 34 of the shredder 20 for servicing or replacing the conveyor belt or other conveyor components, without requiring removal of the outer conveyor 162 from the shredder. FIG. 67 illustrates the outer conveyor 162 in its operating position, pivoted on the base/frame 50 of the shredder 20. The outer conveyor 162 includes an idler roller 950 about which the conveyor belt revolves. FIG. 68 illustrates the outer conveyor 162 in its non-operating, stowed or transport position. In this position, the idler roller 950 of the outer conveyor 162 is positioned vertically above or nearly vertically above an uppermost surface 952 of lower conveyor 160. To enable removal of the lower conveyor 160 from the shredder without requiring the removal of the outer conveyor 162, the shredder 20 is designed such that the lower conveyor 160 is or can be positioned vertically below the stowed outer conveyor 162, and more specifically below the idler roller 950 of the outer conveyor 162. This allows the lower conveyor 160 to be removed from the shredder 20 in a rearward, horizontal direction parallel to the rotor axis 40 (see FIGS. 72 and 74) by a fork truck or other suitable machine.

Figure 69:
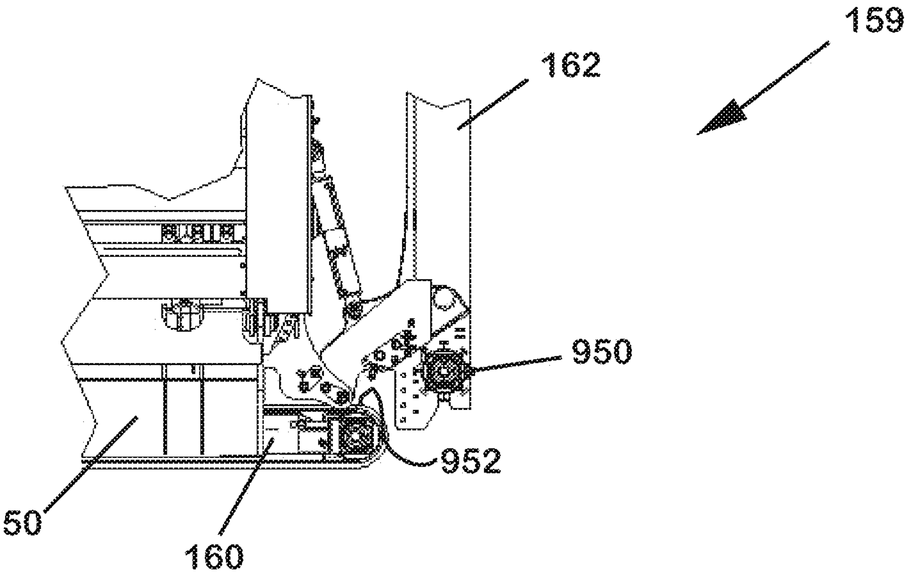
FIG. 69 is a partial side view illustrating the outer conveyor in the transport position and the lower conveyor in a lowered position for removal.
Figure 70:
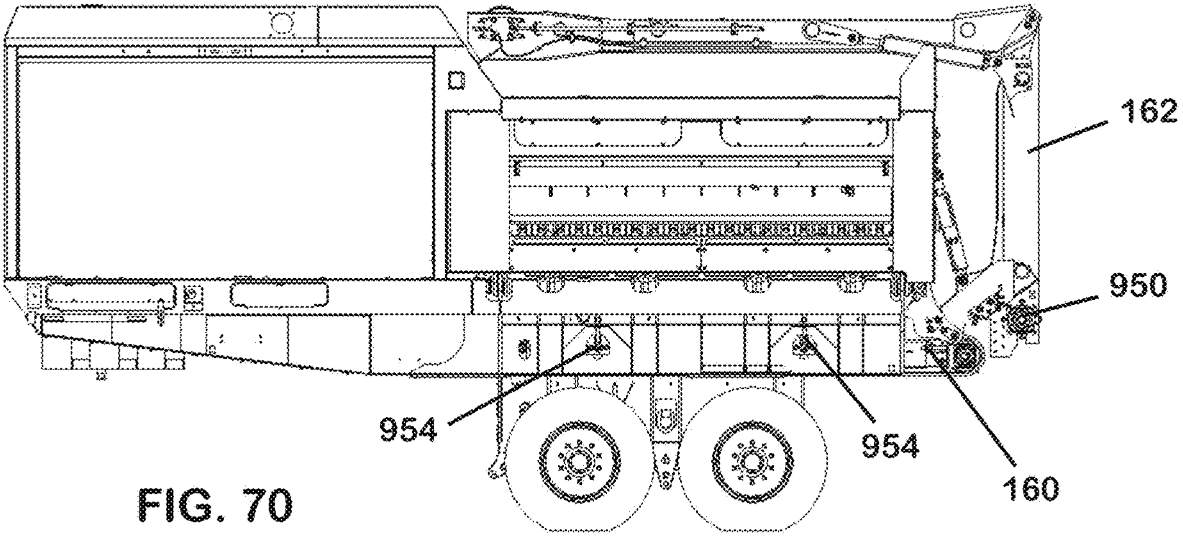
FIG. 70 is a side view of the shredder illustrating the lower conveyor in the operating position.
Figure 71:
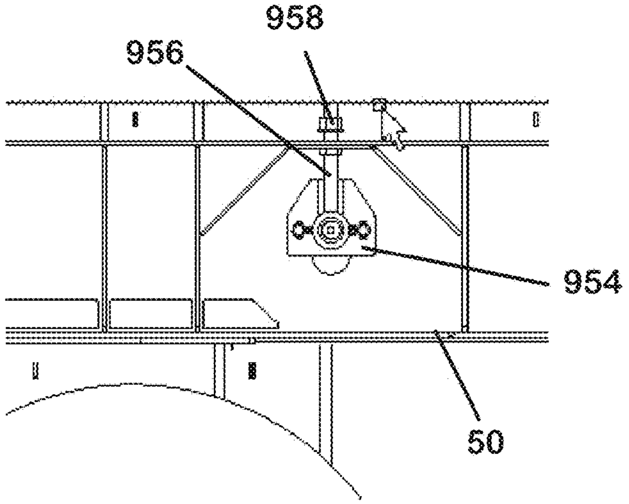
FIG. 71 is an enlarged partial side view of one of the brackets holding the lower conveyor on the shredder frame.
Figure 72:
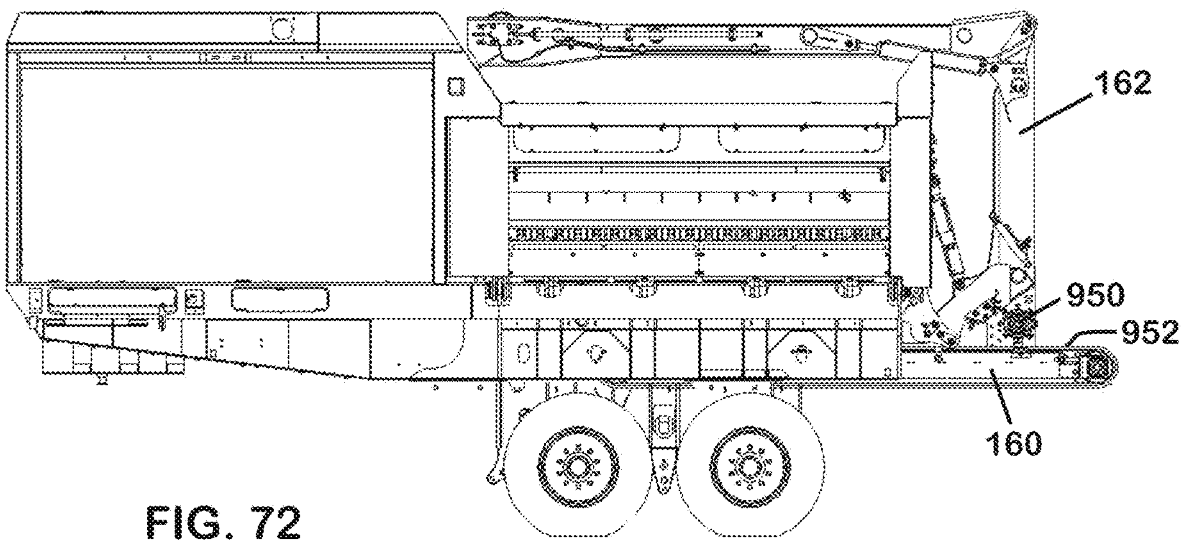
FIG. 72 is a side view of the shredder illustrating the lower conveyor brackets removed and the lower conveyor in the lowered position and partially removed.

FIG. 69 illustrates the lower conveyor 160 in a lowered position in which its uppermost surface 952 is well below the idler roller 950 and any other structure of the outer conveyor 162 that would otherwise impede or prevent the removal of the lower conveyor 160 in the rearward, horizontal direction. As seen in FIG. 69, the lower conveyor 160 can be lowered relative to the frame 50, from the operating position, so that a portion of the frame structure of the lower conveyor 160 rests on and is slidably supported by the frame 50. FIGS. 70 and 71 illustrate conveyor support brackets 954 (two are shown in FIG. 70) that support and permit movement of the lower conveyor 160 relative to the frame 50 of the shredder 20. As shown in FIG. 71, each support bracket 954 includes a threaded rod 956 that supports one or more retaining nuts 958. An operator can loosen the nuts 958, which lowers the lower conveyor 160 from the operating position to the lowered position. Those skilled in the art will understand that other mechanisms can alternatively be used to support and permit the movement of the lower conveyor 160. The illustrated support brackets 954 are just one embodiment.

Figure 73:
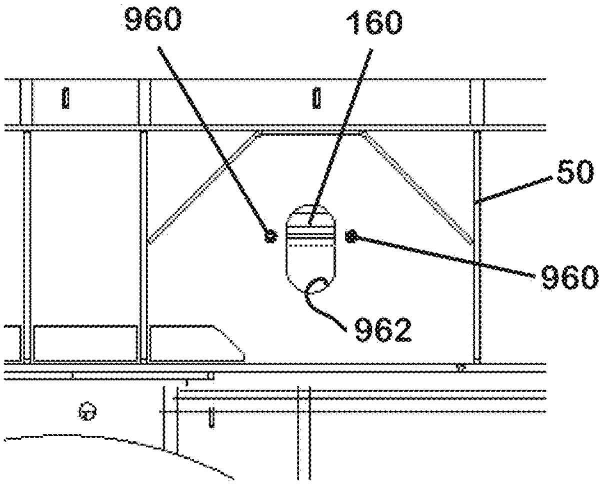
FIG. 73 is an enlarged partial side view similar to FIG. 71, shown with the bracket removed.

After the operator loosens all of the retaining nuts 958 (on all brackets 954 on both sides of the shredder 20), the lower conveyor 160 will be lowered into its lowered position and will be supported by a surface of the frame 50. The support brackets 954 can then be removed from the frame 50. In the illustrated embodiment, stub shafts on the brackets 954 that secure the brackets 954 to the frame 50 can be removed from apertures 960 in the frame 50. FIG. 73 illustrates the bracket removed and a portion of the lower conveyor 160 in its lowered position can be seen through the oval-shaped aperture 962 in the frame 50.

Figure 74:
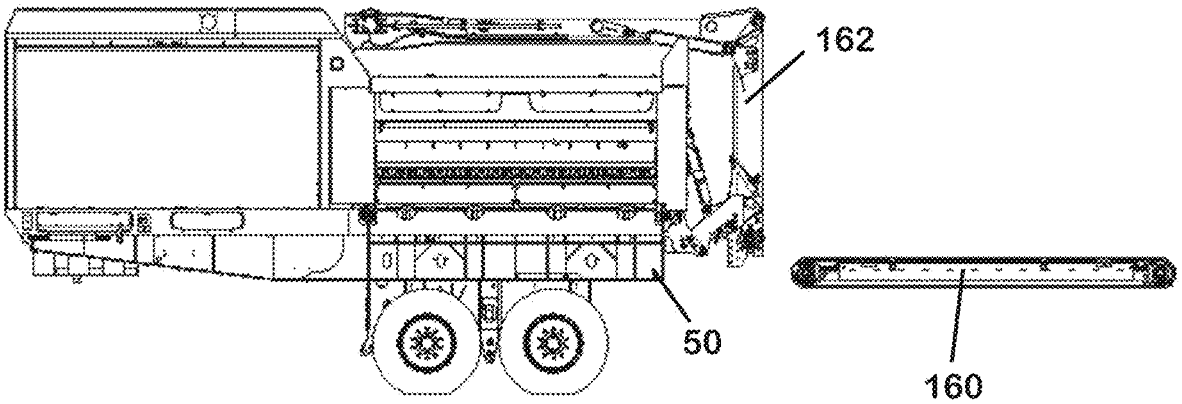
FIG. 74 is a side view of the shredder illustrating the lower conveyor removed.

With the lower conveyor 160 in its lowered position, and slidably supported on the frame 50, an operator can use an available machine (e.g., a fork truck, etc.) to slide the lower conveyor 160 rearwardly and horizontally to the position shown in FIG. 74, in which at least the supporting frame, rollers, and conveyor belt of the lower conveyor 160 are accessible for repair and/or replacement. The outer conveyor 162, in its inoperative or transport position, will not impede removal of the lower conveyor 160. Unlike some prior art shredders, the lower conveyor 160 can be removed as a module from beneath the rotor 38 without requiring removal or disconnection of the outer conveyor 162 from the shredder frame 50.

Those skilled in the art will readily recognize various modifications and changes that may be made without following the example embodiments and applications illustrated and described herein, and without departing from the true spirit and scope of the inventive aspects disclosed herein.

What is claimed is:

1. A shredder comprising:

a shredder box including an upper hopper for receiving material desired to be shredded and a lower discharge opening for discharging shredded material from the shredder box, the shredder box also including a screen mounting location located above the lower discharge opening;

a shredder rotor positioned within an interior of the shredder box adjacent to a lower end of the upper hopper, the shredder rotor being rotatable about a rotor axis, the shredder rotor including a main rotor body and plurality of rotor teeth mounted to the main rotor body, wherein the rotor teeth define a cylindrical reference boundary at a time when the shredder rotor is rotated about the rotor axis;

a shredder comb positioned adjacent to a lower end of the upper hopper, the shredder comb including comb teeth, the shredder comb being positionable in a shredding position in which the comb teeth intermesh with the rotor teeth and are located inside the cylindrical reference boundary, the shredder comb also being positionable in a relief position in which the comb teeth are outside the cylindrical reference boundary;

a screen that is mountable at the screen mounting location for screening shredded material that moves past the shredder comb, the shredder being operable with the screen mounted at the screen mounting location and with the screen removed from the screen mounting location; and the shredder comb being operable in a first operating mode and a second operating mode, wherein when the shredder comb is in the first operating mode the shredder comb is moveable from the shredding position to the relief position upon a first force applied to the shredder comb by material being shredded to allow an obstruction to pass between the shredder comb and the shredder rotor, and wherein when the shredder comb is in the second operating mode the shredder comb is moveable from the shredding position to the relief position upon a second force applied to the shredder comb by material being shredded to allow an obstruction to pass between the shredder comb and the shredder rotor, the second force being lower than the first force; and a control system including a controller and a sensor in communication with the controller, wherein the sensor is operable to detect whether or not a screen is installed at the screen mounting location, and the controller is programmed to: a) operate the shredder with the shredder comb in the first operating mode at a time when the sensor indicates that the screen has been installed at the screen mounting location; and b) operate the shredder with the shredder comb in the second operating mode at a time when the sensor indicates that a screen has not been installed at the screen mounting location.

2. The shredder of claim 1, wherein the sensor includes a screen presence sensor positioned at the screen mounting location for detecting the presence of an installed screen at the screen mounting location.

3. The shredder of claim 1, further comprising a lift arm for lifting the screen from a staged position to an installed position at the screen mounting location, wherein the lift arm is configured to move between a first position corresponding to the staged position of the screen and a second position corresponding to the installed position of the screen, and wherein the sensor of the control system includes an arm position sensor for sensing whether the lift arm is in the second position.

4. The shredder of claim 1, wherein the shredder rotor is rotatable in a forward reducing direction about the rotor axis configured to perform shredding operations, and is also rotatable in a reverse direction about the rotor axis, opposite the forward reducing direction.

5. The shredder of claim 4, wherein the controller of the control system is programmed with an auto-reverse function of the shredder configured to automatically reverse the direction of rotation of the shredder rotor from the forward reducing direction to the reverse direction in response to an overload condition being detected.

6. The shredder of claim 5, further comprising a drive train configured to transfer input torque to the shredder rotor to cause rotation of the shredder rotor about the rotor axis, the drive train including a reversible transmission configured to allow the drive train to alternate the direction of rotation of the shredder rotor between the forward reducing direction and the reverse direction in response to input from the control system.

7. The shredder of claim 6, wherein the drive train further includes, an engine configured to supply the input torque;

a reversible gear transmission configured to be driven by the engine;

torque overload protection device downstream of the reversible gear transmission; and a gear reduction unit having an output drivingly connected to the rotor for rotating the rotor in either of the first or second directions.

8. The shredder of claim 1, further comprising a hydraulic cylinder device for retaining the shredder comb in the shredding position, the hydraulic cylinder device including a hydraulic cylinder and a piston rod that is reciprocally moveable within the hydraulic cylinder, wherein the control system allows movement of the hydraulic cylinder from a first position corresponding to the shredding position of the shredder comb to a second position corresponding to the relief position only in response to a force at or above the first force applied to the shredder comb in the first operating mode, and wherein the control system allows movement of the hydraulic cylinder from the first position corresponding to the shredding position of the shredder comb to the second position corresponding to the relief position only in response to a force at or above the second force applied to the shredder comb in the second operating mode.

9. The shredder of claim 8, wherein the shredder comb is mounted on an access door of the shredder that can be opened to provide access to the shredder rotor, wherein the access door forms at least a portion of a side wall of the rotor box when the access door is closed.

10. The shredder of claim 8, wherein the hydraulic cylinder device is part of a hydraulic system, the hydraulic system having an accumulator configured to assist in returning the shredder comb to the shredding position when a pressure in the hydraulic system less than a pressure corresponding to the first force when in the first operating mode, and when a pressure in the hydraulic system less than a pressure corresponding to the second force when in the second operating mode.

11. The shredder of claim 1, wherein when the shredder comb is in the first operating mode, the shredder comb is configured to return to the shredding position from the relief position in response to force applied to the shredder comb by material being shredded falling below the first force, and wherein when the shredder comb is in the second operating mode the shredder comb is configured to return to the shredding position from the relief position in response to force applied to the shredder comb by material being shredded falling below the second force.

12. The shredder of claim 1, wherein the shredding position of the shredder comb is adjustable.

13. The shredder of claim 12, wherein shredder includes a block assembly, the block assembly being selectively positionable between first and second positions to adjust the shredding position of the shredder comb.

14. A shredder comprising:

a shredder box including an upper hopper for receiving material desired to be shredded and a lower discharge opening for discharging shredded material from the shredder box, the shredder box also including a screen mounting location located above the lower discharge opening;

a shredder rotor positioned within an interior of the shredder box adjacent to a lower end of the upper hopper, the shredder rotor being rotatable about a rotor axis, the shredder rotor including a main rotor body and plurality of rotor teeth mounted to the main rotor body, wherein the rotor teeth define a cylindrical reference boundary at a time when the shredder rotor is rotated about the rotor axis;

a shredder comb positioned adjacent to a lower end of the upper hopper, the shredder comb including comb teeth, the shredder comb being positionable by a hydraulic system in a shredding position in which the comb teeth intermesh with the rotor teeth and are located inside the cylindrical reference boundary, the hydraulic system configured, in response to shredding force applied to the shredder comb by material being shredded, to allow movement of the shredder comb to a relief position at a relief pressure of the hydraulic system, wherein the comb teeth are outside the cylindrical reference boundary in the relief position;

a screen that is mountable at the screen mounting location for screening shredded material that moves past the shredder comb, the shredder being operable with the screen mounted at the screen mounting location and with the screen removed from the screen mounting location; and a control system including a controller and a sensor in communication with the controller, wherein the sensor is operable to detect whether or not a screen is installed at the screen mounting location and produce a corresponding output, and the controller is programmed to switch between a high relief-pressure operation mode and a low relief-pressure operating mode based on the output of the sensor, wherein the relief pressure is higher in the high relief-pressure operating mode than in the low relief-pressure operating mode.

15. The shredder of claim 14, wherein the shredder comb is configured to automatically return to the shredding position in response to the pressure of the hydraulic system falling below the relief pressure of the high relief-pressure operating mode and the low relief-pressure operating mode, respectively.

16. The shredder of claim 14, wherein in the high relief-pressure operating mode, the shredder comb is prevented from moving to the relief position.

17. The shredder of claim 14, wherein the shredder rotor is rotatable in a forward reducing direction about the rotor axis configured to perform shredding operations, and is also rotatable in a reverse direction about the rotor axis, opposite the forward reducing direction.

18. The shredder of claim 17, wherein the controller of the control system is programmed with an auto-reverse function of the shredder configured to automatically reverse the direction of rotation of the shredder rotor from the forward reducing direction to the reverse direction in response to an overload condition being detected.

19. The shredder of claim 14, wherein the shredding position of the shredder comb is adjustable.

* * * * *